US011363576B2

(12) United States Patent
Gao

(10) Patent No.: US 11,363,576 B2
(45) Date of Patent: Jun. 14, 2022

(54) PUCCH TRANSMISSION METHOD, USER EQUIPMENT AND DEVICE

(71) Applicant: CHINA ACADEMY OF TELECOMMUNICATIONS TECHNOLOGY, Beijing (CN)

(72) Inventor: Xuejuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 52 days.

(21) Appl. No.: 16/638,403

(22) PCT Filed: Jun. 21, 2018

(86) PCT No.: PCT/CN2018/092244
§ 371 (c)(1),
(2) Date: Feb. 11, 2020

(87) PCT Pub. No.: WO2019/029280
PCT Pub. Date: Feb. 14, 2019

(65) Prior Publication Data

US 2020/0170007 A1 May 28, 2020

(30) Foreign Application Priority Data

Aug. 11, 2017 (CN) ........................ 201710687285.4

(51) Int. Cl.
*H04W 72/04* (2009.01)
*H04L 5/00* (2006.01)

(52) U.S. Cl.
CPC ....... *H04W 72/0413* (2013.01); *H04L 5/0048* (2013.01)

(58) Field of Classification Search
CPC ................................................ H04W 72/0413
See application file for complete search history.

(56) References Cited

U.S. PATENT DOCUMENTS

2017/0163388 A1 6/2017 Wiemann et al.
2017/0164352 A1 6/2017 Yang et al.
(Continued)

FOREIGN PATENT DOCUMENTS

CN 103026677 A 4/2013
CN 106559198 A 4/2017
(Continued)

OTHER PUBLICATIONS

CATT: "Long duration PUCCH structure"; 3GPP TSG RAN WG1 Meeting #88bis; R1-1704578; Spokane, USA Apr. 3-7, 2017.
(Continued)

*Primary Examiner* — Duc C Ho
(74) *Attorney, Agent, or Firm* — Kilpatrick Townsend & Stockton, LLP

(57) ABSTRACT

Provided in the embodiments of the present application are a physical uplink control channel (PUCCH) transmission method, user equipment and a device, used to solve the technical problem in an existing technology wherein no related method or device supports PUCCH transmission in a new wireless communication system. The PUCCH transmission method comprises: determining the number A of symbols occupied by a PUCCH, the number A being a positive integer; determining a PUCCH structure set that is configured in correspondence to the number A of the symbols, a PUCCH structure comprised in the PUCCH structure set comprising A symbol bits, the PUCCH structure set comprising one or more PUCCH structures, and the number of symbol bits used for transmitting pilot frequency information RS in different PUCCH structures being different when multiple PUCCH structures are comprised, wherein a PUCCH structure is a distribution rule for symbol bits used for transmitting uplink control information (UCI) and symbol bits used for transmitting RS; and determining a PUCCH
(Continued)

structure corresponding to the PUCCH from the PUCCH structure set, and performing PUCCH transmission on the basis of the corresponding PUCCH structure.

20 Claims, 4 Drawing Sheets

(56) References Cited

U.S. PATENT DOCUMENTS

| | | | | |
|---|---|---|---|---|
| 2019/0045498 | A1* | 2/2019 | Huang | H04W 72/085 |
| 2020/0052835 | A1* | 2/2020 | Xiong | H04L 1/1861 |

FOREIGN PATENT DOCUMENTS

| | | | |
|---|---|---|---|
| CN | 106788918 | A | 5/2017 |
| EP | 3641200 | A1 | 4/2020 |
| JP | 2019528597 | A | 10/2019 |
| WO | 2018174546 | A1 | 9/2018 |

OTHER PUBLICATIONS

Ericsson: "On the Design of Long PUCCH for Small Payloads"; 3GPP TSG RAN WG1 Meeting #88bis; R1-1706038 Spokane, USA Apr. 3-7, 2017.

Huawei, HiSilicon: "Long duration PUCCH structure"; 3GPP TSG RAN WG1 Meeting #89; R1-1706953; Hangzhou, China, May 15-19, 2017.

Intel Corporation, "Long PUCCH formats", 3GPP TSG RAN WG1 Meeting #880, RI-1704752, Mar. 25, 2017.

CATT, "Long PUCCH for small UCI payloads", 3GPP TSG RAN WG1 NR Ad-Hoc#2, Qingdao, P.R. China Jun. 27-30, 2017, total 4 pages, R1-1710085.

CATT," Long PUCCH for moderate and large UCI payloads",3GPP TSG RAN WG1 NR Ad-Hoc#2, Qingdao, P.R. China Jun. 27-30, 2017, total 3 pages, R1-1710086.

LG Electronics,"Design of long NR-PUCCH for more than 2 UCI bits", 3GPP TSG RAN WG1 NR Ad-Hoc#2, Qingdao, P.R. China Jun. 27-30, 2017, total 8 pages, R1-1710316.

* cited by examiner

PUCCH TRANSMISSION METHOD, USER EQUIPMENT AND DEVICE

This application is a US National Stage of International Application No. PCT/CN2018/092244, filed on Jun. 21, 2018, which claims the benefit of Chinese Patent Application No. 201710687285.4, filed with the Chinese Patent Office on Aug. 11, 2017, and entitled "PUCCH TRANSMISSION METHOD, USER EQUIPMENT AND DEVICE", both of which are incorporated herein by reference in its entirety.

FIELD

The present application relates to the technical field of communications, and particular to a physical uplink control channel (PUCCH) transmission method, a user equipment and a device.

BACKGROUND

In an LTE (Long Term Evolution) system, PUCCH (Physical Uplink Control Channel) transmission is performed with a subframe as a unit, the number of resource symbols occupied by a PUCCH in one slot is fixed, and only one PUCCH structure is defined in the LTE system. Therefore, when PUCCH transmission is performed in the LTE system, the PUCCH transmission can be directly realized by the defined unique PUCCH structure.

With the development and change of mobile communication service requirements, organizations such as the ITU (International Telecommunication Union) and the 3rd generation partnership project (3GPP) take up research on a new wireless communication system such as 5G NR (5 Generation New RAT (Radio Access Technology)).

Two PUCCHs, namely a long PUCCH and a short PUCCH performing transmission in one slot, are defined in the new wireless communication system. The number of resource symbols occupied by the long PUCCH in the slot is not fixed, and the PUCCH structure adopted in the system is not fixed either, so that an existing PUCCH transmission way is incapable of adapting to the new wireless communication system.

Based on the above, no related method or device supports PUCCH transmission in the new wireless communication system.

SUMMARY

Provided by the embodiments of the present application are a PUCCH transmission method, a user equipment and a device, used to solve the technical problem in the prior art wherein no related method or device supports PUCCH transmission in a new wireless communication system.

On the first aspect, provided by an embodiment of the present application is a PUCCH transmission method including:

determining the number A of symbols occupied by a PUCCH, the number A being a positive integer;

determining a PUCCH structure set that is defined in correspondence to the number A of the symbols, a PUCCH structure included in the PUCCH structure set including the number A of symbol locations, the PUCCH structure set including one or more PUCCH structures, and when multiple PUCCH structures are included, the number of symbol locations used for transmitting RS in different PUCCH structures being different, wherein a PUCCH structure is a distribution rule for symbol locations used for transmitting uplink control information (UCI) and symbol locations used for transmitting RS; and determining a PUCCH structure corresponding to the PUCCH from the PUCCH structure set, and performing PUCCH transmission on the basis of the corresponding PUCCH structure.

In one possible implementation, when the PUCCH structure set includes one PUCCH structure the determining a PUCCH structure corresponding to the PUCCH from the PUCCH structure set includes: taking the one PUCCH structure included in the PUCCH structure set as the corresponding PUCCH structure; or when the PUCCH structure set includes multiple PUCCH structures, the determining a PUCCH structure corresponding to the PUCCH from the PUCCH structure set includes:

selecting a PUCCH structure as the corresponding PUCCH structure from the PUCCH structure set according to an acquired configuration instruction; and/or selecting a PUCCH structure with most symbol locations used for transmitting RS as the corresponding PUCCH structure from the PUCCH structure set when it is determined that frequency hopping is performed during PUCCH transmission.

In one possible implementation, the PUCCH structure set including one or more PUCCH structures includes:

when the value of the number A of the symbols is X1 to X2, for each number A of the symbols within X1 to X2, defining at least two PUCCH structures in the PUCCH structure set;

when the value of the number A of the symbols is (X2+1) to X4, for each number A of the symbols within (X2+1) to X4, defining one PUCCH structure in the PUCCH structure set; or when the value of the number A of the symbols is X1 to X2 and X3 to X4, for each number A of the symbols within X1 to X2 and X3 to X4, defining at least two PUCCH structures in the PUCCH structure set; when the value of the number A of the symbols is (X2+1) to (X3−1), for each number A of the symbols within (X2+1) to (X3−1), defining one PUCCH structure in the PUCCH structure set; or with regard to the value of each number A of the symbols supported by the PUCCH, defining at least two PUCCH structures in the PUCCH structure set; or with regard to the value of each number A of the symbols supported by the PUCCH, defining one PUCCH structure in the PUCCH structure set;

wherein X1, X2, X3 and X4 are positive integers, and $X1<X2<X3<X4$.

In one possible implementation, when it is determined that frequency hopping is performed during PUCCH transmission, the determining a PUCCH structure corresponding to the PUCCH from the PUCCH structure set, and performing PUCCH transmission on the basis of the corresponding PUCCH structure, include:

respectively transmitting information carried in a first symbol group and information carried in a second symbol group at different frequency domain positions by taking first $$\left\lfloor \frac{A}{2} \right\rfloor$$

symbols included by the PUCCH as the first symbol group and last $$\left(A-\left\lfloor\frac{A}{2}\right\rfloor\right)$$

symbols included by the PUCCH as the second symbol group; or respectively transmitting information carried in a first symbol group and information carried in a second symbol group at different frequency domain positions by taking first $$\left\lceil\frac{A}{2}\right\rceil$$

symbols included by the PUCCH as the first symbol group and last $$\left(A-\left\lceil\frac{A}{2}\right\rceil\right)$$

symbols included by the PUCCH as the second symbol group.

In one possible implementation, when the number A is 4:

the PUCCH structure set includes one PUCCH structure, and the PUCCH structure included in the PUCCH structure set includes one symbol location used for transmitting RS and is one of the following PUCCH structures: URUU, UURU and RUUU; or the PUCCH structure set includes one PUCCH structure, and the PUCCH structure included in the PUCCH structure set includes two symbol locations used for transmitting RS and is one of the following PUCCH structures: URRU, RURU, RUUR and URUR; or the PUCCH structure set includes two PUCCH structures, wherein a first PUCCH structure includes one symbol location used for transmitting RS and is one of the following PUCCH structures: URUU, UURU and RUUU; and a second PUCCH structure includes two symbol locations used for transmitting RS and is one of the following PUCCH structures: URRU, RURU, RUUR and URUR;

wherein in the PUCCH structure, U represents a symbol location used for transmitting UCI, and R represents a symbol location used for transmitting RS.

In one possible implementation, when the number A is 5:

the PUCCH structure set includes one PUCCH structure, and the PUCCH structure included in the PUCCH structure set includes one symbol location used for transmitting RS and is one of the following PUCCH structures: UURUU, URUUU and RUUUU; or the PUCCH structure set includes one PUCCH structure, and the PUCCH structure included in the PUCCH structure set includes two symbol locations used for transmitting RS and is one of the following PUCCH structures: URRUU, UURRU, RUURU, RURUU and URURU; or the PUCCH structure set includes two PUCCH structures, wherein a first PUCCH structure includes one symbol location used for transmitting RS and is one of the following PUCCH structures: UURUU, URUUU and RUUUU; and a second PUCCH structure includes two symbol locations used for transmitting RS and is one of the following PUCCH structures: URRUU, UURRU, RUURU, RURUU and URURU;

wherein in the PUCCH structure, U represents a symbol location used for transmitting UCI, and R represents a symbol location used for transmitting RS.

In one possible implementation, when the number A is 6:

the PUCCH structure set includes one PUCCH structure, and the PUCCH structure included in the PUCCH structure set includes one symbol location used for transmitting RS and is one of the following PUCCH structures: URUUUU, UURUUU, UUURUU and RUUUUU; or the PUCCH structure set includes one PUCCH structure, and the PUCCH structure included in the PUCCH structure set includes two symbol locations used for transmitting RS and is one of the following PUCCH structures: URURUU, URUURU, RUUUUR, URUUUR, RUUURU and UURRUU; or the PUCCH structure set includes two PUCCH structures, wherein a first PUCCH structure includes one symbol location used for transmitting RS and is one of the following PUCCH structures: URUUUU, UURUUU, UUURUU and RUUUUU; and a second PUCCH structure includes two symbol locations used for transmitting RS and is one of the following PUCCH structures: URURUU, URUURU, RUUUUR, URUUUR, RUUURU and UURRUU;

wherein in the PUCCH structure, U represents a symbol location used for transmitting UCI, and R represents a symbol location used for transmitting RS.

In one possible implementation, when the number A is 7:

the PUCCH structure set includes one PUCCH structure, and the PUCCH structure included in the PUCCH structure set includes one symbol location used for transmitting RS and is one of the following PUCCH structures: URUUUUU, UURUUUU, UUURUUU and RUUUUUU; or the PUCCH structure set includes one PUCCH structure, and the PUCCH structure included in the PUCCH structure set includes two symbol locations used for transmitting RS and is one of the following PUCCH structures: RUUUUUR, URUUUUR, RUUUURU, URUUURU, URUURUU, UURURUU, UURRUUU and UUURRUU; or the PUCCH structure set includes two PUCCH structures, wherein a first PUCCH structure includes one symbol location used for transmitting RS and is one of the following PUCCH structures: URUUUUU, UURUUUU, UUURUUU and RUUUUUU; and a second PUCCH structure includes two symbol locations used for transmitting RS and is one of the following PUCCH structures: RUUUUUR, URUUUUR, RUUUURU, URUUURU, URUURUU, UURURUU, UURRUUU and UUURRUU;

wherein in the PUCCH structure, U represents a symbol location used for transmitting UCI, and R represents a symbol location used for transmitting RS.

In one possible implementation, when the number A is 8:

the PUCCH structure set includes one PUCCH structure, and the PUCCH structure included in the PUCCH structure set includes two symbol locations used for transmitting RS and is one of the following PUCCH structures: URUUUURU, URUUURUU, RUUUUUUR, RUUUUURU, RUUUURUU, RUUURUUU, UUURRUUU and UURUURUU; or the PUCCH structure set includes one PUCCH structure, and the PUCCH structure included in the PUCCH structure set includes three or four symbol locations used for transmitting RS and is one of the following PUCCH structures: URRUURRU, URURURUR, RURURURU, RUURRUUR, RURUURUR, RUURUURU, RUURUUUR, RUUURUUR, URURUURU and URURURUU; or the PUCCH structure set includes two PUCCH structures, wherein a first PUCCH structure includes one or two symbol locations used for transmitting RS and is one of the following PUCCH structures: URUUUURU, URUUURUU, RUUUUUUR, RUUUUURU, RUUUURUU, RUUU- RUUU, UUURRUUU, UURUURUU, UUURUUUU and RUUUUUUU; and a second PUCCH structure includes three or four symbol locations used for transmitting RS and is one of the following PUCCH structures: URRUURRU, URURURUR, RURURURU, RURUURUR, RUURRUUR, RUURUURU, RUURUUUR, RUUURUUR, URURUURU and URURURUU;

wherein in the PUCCH structure, U represents a symbol location used for transmitting UCI, and R represents a symbol location used for transmitting RS.

In one possible implementation, when the number A is 9:

the PUCCH structure set includes one PUCCH structure, and the PUCCH structure included in the PUCCH structure set includes two symbol locations used for transmitting RS and is one of the following PUCCH structures: UURUUURUU, URUUUURUU, URUUUUURU, URUUURUUU, RUUURUUUU, RUUUUUUR, RUUUUURUU, RUUUUUURU, RUUUURUUU, UURUUUURU, UUURRUUUU and UUURRUUUU; or the PUCCH structure set includes one PUCCH structure, and the PUCCH structure included in the PUCCH structure set includes three or four symbol locations used for transmitting RS and is one of the following PUCCH structures: URURURURU, URRUURRUU, URRUUURRU, RUURRUURU, RUURRUUUR, RUUURRUUR, RUURURUUR, RURUURUUR, URURURUUR, RUUURUUUR, URUURUURU and URUUURURU; or the PUCCH structure set includes two PUCCH structures, wherein a first PUCCH structure includes one or two symbol locations used for transmitting RS and is one of the following PUCCH structures: UURUUURUU, URUUUURUU, URUUUUURU, URUUURUUU, RUUURUUUU, RUUUUUUUR, RUUUUURUU, RUUUUUURU, RUUUURUUU, UURUUUURU, UUUURRUUU, UUURRUUUU, RUUUUUUUU and UUUURUUUU; and a second PUCCH structure includes three or four symbol locations used for transmitting RS and is one of the following PUCCH structures: URURURURU, URRUURRUU, URRUUURRU, RUURRUURU, RUURRUUUR, RUUURRUUR, RUURURUUR, RURUURUUR, URURURUUR, RUUURUUUR, URUURUURU and URUUURURU;

wherein in the PUCCH structure, U represents a symbol location used for transmitting UCI, and R represents a symbol location used for transmitting RS.

In one possible implementation, when the number A is 10:

the PUCCH structure set includes one PUCCH structure, and the PUCCH structure included in the PUCCH structure set includes two symbol locations used for transmitting RS and is one of the following PUCCH structures: UURUUUURUU, URUUUURUUU, URUUUUUURU, RUUUURUUUU, UURUUURUUU, URUUURUUUU, URUUUUURUU, RUUUUUUUUR, RUUUUUURUU, RUUUUURUUU and UUUURRUUUU; or the PUCCH structure set includes one PUCCH structure, and the PUCCH structure included in the PUCCH structure set includes three or four symbol locations used for transmitting RS and is one of the following PUCCH structures: URURURURUU, URURUURURU, URUURRUURU, URRUUUURRU, UURRUURRUU, RUURUURUUR, RUUURRUUUR, URURURUURU, RUUURUUURU, RUUURUUUUR, URUURUURUU and URUUURUUUR; or the PUCCH structure set includes two PUCCH structures, wherein a first PUCCH structure includes one or two symbol locations used for transmitting RS and is one of the following PUCCH structures: UURUUUURUU, URUUUURUUU, URUUUUUUURU, RUUUURUUUU, UURUUURUUU, URUUURUUUU, URUUUUUURUU, RUUUUUUUUR, RUUUUUURUU, RUUUUURUUU, UUUURRUUUU, RUUUUUUUUU and UUUURUUUUU; and a second PUCCH structure includes three or four symbol locations used for transmitting RS and is one of the following PUCCH structures: URURURURUU, URURUURURU, URUURRUURU, URRUUUURRU, UURRUURRUU, RUURUURUUR, RUUURRUUUR, URURURUURU, RUUURUUURU, RUUURUUUUR, URUURUURUU and URUUURUUUR;

wherein in the PUCCH structure, U represents a symbol location used for transmitting UCI, and R represents a symbol location used for transmitting RS.

In one possible implementation, when the number A is 11:

the PUCCH structure set includes one PUCCH structure, and the PUCCH structure included in the PUCCH structure set includes two symbol locations used for transmitting RS and is one of the following PUCCH structures: UURUUUURUUU, UURUUUUURUU, URUUUUURUUU, URUUUUUUURU, RUUUURUUUUU, RUUUUURUUUU, UUURUUURUUU, URUUURUUUU, RUUUUUUUURU, URUUUUUUUUR, URUUUUUURUU, UUUURRUUUUU and RUUUUUUUUUR; or the PUCCH structure set includes one PUCCH structure, and the PUCCH structure included in the PUCCH structure set includes three or four symbol locations used for transmitting RS and is one of the following PUCCH structures: UURURURURUU, URURUURURUU, URURUURUURU, URURUUURURU, URUURURUURU, URRUUUUURRU, URRUUUURRUU, UURRUUURRUU, RUURUUURUUR, RUUURURUUUR, RUUURRUUUUR, RUUUURRUUUR, URUUURUUURU, RUUUURUUUUR, UURUURUURUU and URUUURUUURU; or the PUCCH structure set includes two PUCCH structures, wherein a first PUCCH structure includes one or two symbol locations used for transmitting RS and is one of the following PUCCH structures: UURUUUURUUU, UURUUUUURUU, URUUUUURUUU, URUUUUUUURU, RUUUURUUUUU, RUUUUURUUUU, UURUUURUUU, URUUURUUUU, RUUUUUUUURU, URUUUUUUUUR, URUUUUUURUU, UUUURRUUUUU, RUUUUUUUUUR, RUUUUUUUUUU and UUUUURUUUUU; and a second PUCCH structure includes three or four symbol locations used for transmitting RS and is one of the following PUCCH structures: UURURURURUU, URURUURURUU, URURUURUURU, URURUURURU, URUURURUURU, URRUUUUURRU, URRUUUURRUU, UURRUUURRUU, RUURUUURUUR, RUUURURUUUR, RUUURRUUUUR, RUUUURRUUUR, URUUURUUURU, RUUUURUUUUR, UURUURUURUU and URUUURUUURU;

wherein in the PUCCH structure, U represents a symbol location used for transmitting UCI, and R represents a symbol location used for transmitting RS.

In one possible implementation, when the number A is 12:

the PUCCH structure set includes one PUCCH structure, and the PUCCH structure included in the PUCCH structure set includes two symbol locations used for transmitting RS and is one of the following PUCCH structures: UUURUUUURUUU, UURUUUUUURUU, UURUUUUURUUU, URUUUUUUUURU, RUUUUURUUUUU, UURUUURUUUU, UUUUURRUUUUU and RUUUUUUUUUUR; or the PUCCH structure set includes one PUCCH structure, and the PUCCH structure included in the PUCCH structure set includes three or four symbol locations used for transmitting RS and is one of the following PUCCH structures: UURURUURURUU, URUURUURUURU, URURUUURURUU, URURUUUURURU, UURRUUUURRUU, UURRUUURRUUU, RUURUUUURUUR, RUUURUURUUUR, RUUUURRUUUUR, RUUURURUUURU, URUUURUUURUU, URUUURUUUURU, URUUUURUUURU, RUUUURUUUURU, RUUUUURUUUUR, RUUUURUUUUUR, UURUURUUURUU, UURUUURUURUU and UURUURUURUUU; or the PUCCH structure set includes two PUCCH structures, wherein a first PUCCH structure includes one or two symbol locations used for transmitting RS and is one of the following PUCCH structures: UUURUUUURUUU, UURUUUUURUU, UURUUUUURUUU, URUUUUUUUURU, RUUUUURUUUUU, UURUUURUUUU, UUUUURRUUUUU, RUUUUUUUUUUR, RUUUUUUUUUUU and UUUUURUUUUUU; and a second PUCCH structure includes three or four symbol locations used for transmitting RS and is one of the following PUCCH structures: UURURUURURUU, URUURUURUURU, URURUUURURUU, URURUUUURURU, UURRUUUURRUU, UURRUUURRUUU, RUURUUUURUUR, RUUURUURUUUR, RUUUURRUUUUR, RUUURURUUURU, URUUURUUURUU, URUUURUUUURU, URUUUURUUURU, RUUUURUUUURU, RUUUUURUUUUR, RUUUURUUUUUR, UURUURUUURUU, UURUUURUURUU and UURUURUURUUU;

wherein in the PUCCH structure, U represents a symbol location used for transmitting UCI, and R represents a symbol location used for transmitting RS.

In one possible implementation, when the number A is 13:

the PUCCH structure set includes one PUCCH structure, and the PUCCH structure included in the PUCCH structure set includes two symbol locations used for transmitting RS and is one of the following PUCCH structures: UURUUUUUUURUU, UUURUUUUURUUU, URUUUUUUUUURU, RUUUUURUUUUUU, RUUUUUURUUUUU, UURUUUUUURUUU, UUUUURRUUUUUU and RUUUUUUUUUUUR; or the PUCCH structure set includes one PUCCH structure, and the PUCCH structure included in the PUCCH structure set includes three or four symbol locations used for transmitting RS and is one of the following PUCCH structures: UURURUUURURUU, URUURUUURUURU, URURUUUUURURU, URUURUURUURUU, URUURUURUUURU, UURRUUUUURRUU, UUURRUUURRUUU, RUURUURUURUUU, RUURUUUUURUUR, RUUURUURUUUR, RUUUURRUUUUUR, URUUURURUUURU, RUUURUURUUURU, UURUUURUUURUU, URUUUURUUUURU, RUUUUURUUUUUR, UUURUURUURUUU and UURUUUURUURUU; or the PUCCH structure set includes two PUCCH structures, wherein a first PUCCH structure includes one or two symbol locations used for transmitting RS and is one of the following PUCCH structures: UURUUUUUUURUU, UUURUUUUURUUU, URUUUUUUUUURU, RUUUURUUUUU, RUUUUUURUUUUU, UURUUUUUURUUU, UUUUURRUUUUUU, RUUUUUUUUUUUR, RUUUUUUUUUUUU and UUUUUURUUUUUU; and a second PUCCH structure includes three or four symbol locations used for transmitting RS and is one of the following PUCCH structures: UURURUUURURUU, URUURUURUURU, URURUUUUURURU, URUURUURUURUU, URUURUURUUURU, UURRUUUUURRUU, UUURRUUURRUUU, RUURUURUURUUU, RUURUUUUURUUR, RUUURUURUUUR, RUUUURRUUUUR, URUUURURUUURU, RUUURUURUUURU, UURUUURUUURUU, URUUUURUUUURU, RUUUUURUUUUUR, RUUUUUURUUUUUR and UURUUUURUURUU;

wherein in the PUCCH structure, U represents a symbol location used for transmitting UCI, and R represents a symbol location used for transmitting RS.

In one possible implementation, when the number A is 14:

the PUCCH structure set includes one PUCCH structure, and the PUCCH structure included in the PUCCH structure set includes two symbol locations used for transmitting RS and is one of the following PUCCH structures: UURUUUUUUURUU, UUUURUUUURUUUU, URUUUUUUUUUURU, RUUUUUURUUUUUU, UUURUUUUURUUU, UUUUUURRUUUUUU and RUUUUUUUUUUUUR; or the PUCCH structure set includes one PUCCH structure, and the PUCCH structure included in the PUCCH structure set includes three or four symbol locations used for transmitting RS and is one of the following PUCCH structures: URUUURUURUUURU, UURURUUUURURUU, URUURUUUURUURU, URUURUUURUURUU, URURUUUUUURURU, UURUURUURUURUU, UURRUUUUUURRUU, UUURRUUUURRUUU, RUURUUURUURUUU, RUURUUUUUURUUR, RUUURUUUURUUUR, RUUUUURRUUUUUR, UURUURUUURUURU, URUUUURUUUURUU, URUUUURUUUURU, URUUUUURUUUURU, RUUUUURUUUUUR, RUUUUUURUUUUUR, RUUUUURUUUUURU, URUUUUURUUUUUR, UUURUUURUURUUU, UUURUURUUURUUU, UURUUURUUURUUU and UURUUUURUUURUU; or the PUCCH structure set includes two PUCCH structures, wherein a first PUCCH structure includes one or two symbol locations used for transmitting RS and is one of the following PUCCH structures: UURUUUUUUUURUU, UUUURUUURUUUU, URUUUUUUUUUURU, RUUUUURUUUUUU, UUURUUUUUURUUU, UUUUUURRUUUUUU, RUUUUUUUUUUUUR, RUUUUUUUUUUUUU and UUUUUURUUUUUUU; and a second PUCCH structure includes three or four symbol locations used for transmitting RS and is one of the following PUCCH structures: URUUURUURUUURU, UURURUUURURUU, URUURUUUURUURU, URUURUUURUURUU, URURUUUUUURURU, UURUURUURUURUU, UURRUUUUUURRUU, UUURRUUUURRUUU, RUURUUURUURUUU, RUURUUUUURUUR, RUUURUUUURUUUR, RUUUURRUUUUR, UURUURUUURUURU, URUUURUUUURUU, URUUUURUUUUURU, URUUUURUUUURU, RUUUUURUUUUUR, RUUUUUURUUUUUR, RUUUUURUUUUURU, URUUUURUUUUUR, UUURUURUURUUU, UUURUURUUURUUU, UURUUURUUURUUU and UURUUUURUUURUU;

wherein in the PUCCH structure, U represents a symbol location used for transmitting UCI, and R represents a symbol location used for transmitting RS.

On the second aspect, provided by an embodiment of the present application is another PUCCH transmission method including:

determining the number A of symbols occupied by a PUCCH, the number A being a positive integer;

determining a PUCCH structure set that is defined in correspondence to the number A of the symbols, a PUCCH structure included in the PUCCH structure set including the number A of symbol locations, the PUCCH structure set including one or more PUCCH structures, and when multiple PUCCH structures are included, the number of symbol locations used for transmitting RS in different PUCCH structures being different, wherein a PUCCH structure is a distribution rule for symbol locations used for transmitting uplink control information (UCI) and symbol locations used for transmitting RS; and determining a PUCCH structure corresponding to the PUCCH from the PUCCH structure set, and performing PUCCH reception on the basis of the corresponding PUCCH structure.

In one possible implementation, when the PUCCH structure set includes one PUCCH structure, the determining a PUCCH structure corresponding to the PUCCH from the PUCCH structure set includes: taking the one PUCCH structure included in the PUCCH structure set as the corresponding PUCCH structure; or when the PUCCH structure set includes multiple PUCCH structures, the determining a PUCCH structure corresponding to the PUCCH from the PUCCH structure set includes:

selecting a PUCCH structure as the corresponding PUCCH structure from the PUCCH structure set, and informing a terminal of a selection result through a configuration instruction; and/or selecting a PUCCH structure with most symbol locations used for transmitting RS as the corresponding PUCCH structure from the PUCCH structure set when it is determined that frequency hopping is performed during PUCCH transmission, and informing a terminal of a demand for frequency hopping through a configuration instruction.

In one possible implementation, the PUCCH structure set including one or more PUCCH structures includes:

when the value of the number A of the symbols is X1 to X2, for each number A of the symbols within X1 to X2, defining at least two PUCCH structures in the PUCCH structure set; when the value of the number A of the symbols is (X2+1) to X4, for each number A of the symbols within (X2+1) to X4, defining one PUCCH structure in the PUCCH structure set; or when the value of the number A of the symbols is X1 to X2 and X3 to X4, for each number A of the symbols within X1 to X2 and X3 to X4, defining at least two PUCCH structures in the PUCCH structure set; when the value of the number A of the symbols is (X2+1) to (X3−1), for each number A of the symbols within (X2+1) to (X3−1), defining one PUCCH structure in the PUCCH structure set; or with regard to the value of each number A of the symbols supported by the PUCCH, defining at least two PUCCH structures in the PUCCH structure set; or with regard to the value of each number A of the symbols supported by the PUCCH, defining one PUCCH structure in the PUCCH structure set;

wherein X1, X2, X3 and X4 are positive integers, and X1<X2<X3<X4.

In one possible implementation, when it is determined that frequency hopping is performed during PUCCH transmission, the determining a PUCCH structure corresponding to the PUCCH from the PUCCH structure set, and performing PUCCH reception on the basis of the corresponding PUCCH structure, include:

respectively receiving information carried in a first symbol group and information carried in a second symbol group at different frequency domain positions by taking first $$\left\lfloor \frac{A}{2} \right\rfloor$$

symbols included by the PUCCH as the first symbol group and last $$\left(A - \left\lfloor \frac{A}{2} \right\rfloor\right)$$

symbols included by the PUCCH as the second symbol group; or respectively receiving information carried in a first symbol group and information carried in a second symbol group at different frequency domain positions by taking first $$\left\lceil \frac{A}{2} \right\rceil$$

symbols included by the PUCCH as the first symbol group and last $$\left(A - \left\lceil \frac{A}{2} \right\rceil\right)$$

symbols included by the PUCCH as the second symbol group.

In one possible implementation, when the number A is 4:

the PUCCH structure set includes one PUCCH structure, and the PUCCH structure included in the PUCCH structure set includes one symbol location used for transmitting RS and is one of the following PUCCH structures: URUU, UURU and RUUU; or the PUCCH structure set includes one PUCCH structure, and the PUCCH structure included in the PUCCH structure set includes two symbol locations used for transmitting RS and is one of the following PUCCH structures: URRU, RURU, RUUR and URUR; or the PUCCH structure set includes two PUCCH structures, wherein a first PUCCH structure includes one symbol location used for transmitting RS and is one of the following PUCCH structures: URUU, UURU and RUUU; and a second PUCCH structure includes two symbol locations used for transmitting RS and is one of the following PUCCH structures: URRU, RURU, RUUR and URUR;

wherein in the PUCCH structure, U represents a symbol location used for transmitting UCI, and R represents a symbol location used for transmitting RS.

In one possible implementation, when the number A is 5:

the PUCCH structure set includes one PUCCH structure, and the PUCCH structure included in the PUCCH structure set includes one symbol location used for transmitting RS and is one of the following PUCCH structures: UURUU, URUUU and RUUUU; or the PUCCH structure set includes one PUCCH structure, and the PUCCH structure included in the PUCCH structure set includes two symbol locations used for transmitting RS and is one of the following PUCCH structures: URRUU, UURRU, RUURU, RURUU and URURU; or the PUCCH structure set includes two PUCCH structures, wherein a first PUCCH structure includes one symbol location used for transmitting RS and is one of the following PUCCH structures: UURUU, URUUU and RUUUU; and a second PUCCH structure includes two symbol locations used for transmitting RS and is one of the following PUCCH structures: URRUU, UURRU, RUURU, RURUU and URURU;

wherein in the PUCCH structure, U represents a symbol location used for transmitting UCI, and R represents a symbol location used for transmitting RS.

In one possible implementation, when the number A is 6:

the PUCCH structure set includes one PUCCH structure, and the PUCCH structure included in the PUCCH structure set includes one symbol location used for transmitting RS and is one of the following PUCCH structures: URUUUU, UURUUU, UUURUU and RUUUUU; or the PUCCH structure set includes one PUCCH structure, and the PUCCH structure included in the PUCCH structure set includes two symbol locations used for transmitting RS and is one of the following PUCCH structures: URURUU, URUURU, RUUUUR, URUUUR, RUUURU and UURRUU; or the PUCCH structure set includes two PUCCH structures, wherein a first PUCCH structure includes one symbol location used for transmitting RS and is one of the following PUCCH structures: URUUUU, UURUUU, UUURUU and RUUUUU; and a second PUCCH structure includes two symbol locations used for transmitting RS and is one of the following PUCCH structures: URURUU, URUURU, RUUUUR, URUUUR, RUUURU and UURRUU;

wherein in the PUCCH structure, U represents a symbol location used for transmitting UCI, and R represents a symbol location used for transmitting RS.

In one possible implementation, when the number A is 7:

the PUCCH structure set includes one PUCCH structure, and the PUCCH structure included in the PUCCH structure set includes one symbol location used for transmitting RS and is one of the following PUCCH structures: URUUUUU, UURUUUU, UUURUUU and RUUUUUU; or the PUCCH structure set includes one PUCCH structure, and the PUCCH structure included in the PUCCH structure set includes two symbol locations used for transmitting RS and is one of the following PUCCH structures: RUUUUUR, URUUUUR, RUUUURU, URUUURU, URUURUU, UURURUU, UURRUUU and UUURRUU; or the PUCCH structure set includes two PUCCH structures, wherein a first PUCCH structure includes one symbol location used for transmitting RS and is one of the following PUCCH structures: URUUUUU, UURUUUU, UUURUUU and RUUUUUU; and a second PUCCH structure includes two symbol locations used for transmitting RS and is one of the following PUCCH structures: RUUUUUR, URUUUUR, RUUUURU, URUUURU, URUURUU, UURURUU, UURRUUU and UUURRUU;

wherein in the PUCCH structure, U represents a symbol location used for transmitting UCI, and R represents a symbol location used for transmitting RS.

In one possible implementation, when the number A is 8:

the PUCCH structure set includes one PUCCH structure, and the PUCCH structure included in the PUCCH structure set includes two symbol locations used for transmitting RS and is one of the following PUCCH structures: URUUUURU, URUUURUU, RUUUUUUR, RUUUUURU, RUUUURUU, RUUURUUU, UUURRUUU and UURUURUU; or the PUCCH structure set includes one PUCCH structure, and the PUCCH structure included in the PUCCH structure set includes three or four symbol locations used for transmitting RS and is one of the following PUCCH structures: URRUURRU, URURURUR, RURURURU, RUURRUUR, RURUURUR, RUURUURU, RUURUUUR, RUUURUUR, URURUURU and URURURUU; or the PUCCH structure set includes two PUCCH structures, wherein a first PUCCH structure includes one or two symbol locations used for transmitting RS and is one of the following PUCCH structures: URUUUURU, URUUURUU, RUUUUUUR, RUUUUURU, RUUUURUU, RUUURUUU, UUURRUUU, UURUURUU, UUURUUUU and RUUUUUUU; and a second PUCCH structure includes three or four symbol locations used for transmitting RS and is one of the following PUCCH structures: URRUURRU, URURURUR, RURURURU, RURUURUR, RUURRUUR, RUURUURU, RUURUUUR, RUUURUUR, URURUURU and URURURUU;

wherein in the PUCCH structure, U represents a symbol location used for transmitting UCI, and R represents a symbol location used for transmitting RS.

In one possible implementation, when the number A is 9:

the PUCCH structure set includes one PUCCH structure, and the PUCCH structure included in the PUCCH structure set includes two symbol locations used for transmitting RS and is one of the following PUCCH structures: UURUUURUU, URUUUURUU, URUUUUURU, URUUURUUU, RUUURUUUU, RUUUUUUUR, RUUUUURUU, RUUUUUURU, RUUUURUUU, UURUUUURU, UUUURRUUU and UUURRUUUU; or the PUCCH structure set includes one PUCCH structure, and the PUCCH structure included in the PUCCH structure set includes three or four symbol locations used for transmitting RS and is one of the following PUCCH structures: URURURURU, URRUURRUU, URRUUURRU, RUURRUURU, RUURRUUUR, RUUURRUUR, RUURURUUR, RURUURUUR, URURURUUR, RUUURUUUR, URUURUURU and URUUURURU; or the PUCCH structure set includes two PUCCH structures, wherein a first PUCCH structure includes one or two symbol locations used for transmitting RS and is one of the following PUCCH structures: UURUUURUU, URUUUURUU, URUUUUURU, URUUURUUU, RUUURUUUU, RUUUUUUUR, RUUUUURUU, RUUUUUURU, RUUUURUUU, UURUUUURU, UUUURRUUU, UUURRUUUU, RUUUUUUUU and UUUURUUUU; and a second PUCCH structure includes three or four symbol locations used for transmitting RS and is one of the following PUCCH structures: URURURURU, URRUURRUU, URRUUURRU, RUURRUURU, RUURRUUUR, RUUURRUUR, RUURURUUR, RURUURUUR, URURURUUR, RUUURUUUR, URUURUURU and URUUURURU;

wherein in the PUCCH structure, U represents a symbol location used for transmitting UCI, and R represents a symbol location used for transmitting RS.

In one possible implementation, when the number A is 10:

the PUCCH structure set includes one PUCCH structure, and the PUCCH structure included in the PUCCH structure set includes two symbol locations used for transmitting RS and is one of the following PUCCH structures: UURUUUURUU, URUUUURUUU, URUUUUUURU, RUUUURUUUU, UURUUURUUU, URUUURUUUU, URUUUUURUU, RUUUUUUUUR, RUUUUUURUU, RUUUUURUUU and UUUURRUUUU; or the PUCCH structure set includes one PUCCH structure, and the PUCCH structure included in the PUCCH structure set includes three or four symbol locations used for transmitting RS and is one of the following PUCCH structures: URURURURUU, URURUURURU, URUURRUURU, URRUUUURRU, UURRUURRUU, RUURUURUUR, RUUURRUUUR, URURURUURU, RUUURUUURU, RUUURUUUUR, URUURUURUU and URUUURUUUR; or the PUCCH structure set includes two PUCCH structures, wherein a first PUCCH structure includes one or two symbol locations used for transmitting RS and is one of the following PUCCH structures: UURUUUURUU, URUUUU-RUUU, URUUUUUURU, RUUUURUUUU, UURUUU-RUUU, URUUURUUUU, URUUUUURUU, RUUUUUUUUR, RUUUUUURUU, RUUUUURUUU, UUUURRUUUU, RUUUUUUUUU and UUUURU-UUUU; and a second PUCCH structure includes three or four symbol locations used for transmitting RS and is one of the following PUCCH structures: URURURURUU, URU-RUURURU, URUURRUURU, URRUUUURRU, UUR-RUURRUU, RUURUURUUR, RUUURRUUUR, URU-RURUURU, RUUURUUURU, RUUURUUUUR, URUURUURUU and URUUURUUUR;

wherein in the PUCCH structure, U represents a symbol location used for transmitting UCI, and R represents a symbol location used for transmitting RS.

In one possible implementation, when the number A is 11:

the PUCCH structure set includes one PUCCH structure, and the PUCCH structure included in the PUCCH structure set includes two symbol locations used for transmitting RS and is one of the following PUCCH structures: UURUUUU-RUUU, UURUUUUURUU, URUUUUURUUU, URU-UUUUUURU, RUUUURUUUUU, RUUUUURUUUU, UUURUUURUUU, URUUURUUUU, RUUUUUUUURU, URUUUUUUUUR, URUUUUUURUU, UUUURRU-UUUU and RUUUUUUUUUR; or the PUCCH structure set includes one PUCCH structure, and the PUCCH structure included in the PUCCH structure set includes three or four symbol locations used for transmitting RS and is one of the following PUCCH structures: UURURURURUU, URURUURURUU, URURUU-RUURU, URURUUURURU, URUURURUURU, URRU-UUUURRU, URRUUUURRUU, UURRUUURRUU, RUURUUURUUR, RUUURURUUUR, RUUURRU-UUUR, RUUUURRUUUR, URUUURUUURU, RUUUU-RUUUUR, UURUURUURUU and URUUURUUURU; or the PUCCH structure set includes two PUCCH structures, wherein a first PUCCH structure includes one or two symbol locations used for transmitting RS and is one of the following PUCCH structures: UURUUUURUUU, UURUUUUU-RUU, URUUUUURUUU, URUUUUUUURU, RUUUU-RUUUUU, RUUUUURUUUU, UUURUUURUUU, URUUURUUUU, RUUUUUUUURU, URUUUUUUUUR, URUUUUUURUU, UUUURRUUUUU, RUUUUUUUUUR, RUUUUUUUUUU and UUUUURU-UUUU; and a second PUCCH structure includes three or four symbol locations used for transmitting RS and is one of the following PUCCH structures: UURURURURUU, URURUURURUU, URURUURUURU, URURUUU-RURU, URUURURUURU, URRUUUUURRU, URRU-UUURRUU, UURRUUURRUU, RUURUUURUUR, RUUURURUUUR, RUUURRUUUUR, RUUUURRU-UUR, URUUURUUURU, RUUUURUUUUR, UURUU-RUURUU and URUUURUUURU;

wherein in the PUCCH structure, U represents a symbol location used for transmitting UCI, and R represents a symbol location used for transmitting RS.

In one possible implementation, when the number A is 12:

the PUCCH structure set includes one PUCCH structure, and the PUCCH structure included in the PUCCH structure set includes two symbol locations used for transmitting RS and is one of the following PUCCH structures: UUURU-UUURUUU, UURUUUUUURUU, UURUUUUURUUU, URUUUUUUUURU, RUUUUURUUUUU, UURUUU-RUUUU, UUUUURRUUUUU and RUUUUUUUUUUR; or the PUCCH structure set includes one PUCCH structure, and the PUCCH structure included in the PUCCH structure set includes three or four symbol locations used for transmitting RS and is one of the following PUCCH structures: UURURUURURUU, URUURUURUURU, URURUUU-RURUU, URURUUUURURU, UURRUUUURRUU, UURRUUURRUUU, RUURUUUURUUR, RUUURUU-RUUUR, RUUUURRUUUUR, RUUURURUUURU, URUUURUUURUU, URUUURUUUURU, URUUUU-RUUURU, RUUUURUUUURU, RUUUUURUUUUR, RUUUURUUUUUR, UURUURUUURUU, UURUUU-RUURUU and UURUURUURUUU; or the PUCCH structure set includes two PUCCH structures, wherein a first PUCCH structure includes one or two symbol locations used for transmitting RS and is one of the following PUCCH structures: UUURUUUURUUU, UURU-UUUUURUU, UURUUUUURUUU, URUUUUUUUURU, RUUUUURUUUUU, UURUUURUUUU, UUUUURRU-UUUU, RUUUUUUUUUUR, RUUUUUUUUUUU and UUUUURUUUUUU; and a second PUCCH structure includes three or four symbol locations used for transmitting RS and is one of the following PUCCH structures: UURU-RUURURUU, URUURUURUURU, URURUUURURUU, URURUUUURURU, UURRUUUURRUU, UURRUUUR-RUUU, RUURUUUURUUR, RUUURUURUUUR, RUUUURRUUUUR, RUUURURUUURU, URUUURU-UURUU, URUUURUUUURU, URUUUURUUURU, RUUUURUUUURU, RUUUUURUUUUR, RUUUURU-UUUUR, UURUURUUURUU, UURUUURUURUU and UURUURUURUUU;

wherein in the PUCCH structure, U represents a symbol location used for transmitting UCI, and R represents a symbol location used for transmitting RS.

In one possible implementation, when the number A is 13:

the PUCCH structure set includes one PUCCH structure, and the PUCCH structure included in the PUCCH structure set includes two symbol locations used for transmitting RS and is one of the following PUCCH structures: UURU-UUUUUURUU, UUURUUUUURUUU, URU-UUUUUUUUURU, RUUUUURUUUUUU, RUUUUUU-RUUUUU, UURUUUUUURUUU, UUUUURRUUUUUU and RUUUUUUUUUUUR; or the PUCCH structure set includes one PUCCH structure, and the PUCCH structure included in the PUCCH structure set includes three or four symbol locations used for transmitting RS and is one of the following PUCCH structures: UURURUUURURUU, URUURUUURUURU, URURU-UUUURURU, URUURUURUURUU, URUURUURUU-URU, UURRUUUUURRUU, UUURRUUURRUUU, RUURUURUURUUU, RUURUUUUURUUR, RUUURU-UURUUUR, RUUUURRUUUUUR, URUUURURUU-URU, RUUURUURUUURU, UURUUURUUURUU, URUUUURUUUURU, RUUUUURUUUUUR, UUURUU-RUURUUU and UURUUUURUURUU; or the PUCCH structure set includes two PUCCH structures, wherein a first PUCCH structure includes one or two symbol locations used for transmitting RS and is one of the following PUCCH structures: UURUUUUUUURUU, UUURU-UUUURUUU, URUUUUUUUUURU, RUUUUURU-UUUUU, RUUUUUURUUUUU, UURUUUUUURUUU, UUUUURRUUUUUU, RUUUUUUUUUUUR, RUUUUUUUUUUUU and UUUUUURUUUUUU; and a second PUCCH structure includes three or four symbol locations used for transmitting RS and is one of the followinging PUCCH structures: UURURUUURURUU, URUURUUURUURU, URURUUUUURURU, URUURUURUURUU, URUURUURUUURU, UURRUUUUURRUU, UUURRUUURRUUU, RUURUURUURUUU, RUURUUUUURUUR, RUUURUUURUUUR, RUUUURRUUUUR, URUUURURUUURU, RUUURUURUUURU, UURUUURUUURUU, URUUUURUUUURU, RUUUUURUUUUR, UUURUURUURUUU and UURUUUURUURUU;

wherein in the PUCCH structure, U represents a symbol location used for transmitting UCI, and R represents a symbol location used for transmitting RS.

In one possible implementation, when the number A is 14:

the PUCCH structure set includes one PUCCH structure, and the PUCCH structure included in the PUCCH structure set includes two symbol locations used for transmitting RS and is one of the following PUCCH structures: UURUUUUUUURUU, UUUURUUUURUUUU, URUUUUUUUUURU, RUUUUUURUUUUUU, UUURUUUUUURUUU, UUUUUURRUUUUUU and RUUUUUUUUUUUUR; or the PUCCH structure set includes one PUCCH structure, and the PUCCH structure included in the PUCCH structure set includes three or four symbol locations used for transmitting RS and is one of the following PUCCH structures: URUUURUURUUURU, UURURUUUURURUU, URUURUUURUURU, URUURUUURUURUU, URURUUUUURURU, UURUURUURUURUU, UURRUUUUURRUU, UUURRUUUURRUUU, RUURUUURUURUUU, RUURUUUUUURUUR, RUUURUUUURUUUR, RUUUUURRUUUUUR, UURUURUUURUURU, URUUUURUUUURUU, URUUUURUUUUURU, URUUUUURUUUUURU, RUUUUURUUUUUUR, RUUUUUURUUUUUR, RUUUUURUUUUUURU, URUUUUURUUUUUR, UUURUUURUURUUU, UUURUURUUURUUU, UURUUURUUURUUU and UURUUUURUUURUU; or the PUCCH structure set includes two PUCCH structures, wherein a first PUCCH structure includes one or two symbol locations used for transmitting RS and is one of the following PUCCH structures: UURUUUUUUUURUU, UUUURUUURUUUU, URUUUUUUUUUURU, RUUUUURUUUUUU, UUURUUUUUURUUU, UUUUUURRUUUUUU, RUUUUUUUUUUUUR, RUUUUUUUUUUUUU and UUUUUURUUUUUUU; and a second PUCCH structure includes three or four symbol locations used for transmitting RS and is one of the following PUCCH structures: URUUURUURUUURU, UURURUUURURUU, URUURUUURUURU, URUURUUURUURUU, URURUUUUUURURU, UURUURUURUURUU, UURRUUUUUURRUU, UUURRUUUURRUUU, RUURUUURUURUUU, RUURUUUUURUUR, RUUURUUUURUUUR, RUUUUURRUUUUR, UURUURUUURUURU, URUUUURUUUURUU, URUUUURUUUUURU, URUUUUURUUUURU, RUUUUURUUUUUUR, RUUUUUURUUUUUR, RUUUUURUUUUURU, URUUUURUUUUUR, UUURUUURUURUUU, UUURUURUUURUUU and UURUUUURUUURUU;

wherein in the PUCCH structure, U represents a symbol location used for transmitting UCI, and R represents a symbol location used for transmitting RS.

On the third aspect, provided by an embodiment of the present application is a user equipment including a processor as well as a memory and a transceiver connected with the processor; and the processor is configured for reading a program in the memory to execute the following process:

determining the number A of symbols occupied by a PUCCH, the number A being a positive integer;

determining a PUCCH structure set that is defined in correspondence to the number A of the symbols, a PUCCH structure included in the PUCCH structure set including the number A of symbol locations, the PUCCH structure set including one or more PUCCH structures, and when multiple PUCCH structures are included, the number of symbol locations used for transmitting RS in different PUCCH structures being different when multiple PUCCH structures are included, wherein a PUCCH structure is a distribution rule for symbol locations used for transmitting uplink control information (UCI) and symbol locations used for transmitting RS; and determining a PUCCH structure corresponding to the PUCCH from the PUCCH structure set, and performing PUCCH transmission through the transceiver on the basis of the corresponding PUCCH structure.

In one possible implementation, when the PUCCH structure set includes one PUCCH structure, the determining a PUCCH structure corresponding to the PUCCH from the PUCCH structure set includes: taking the one PUCCH structure included in the PUCCH structure set as the corresponding PUCCH structure; or when the PUCCH structure set includes multiple PUCCH structures, the determining a PUCCH structure corresponding to the PUCCH from the PUCCH structure set includes:

selecting a PUCCH structure as the corresponding PUCCH structure from the PUCCH structure set according to an acquired configuration instruction; and/or selecting a PUCCH structure with most symbol locations used for transmitting RS as the corresponding PUCCH structure from the PUCCH structure set when it is determined that frequency hopping is performed during PUCCH transmission.

In one possible implementation, the PUCCH structure set including one or more PUCCH structures includes:

when the value of the number A of the symbols is X1 to X2, for each number A of the symbols within X1 to X2, defining at least two PUCCH structures in the PUCCH structure set; when the value of the number A of the symbols is (X2+1) to X4, for each number A of the symbols within (X2+1) to X4, defining one PUCCH structure in the PUCCH structure set; or when the value of the number A of the symbols is X1 to X2 and X3 to X4, for each number A of the symbols within X1 to X2 and X3 to X4, defining at least two PUCCH structures in the PUCCH structure set; when the value of the number A of the symbols is (X2+1) to (X3−1), for each number A of the symbols within (X2+1) to (X3−1), defining one PUCCH structure in the PUCCH structure set; or with regard to the value of each number A of the symbols supported by the PUCCH, defining at least two PUCCH structures in the PUCCH structure set; or with regard to the value of each number A of the symbols supported by the PUCCH, defining one PUCCH structure in the PUCCH structure set;

wherein X1, X2, X3 and X4 are positive integers, and $X1<X2<X3<X4$.

In one possible implementation, when it is determined that frequency hopping is performed during PUCCH transmission, the determining a PUCCH structure corresponding to the PUCCH from the PUCCH structure set, and controlling the transceiver to perform PUCCH transmission on the basis of the corresponding PUCCH structure, include:

controlling the transceiver to respectively transmit information carried in a first symbol group and information carried in a second symbol group at different frequency domain positions by taking first $$\left\lfloor \frac{A}{2} \right\rfloor$$

symbols included by the PUCCH as the first symbol group and last $$\left(A - \left\lfloor \frac{A}{2} \right\rfloor\right)$$

symbols included by the PUCCH as the second symbol group; or controlling the transceiver to respectively transmit information carried in a first symbol group and information carried in a second symbol group at different frequency domain positions by taking first $$\left\lceil \frac{A}{2} \right\rceil$$

symbols included by the PUCCH as the first symbol group and last $$\left(A - \left\lceil \frac{A}{2} \right\rceil\right)$$

symbols included by the PUCCH as the second symbol group.

In one possible implementation, when the number A is 4:

the PUCCH structure set includes one PUCCH structure, and the PUCCH structure included in the PUCCH structure set includes one symbol location used for transmitting RS and is one of the following PUCCH structures: URUU, UURU and RUUU; or the PUCCH structure set includes one PUCCH structure, and the PUCCH structure included in the PUCCH structure set includes two symbol locations used for transmitting RS and is one of the following PUCCH structures: URRU, RURU, RUUR and URUR; or the PUCCH structure set includes two PUCCH structures, wherein a first PUCCH structure includes one symbol location used for transmitting RS and is one of the following PUCCH structures: URUU, UURU and RUUU; and a second PUCCH structure includes two symbol locations used for transmitting RS and is one of the following PUCCH structures: URRU, RURU, RUUR and URUR;

wherein in the PUCCH structure, U represents a symbol location used for transmitting UCI, and R represents a symbol location used for transmitting RS.

In one possible implementation, when the number A is 5:

the PUCCH structure set includes one PUCCH structure, and the PUCCH structure included in the PUCCH structure set includes one symbol location used for transmitting RS and is one of the following PUCCH structures: UURUU, URUUU and RUUUU; or the PUCCH structure set includes one PUCCH structure, and the PUCCH structure included in the PUCCH structure set includes two symbol locations used for transmitting RS and is one of the following PUCCH structures: URRUU, UURRU, RUURU, RURUU and URURU; or the PUCCH structure set includes two PUCCH structures, wherein a first PUCCH structure includes one symbol location used for transmitting RS and is one of the following PUCCH structures: UURUU, URUUU and RUUUU; and a second PUCCH structure includes two symbol locations used for transmitting RS and is one of the following PUCCH structures: URRUU, UURRU, RUURU, RURUU and URURU;

wherein in the PUCCH structure, U represents a symbol location used for transmitting UCI, and R represents a symbol location used for transmitting RS.

In one possible implementation, when the number A is 6:

the PUCCH structure set includes one PUCCH structure, and the PUCCH structure included in the PUCCH structure set includes one symbol location used for transmitting RS and is one of the following PUCCH structures: URUUUU, UURUUU, UUURUU and RUUUUU; or the PUCCH structure set includes one PUCCH structure, and the PUCCH structure included in the PUCCH structure set includes two symbol locations used for transmitting RS and is one of the following PUCCH structures: URURUU, URUURU, RUUUUR, URUUUR, RUUURU and UURRUU; or the PUCCH structure set includes two PUCCH structures, wherein a first PUCCH structure includes one symbol location used for transmitting RS and is one of the following PUCCH structures: URUUUU, UURUUU, UUURUU and RUUUUU; and a second PUCCH structure includes two symbol locations used for transmitting RS and is one of the following PUCCH structures: URURUU, URUURU, RUUUUR, URUUUR, RUUURU and UURRUU;

wherein in the PUCCH structure, U represents a symbol location used for transmitting UCI, and R represents a symbol location used for transmitting RS.

In one possible implementation, when the number A is 7:

the PUCCH structure set includes one PUCCH structure, and the PUCCH structure included in the PUCCH structure set includes one symbol location used for transmitting RS and is one of the following PUCCH structures: URUUUUU, UURUUUU, UUURUUU and RUUUUUU; or the PUCCH structure set includes one PUCCH structure, and the PUCCH structure included in the PUCCH structure set includes two symbol locations used for transmitting RS and is one of the following PUCCH structures: RUUUUUR, URUUUUR, RUUUURU, URUUURU, URUURUU, UURURUU, UURRUUU and UUURRUU; or the PUCCH structure set includes two PUCCH structures, wherein a first PUCCH structure includes one symbol location used for transmitting RS and is one of the following PUCCH structures: URUUUUU, UURUUUU, UUURUUU and RUUUUUU; and a second PUCCH structure includes two symbol locations used for transmitting RS and is one of the following PUCCH structures: RUUUUUR, URUUUUR, RUUUURU, URUUURU, URUURUU, UURURUU, UURRUUU and UUURRUU;

wherein in the PUCCH structure, U represents a symbol location used for transmitting UCI, and R represents a symbol location used for transmitting RS.

In one possible implementation, when the number A is 8:

the PUCCH structure set includes one PUCCH structure, and the PUCCH structure included in the PUCCH structure set includes two symbol locations used for transmitting RS and is one of the following PUCCH structures: URU- UUURU, URUUURUU, RUUUUUUR, RUUUUURU, RUUUURUU, RUUURUUU, UUURRUUU and UURUURUU; or the PUCCH structure set includes one PUCCH structure, and the PUCCH structure included in the PUCCH structure set includes three or four symbol locations used for transmitting RS and is one of the following PUCCH structures: URRUURRU, URURURUR, RURURURU, RUURRUUR, RURUURUR, RUURUURU, RUURUUUR, RUUURUUR, URURUURU and URURURUU; or the PUCCH structure set includes two PUCCH structures, wherein a first PUCCH structure includes one or two symbol locations used for transmitting RS and is one of the following PUCCH structures: URUUUURU, URUUURUU, RUUUUUUR, RUUUUURU, RUUUURUU, RUUURUUU, UUURRUUU, UURUURUU, UUURUUUU and RUUUUUUU; and a second PUCCH structure includes three or four symbol locations used for transmitting RS and is one of the following PUCCH structures: URRUURRU, URURURUR, RURURURU, RURUURUR, RUURRUUR, RUURUURU, RUURUUUR, RUUURUUR, URURUURU and URURURUU;

wherein in the PUCCH structure, U represents a symbol location used for transmitting UCI, and R represents a symbol location used for transmitting RS.

In one possible implementation, when the number A is 9:

the PUCCH structure set includes one PUCCH structure, and the PUCCH structure included in the PUCCH structure set includes two symbol locations used for transmitting RS and is one of the following PUCCH structures: UURUUURUU, URUUUURUU, URUUUUURU, URUUURUUU, RUUURUUUU, RUUUUUUUR, RUUUUURUU, RUUUUUURU, RUUUURUUU, UURUUUURU, UUUURRUUU and UUURRUUUU; or the PUCCH structure set includes one PUCCH structure, and the PUCCH structure included in the PUCCH structure set includes three or four symbol locations used for transmitting RS and is one of the following PUCCH structures: URURURURU, URRUURRUU, URRUUURRU, RUURRUURU, RUURRUUUR, RUUURRUUR, RUURURUUR, RURUURUUR, URURURUUR, RUUURUUUR, URUURUURU and URUUURURU; or the PUCCH structure set includes two PUCCH structures, wherein a first PUCCH structure includes one or two symbol locations used for transmitting RS and is one of the following PUCCH structures: UURUUURUU, URUUUURUU, URUUUUURU, URUUURUUU, RUUURUUUU, RUUUUUUUR, RUUUUURUU, RUUUUUURU, RUUUURUUU, UURUUUURU, UUUURRUUU, UUURRUUUU, RUUUUUUUU and UUUURUUUU; and a second PUCCH structure includes three or four symbol locations used for transmitting RS and is one of the following PUCCH structures: URURURURU, URRUURRUU, URRUUURRU, RUURRUURU, RUURRUUUR, RUUURRUUR, RUURURUUR, RURUURUUR, URURURUUR, RUUURUUUR, URUURUURU and URUUURURU;

wherein in the PUCCH structure, U represents a symbol location used for transmitting UCI, and R represents a symbol location used for transmitting RS.

In one possible implementation, when the number A is 10:

the PUCCH structure set includes one PUCCH structure, and the PUCCH structure included in the PUCCH structure set includes two symbol locations used for transmitting RS and is one of the following PUCCH structures: UURUUUURUU, URUUUURUUU, URUUUUUURU, RUUUURUUUU, UURUUURUUU, URUUURUUUU, URUUUUURUU, RUUUUUUUUR, RUUUUUURUU, RUUUUURUUU and UUUURRUUUU; or the PUCCH structure set includes one PUCCH structure, and the PUCCH structure included in the PUCCH structure set includes three or four symbol locations used for transmitting RS and is one of the following PUCCH structures: URURURURUU, URURUURURU, URUURRUURU, URRUUUURRU, UURRUURRUU, RUURUURUUR, RUUURRUUUR, URURURUURU, RUUURUUURU, RUUURUUUUR, URUURUURUU and URUUURUUUR; or the PUCCH structure set includes two PUCCH structures, wherein a first PUCCH structure includes one or two symbol locations used for transmitting RS and is one of the following PUCCH structures: UURUUUURUU, URUUUURUUU, URUUUUUURU, RUUUURUUUU, UURUUURUUU, URUUURUUUU, URUUUUURUU, RUUUUUUUUR, RUUUUUURUU, RUUUUURUUU, UUUURRUUUU, RUUUUUUUUU and UUUURUUUUU; and a second PUCCH structure includes three or four symbol locations used for transmitting RS and is one of the following PUCCH structures: URURURURUU, URURUURURU, URUURRUURU, URRUUUURRU, UURRUURRUU, RUURUURUUR, RUUURRUUUR, URURURUURU, RUUURUUURU, RUUURUUUUR, URUURUURUU and URUUURUUUR;

wherein in the PUCCH structure, U represents a symbol location used for transmitting UCI, and R represents a symbol location used for transmitting RS.

In one possible implementation, when the number A is 11:

the PUCCH structure set includes one PUCCH structure, and the PUCCH structure included in the PUCCH structure set includes two symbol locations used for transmitting RS and is one of the following PUCCH structures: UURUUUURUUU, UURUUUUURUU, URUUUUURUUU, URUUUUUUURU, RUUUURUUUUU, RUUUUURUUUU, UUURUUURUUU, URUUURUUUU, RUUUUUUUURU, URUUUUUUUUR, URUUUUUURUU, UUUURRUUUUU and RUUUUUUUUUR; or the PUCCH structure set includes one PUCCH structure, and the PUCCH structure included in the PUCCH structure set includes three or four symbol locations used for transmitting RS and is one of the following PUCCH structures: UURURURURUU, URURUURURUU, URURUURUURU, URURUUURURU, URUURURUURU, URRUUUUURRU, URRUUUURRUU, UURRUUURRUU, RUURUUURUUR, RUUURURUUUR, RUUURRUUUUR, RUUUURRUUUR, URUUURUUURU, RUUUURUUUUR, UURUURUURUU and URUUURUUURU; or the PUCCH structure set includes two PUCCH structures, wherein a first PUCCH structure includes one or two symbol locations used for transmitting RS and is one of the following PUCCH structures: UURUUUURUUU, UURUUUUURUU, URUUUUURUUU, URUUUUUUURU, RUUUURUUUUU, RUUUUURUUUU, UUURUUURUUU, URUUURUUUU, RUUUUUUUURU, URUUUUUUUUR, URUUUUUURUU, UUUURRUUUUU, RUUUUUUUUUR, RUUUUUUUUUU and UUUUURUUUUU; and a second PUCCH structure includes three or four symbol locations used for transmitting RS and is one of the following PUCCH structures: UURURURURUU, URURUURURUU, URURUURUURU, URURUUURURU, URUURURUURU, URRUUUUURRU, URRUUUURRUU, UURRUUURRUU, RUURUUURUUR, RUUURURUUUR, RUUURRUUUUR, RUUUURRUUUR, URUUURUUURU, RUUUURUUUUR, UURUURUURUU and URUUURUUURU;

wherein in the PUCCH structure, U represents a symbol location used for transmitting UCI, and R represents a symbol location used for transmitting RS.

In one possible implementation, when the number A is 12:

the PUCCH structure set includes one PUCCH structure, and the PUCCH structure included in the PUCCH structure set includes two symbol locations used for transmitting RS and is one of the following PUCCH structures: UUURUUUURUUU, UURUUUUUURUU, UURUUUUURUUU, URUUUUUUUURU, RUUUURUUUUU, UURUUURUUUU, UUUUURRUUUUU and RUUUUUUUUUUR; or the PUCCH structure set includes one PUCCH structure, and the PUCCH structure included in the PUCCH structure set includes three or four symbol locations used for transmitting RS and is one of the following PUCCH structures: UURURUURURUU, URUURUURUURU, URURUUURURUU, URURUUUURURU, UURRUUUURRUU, UURRUUURRUUU, RUURUUUURUUR, RUUURUURUUUR, RUUUURRUUUUR, RUUURURUUURU, URUUURUUURUU, URUUURUUUURU, URUUUURUUURU, RUUUURUUUURU, RUUUUURUUUUR, RUUUURUUUUUR, UURUURUUURUU, UURUUURUURUU and UURUURUURUUU; or the PUCCH structure set includes two PUCCH structures, wherein a first PUCCH structure includes one or two symbol locations used for transmitting RS and is one of the following PUCCH structures: UUURUUUURUUU, UURUUUUURUU, UURUUUUURUUU, URUUUUUUUURU, RUUUUURUUUUU, UURUUURUUUU, UUUUURRUUUU, RUUUUUUUUUUR, RUUUUUUUUUUU and UUUUURUUUUUU; and a second PUCCH structure includes three or four symbol locations used for transmitting RS and is one of the following PUCCH structures: UURURUURURUU, URUURUURUURU, URURUUURURUU, URURUUUURURU, UURRUUUURRUU, UURRUUURRUUU, RUURUUUURUUR, RUUURUURUUUR, RUUUURRUUUUR, RUUURURUUURU, URUUURUUURUU, URUUURUUUURU, URUUUURUUURU, RUUUURUUUURU, RUUUUURUUUUR, RUUUURUUUUR, UURUURUUURUU, UURUUURUURUU and UURUURUURUUU;

wherein in the PUCCH structure, U represents a symbol location used for transmitting UCI, and R represents a symbol location used for transmitting RS.

In one possible implementation, when the number A is 13:

the PUCCH structure set includes one PUCCH structure, and the PUCCH structure included in the PUCCH structure set includes two symbol locations used for transmitting RS and is one of the following PUCCH structures: UURUUUUUUURUU, UUURUUUUURUUU, URUUUUUUUUURU, RUUUUURUUUUUU, RUUUUUURUUUUU, UURUUUUUURUUU, UUUUURRUUUUUU and RUUUUUUUUUUUR; or the PUCCH structure set includes one PUCCH structure, and the PUCCH structure included in the PUCCH structure set includes three or four symbol locations used for transmitting RS and is one of the following PUCCH structures: UURURUUURURUU, URUURUUURUURU, URURUUUUURURU, URUURUURUURUU, URUURUURUUURU, UURRUUUUURRUU, UUURRUUURRUUU, RUURUURUURUUU, RUURUUUUURUUR, RUUURUUURUUUR, RUUUURRUUUUUR, URUUURURUUURU, RUUURUURUUURU, UURUUURUUURUU, URUUUURUUUURU, RUUUURUUUUUR, UUURUURUURUUU and UURUUUURUURUU; or the PUCCH structure set includes two PUCCH structures, wherein a first PUCCH structure includes one or two symbol locations used for transmitting RS and is one of the following PUCCH structures: UURUUUUUUURUU, UUURUUUUURUUU, URUUUUUUUUURU, RUUUUURUUUUU, RUUUUUURUUUUU, UURUUUUUURUUU, UUUUURRUUUUUU, RUUUUUUUUUUUR, RUUUUUUUUUUUU and UUUUUURUUUUUU; and a second PUCCH structure includes three or four symbol locations used for transmitting RS and is one of the following PUCCH structures: UURURUUURURUU, URUURUUURUURU, URURUUUUURURU, URUURUURUURUU, URUURUURUUURU, UURRUUUUURRUU, UUURRUUURRUUU, RUURUURUURUUU, RUURUUUUURUUR, RUUURUUURUUUR, RUUUURRUUUUR, URUUURURUUURU, RUUURUURUUURU, UURUUURUUURUU, URUUUURUUUURU, RUUUUURUUUUUR, UUURUURUURUUU and UURUUUURUURUU;

wherein in the PUCCH structure, U represents a symbol location used for transmitting UCI, and R represents a symbol location used for transmitting RS.

In one possible implementation, when the number A is 14:

the PUCCH structure set includes one PUCCH structure, and the PUCCH structure included in the PUCCH structure set includes two symbol locations used for transmitting RS and is one of the following PUCCH structures: UURUUUUUUUURUU, UUUURUUUURUUUU, URUUUUUUUUUURU, RUUUUUURUUUUUU, UUURUUUUURUUU, UUUUUURRUUUUUU and RUUUUUUUUUUUUR; or the PUCCH structure set includes one PUCCH structure, and the PUCCH structure included in the PUCCH structure set includes three or four symbol locations used for transmitting RS and is one of the following PUCCH structures: URUUURUURUUURU, UURURUUUURURUU, URUURUUUURUURU, URUURUUURUURUU, URURUUUUUURURU, UURUURUURUURUU, UURRUUUUUURRUU, UUURRUUUURRUUU, RUURUUURUURUUU, RUURUUUUUURUUR, RUUURUUUURUUUR, RUUUUURRUUUUUR, UURUURUUURUURU, URUUUURUUUURUU, URUUUURUUUURU, URUUUUURUUUURU, RUUUUURUUUUUUR, RUUUUUURUUUUUR, RUUUUURUUUUURU, URUUUUURUUUUUR, UUURUUURUURUUU, UUURUURUUURUUU, UURUUURUUURUUU and UURUUUURUUURUU; or the PUCCH structure set includes two PUCCH structures, wherein a first PUCCH structure includes one or two symbol locations used for transmitting RS and is one of the following PUCCH structures: UURUUUUUUUURUU, UUUURUUUURUUUU, URUUUUUUUUUURU, RUUUUUURUUUUUU, UUURUUUUUURUUU, UUUUUURRUUUUUU, RUUUUUUUUUUUUR, RUUUUUUUUUUUUU and UUUUUURUUUUUUU; and a second PUCCH structure includes three or four symbol locations used for transmitting RS and is one of the following PUCCH structures: URUUURUURUUURU, UURURUUUURURUU, URUURUUUURUURU, URUURUUURUURUU, URURUUUUUURURU, UURUURUURUURUU, UURRUUUUUURRUU, UUURRUUUURRUUU, RUURUUURUURUUU, RUURUUUUURUUR, RUUURUUUURUUUR, RUUUUURRUUUUR, UURUURUUURUURU, URUUUURUUUURUU, URUUUURUUUUURU, URUUUURUUUURU, RUUUUURUUUUUUR, RUUUUUURUUUUUR, RUUUUURUUUUURU, URU- UUUURUUUUUR, UUUURUUURUURUUU, UUURUU-RUUURUUU, UURUUURUUURUUU and UURUUUU-RUUURUU;

wherein in the PUCCH structure, U represents a symbol location used for transmitting UCI, and R represents a symbol location used for transmitting RS.

On the fourth aspect, provided by an embodiment of the present application is a device including a processor as well as a memory and a transceiver connected with the processor; and the processor is configured for reading a program in the memory to execute the following process:

determining the number A of symbols occupied by a PUCCH, the number A being a positive integer;

determining a PUCCH structure set that is defined in correspondence to the number A of the symbols, a PUCCH structure included in the PUCCH structure set including the number A of symbol locations, the PUCCH structure set including one or more PUCCH structures, and when multiple PUCCH structures are included, the number of symbol locations used for transmitting RS in different PUCCH structures being different, wherein a PUCCH structure is a distribution rule for symbol locations used for transmitting uplink control information (UCI) and symbol locations used for transmitting RS; and determining a PUCCH structure corresponding to the PUCCH from the PUCCH structure set, and controlling the transceiver to perform PUCCH reception on the basis of the corresponding PUCCH structure.

In one possible implementation, when the PUCCH structure set includes one PUCCH structure, the determining a PUCCH structure corresponding to the PUCCH from the PUCCH structure set includes: taking the one PUCCH structure included in the PUCCH structure set as the corresponding PUCCH structure; or when the PUCCH structure set includes multiple PUCCH structures, the determining a PUCCH structure corresponding to the PUCCH from the PUCCH structure set includes:

selecting a PUCCH structure as the corresponding PUCCH structure from the PUCCH structure set, and controlling the transceiver to inform a selection result to a terminal through a configuration instruction; and/or selecting a PUCCH structure with most symbol locations used for transmitting RS as the corresponding PUCCH structure from the PUCCH structure set when it is determined that frequency hopping is performed during PUCCH transmission, and controlling the transceiver to inform the terminal of a demand for frequency hopping through the configuration instruction.

In one possible implementation, the PUCCH structure set including one or more PUCCH structures includes:

when the value of the number A of the symbols is X1 to X2, for each number A of the symbols within X1 to X2, defining at least two PUCCH structures in the PUCCH structure set; when the value of the number A of the symbols is (X2+1) to X4, for each number A of the symbols within (X2+1) to X4, defining one PUCCH structure in the PUCCH structure set; or when the value of the number A of the symbols is X1 to X2 and X3 to X4, for each number A of the symbols within X1 to X2 and X3 to X4, defining at least two PUCCH structures in the PUCCH structure set; when the value of the number A of the symbols is (X2+1) to (X3−1), for each number A of the symbols within (X2+1) to (X3−1), defining one PUCCH structure in the PUCCH structure set; or with regard to the value of each number A of the symbols supported by the PUCCH, defining at least two PUCCH structures in the PUCCH structure set; or with regard to the value of each number A of the symbols supported by the PUCCH, defining one PUCCH structure in the PUCCH structure set;

wherein X1, X2, X3 and X4 are positive integers, and X1<X2<X3<X4.

In one possible implementation, when it is determined that frequency hopping is performed during PUCCH transmission, the determining a PUCCH structure corresponding to the PUCCH from the PUCCH structure set, and controlling the transceiver to perform PUCCH reception on the basis of the corresponding PUCCH structure, include:

controlling the transceiver to respectively receive information carried in a first symbol group and information carried in a second symbol group at different frequency domain positions by taking first $$\left\lfloor \frac{A}{2} \right\rfloor$$

symbols included by the PUCCH as the first symbol group and last $$\left(A - \left\lfloor \frac{A}{2} \right\rfloor\right)$$

symbols included by the PUCCH as the second symbol group; or controlling the transceiver to respectively receive information carried in a first symbol group and information carried in a second symbol group at different frequency domain positions by taking first $$\left\lceil \frac{A}{2} \right\rceil$$

symbols included by the PUCCH as the first symbol group and last $$\left(A - \left\lceil \frac{A}{2} \right\rceil\right)$$

symbols included by the PUCCH as the second symbol group.

In one possible implementation, when the number A is 4:

the PUCCH structure set includes one PUCCH structure, and the PUCCH structure included in the PUCCH structure set includes one symbol location used for transmitting RS and is one of the following PUCCH structures: URUU, UURU and RUUU; or the PUCCH structure set includes one PUCCH structure, and the PUCCH structure included in the PUCCH structure set includes two symbol locations used for transmitting RS and is one of the following PUCCH structures: URRU, RURU, RUUR and URUR; or the PUCCH structure set includes two PUCCH structures, wherein a first PUCCH structure includes one symbol location used for transmitting RS and is one of the following PUCCH structures: URUU, UURU and RUUU; and a second PUCCH structure includes two symbol locations used for transmitting RS and is one of the following PUCCH structures: URRU, RURU, RUUR and URUR;

wherein in the PUCCH structure, U represents a symbol location used for transmitting UCI, and R represents a symbol location used for transmitting RS.

In one possible implementation, when the number A is 5:

the PUCCH structure set includes one PUCCH structure, and the PUCCH structure included in the PUCCH structure set includes one symbol location used for transmitting RS and is one of the following PUCCH structures: UURUU, URUUU and RUUUU; or the PUCCH structure set includes one PUCCH structure, and the PUCCH structure included in the PUCCH structure set includes two symbol locations used for transmitting RS and is one of the following PUCCH structures: URRUU, UURRU, RUURU, RURUU and URURU; or the PUCCH structure set includes two PUCCH structures, wherein a first PUCCH structure includes one symbol location used for transmitting RS and is one of the following PUCCH structures: UURUU, URUUU and RUUUU; and a second PUCCH structure includes two symbol locations used for transmitting RS and is one of the following PUCCH structures: URRUU, UURRU, RUURU, RURUU and URURU;

wherein in the PUCCH structure, U represents a symbol location used for transmitting UCI, and R represents a symbol location used for transmitting RS.

In one possible implementation, when the number A is 6:

the PUCCH structure set includes one PUCCH structure, and the PUCCH structure included in the PUCCH structure set includes one symbol location used for transmitting RS and is one of the following PUCCH structures: URUUUU, UURUUU, UUURUU and RUUUUU; or the PUCCH structure set includes one PUCCH structure, and the PUCCH structure included in the PUCCH structure set includes two symbol locations used for transmitting RS and is one of the following PUCCH structures: URURUU, URUURU, RUUUUR, URUUUR, RUUURU and UURRUU; or the PUCCH structure set includes two PUCCH structures, wherein a first PUCCH structure includes one symbol location used for transmitting RS and is one of the following PUCCH structures: URUUUU, UURUUU, UUURUU and RUUUUU; and a second PUCCH structure includes two symbol locations used for transmitting RS and is one of the following PUCCH structures: URURUU, URUURU, RUUUUR, URUUUR, RUUURU and UURRUU;

wherein in the PUCCH structure, U represents a symbol location used for transmitting UCI, and R represents a symbol location used for transmitting RS.

In one possible implementation, when the number A is 7:

the PUCCH structure set includes one PUCCH structure, and the PUCCH structure included in the PUCCH structure set includes one symbol location used for transmitting RS and is one of the following PUCCH structures: URUUUUU, UURUUUU, UUURUUU and RUUUUUU; or the PUCCH structure set includes one PUCCH structure, and the PUCCH structure included in the PUCCH structure set includes two symbol locations used for transmitting RS and is one of the following PUCCH structures: RUUUUUR, URUUUUR, RUUUURU, URUUURU, URUURUU, UURURUU, UURRUUU and UUURRUU; or the PUCCH structure set includes two PUCCH structures, wherein a first PUCCH structure includes one symbol location used for transmitting RS and is one of the following PUCCH structures: URUUUUU, UURUUUU, UUURUUU and RUUUUUU; and a second PUCCH structure includes two symbol locations used for transmitting RS and is one of the following PUCCH structures: RUUUUUR, URUUUUR, RUUUURU, URUUURU, URUURUU, UURURUU, UURRUUU and UUURRUU;

wherein in the PUCCH structure, U represents a symbol location used for transmitting UCI, and R represents a symbol location used for transmitting RS.

In one possible implementation, when the number A is 8:

the PUCCH structure set includes one PUCCH structure, and the PUCCH structure included in the PUCCH structure set includes two symbol locations used for transmitting RS and is one of the following PUCCH structures: URUUUURU, URUUURUU, RUUUUUUR, RUUUUURU, RUUUURUU, RUUURUUU, UUURRUUU and UURUURUU; or the PUCCH structure set includes one PUCCH structure, and the PUCCH structure included in the PUCCH structure set includes three or four symbol locations used for transmitting RS and is one of the following PUCCH structures: URRUURRU, URURURUR, RURURURU, RUURRUUR, RURUURUR, RUURUURU, RUURUUUR, RUUURUUR, URURUURU and URURURUU; or the PUCCH structure set includes two PUCCH structures, wherein a first PUCCH structure includes one or two symbol locations used for transmitting RS and is one of the following PUCCH structures: URUUUURU, URUUURUU, RUUUUUUR, RUUUUURU, RUUUURUU, RUUURUUU, UUURRUUU, UURUURUU, UUURUUUU and RUUUUUUU; and a second PUCCH structure includes three or four symbol locations used for transmitting RS and is one of the following PUCCH structures: URRUURRU, URURURUR, RURURURU, RURUURUR, RUURRUUR, RUURUURU, RUURUUUR, RUUURUUR, URURUURU and URURURUU;

wherein in the PUCCH structure, U represents a symbol location used for transmitting UCI, and R represents a symbol location used for transmitting RS.

In one possible implementation, when the number A is 9:

the PUCCH structure set includes one PUCCH structure, and the PUCCH structure included in the PUCCH structure set includes two symbol locations used for transmitting RS and is one of the following PUCCH structures: UURUUURUU, URUUUURUU, URUUUUURU, URUUURUUU, RUUURUUUU, RUUUUUUUR, RUUUUURUU, RUUUUUURU, RUUUURUUU, UURUUUURU, UUUURRUUU and UUURRUUUU; or the PUCCH structure set includes one PUCCH structure, and the PUCCH structure included in the PUCCH structure set includes three or four symbol locations used for transmitting RS and is one of the following PUCCH structures: URURURURU, URRUURRUU, URRUUURRU, RUURRUURU, RUURRUUUR, RUUURRUUR, RUURURUUR, RURUURUUR, URURURUUR, RUUURUUUR, URUURUURU and URUUURURU; or the PUCCH structure set includes two PUCCH structures, wherein a first PUCCH structure includes one or two symbol locations used for transmitting RS and is one of the following PUCCH structures: UURUUURUU, URUUUURUU, URUUUUURU, URUUURUUU, RUUURUUUU, RUUUUUUUR, RUUUUURUU, RUUUUUURU, RUUUURUUU, UURUUUURU, UUUURRUUU, UUURRUUUU, RUUUUUUUU and UUUURUUUU; and a second PUCCH structure includes three or four symbol locations used for transmitting RS and is one of the following PUCCH structures: URURURURU, URRUURRUU, URRUUURRU, RUURRUURU, RUURRUUUR, RUUURRUUR, RUURURUUR, RURUURUUR, URURURUUR, RUUURUUUR, URUURUURU and URUUURURU;

wherein in the PUCCH structure, U represents a symbol location used for transmitting UCI, and R represents a symbol location used for transmitting RS.

In one possible implementation, when the number A is 10:

the PUCCH structure set includes one PUCCH structure, and the PUCCH structure included in the PUCCH structure set includes two symbol locations used for transmitting RS and is one of the following PUCCH structures: UURUUUURUU, URUUUURUUU, URUUUUUURU, RUUUURUUUU, UURUUURUUU, URUUURUUUU, URUUUUURUU, RUUUUUUUUR, RUUUUUURUU, RUUUUURUUU and UUUURRUUUU; or the PUCCH structure set includes one PUCCH structure, and the PUCCH structure included in the PUCCH structure set includes three or four symbol locations used for transmitting RS and is one of the following PUCCH structures: URURURURUU, URURUURURU, URUURRUURU, URRUUUURRU, UURRUURRUU, RUURUURUUR, RUUURRUUUR, URURURUURU, RUUURUUURU, RUUURUUUUR, URUURUURUU and URUUURUUUR; or the PUCCH structure set includes two PUCCH structures, wherein a first PUCCH structure includes one or two symbol locations used for transmitting RS and is one of the following PUCCH structures: UURUUUURUU, URUUUURUUU, URUUUUUURU, RUUUURUUUU, UURUUURUUU, URUUURUUUU, URUUUUURUU, RUUUUUUUUR, RUUUUUURUU, RUUUUURUUU, UUUURRUUUU, RUUUUUUUUU and UUUURUUUUU; and a second PUCCH structure includes three or four symbol locations used for transmitting RS and is one of the following PUCCH structures: URURURURUU, URURUURURU, URUURRUURU, URRUUUURRU, UURRUURRUU, RUURUURUUR, RUUURRUUUR, URURURUURU, RUUURUUURU, RUUURUUUUR, URUURUURUU and URUUURUUUR;

wherein in the PUCCH structure, U represents a symbol location used for transmitting UCI, and R represents a symbol location used for transmitting RS.

In one possible implementation, when the number A is 11:

the PUCCH structure set includes one PUCCH structure, and the PUCCH structure included in the PUCCH structure set includes two symbol locations used for transmitting RS and is one of the following PUCCH structures: UURUUUURUUU, UURUUUUURUU, URUUUUURUUU, URUUUUUUURU, RUUUURUUUUU, RUUUUURUUUU, UUURUUURUUU, URUUURUUUU, RUUUUUUUURU, URUUUUUUUUR, URUUUUUURUU, UUUURRUUUUU and RUUUUUUUUUR; or the PUCCH structure set includes one PUCCH structure, and the PUCCH structure included in the PUCCH structure set includes three or four symbol locations used for transmitting RS and is one of the following PUCCH structures: UURURURURUU, URURUURURUU, URURUURUURU, URURUUURURU, URUURURUURU, URRUUUUURRU, URRUUUURRUU, UURRUUURRUU, RUURUUURUUR, RUUURURUUUR, RUUURRUUUUR, RUUUURRUUUR, URUUURUUURU, RUUUURUUUUR, UURUURUURUU and URUUURUUURU; or the PUCCH structure set includes two PUCCH structures, wherein a first PUCCH structure includes one or two symbol locations used for transmitting RS and is one of the following PUCCH structures: UURUUUURUUU, UURUUUUURUU, URUUUUURUUU, URUUUUUUURU, RUUUURUUUUU, RUUUUURUUUU, UUURUUURUUU, URUUURUUUU, RUUUUUUUURU, URUUUUUUUUR, URUUUUUURUU, UUUURRUUUUU, RUUUUUUUUUR, RUUUUUUUUUU and UUUUURUUUUU; and a second PUCCH structure includes three or four symbol locations used for transmitting RS and is one of the following PUCCH structures: UURURURURUU, URURUURURUU, URURUURUURU, URURUUURURU, URUURURUURU, URRUUUUURRU, URRUUUURRUU, UURRUUURRUU, RUURUUURUUR, RUUURURUUUR, RUUURRUUUUR, RUUUURRUUUR, URUUURUUURU, RUUUURUUUUR, UURUURUURUU and URUUURUUURU;

wherein in the PUCCH structure, U represents a symbol location used for transmitting UCI, and R represents a symbol location used for transmitting RS.

In one possible implementation, when the number A is 12:

the PUCCH structure set includes one PUCCH structure, and the PUCCH structure included in the PUCCH structure set includes two symbol locations used for transmitting RS and is one of the following PUCCH structures: UUURUUUURUUU, UURUUUUUURUU, UURUUUUURUUU, URUUUUUUUURU, RUUUURUUUUU, UURUUURUUUU, UUUUURRUUUUU and RUUUUUUUUUUR; or the PUCCH structure set includes one PUCCH structure, and the PUCCH structure included in the PUCCH structure set includes three or four symbol locations used for transmitting RS and is one of the following PUCCH structures: UURURUURURUU, URUURUURUURU, URURUUURURUU, URURUUUURURU, UURRUUUURRUU, UURRUUURRUUU, RUURUUUURUUR, RUUURUURUUUR, RUUUURRUUUUR, RUUURURUUURU, URUUURUUURUU, URUUURUUUURU, URUUUURUUURU, RUUUURUUUURU, RUUUUURUUUUR, RUUUURUUUUUR, UURUURUUURUU, UURUUURUURUU and UURUURUURUUU; or the PUCCH structure set includes two PUCCH structures, wherein a first PUCCH structure includes one or two symbol locations used for transmitting RS and is one of the following PUCCH structures: UUURUUUURUUU, UURUUUUURUU, UURUUUUURUUU, URUUUUUUUURU, RUUUURUUUUU, UURUUURUUUU, UUUURRUUUUU, RUUUUUUUUUUR, RUUUUUUUUUUU and UUUUURUUUUUU; and a second PUCCH structure includes three or four symbol locations used for transmitting RS and is one of the following PUCCH structures: UURURUURURUU, URUURUURUURU, URURUUURURUU, URURUUUURURU, UURRUUUURRUU, UURRUUURRUUU, RUURUUUURUUR, RUUURUURUUUR, RUUUURRUUUUR, RUUURURUUURU, URUUURUUURUU, URUUURUUUURU, URUUUURUUURU, RUUUURUUUURU, RUUUUURUUUUR, RUUUURUUUUUR, UURUURUUURUU, UURUUURUURUU and UURUURUURUUU;

wherein in the PUCCH structure, U represents a symbol location used for transmitting UCI, and R represents a symbol location used for transmitting RS.

In one possible implementation, when the number A is 13:

the PUCCH structure set includes one PUCCH structure, and the PUCCH structure included in the PUCCH structure set includes two symbol locations used for transmitting RS and is one of the following PUCCH structures: UURUUUUUURUU, UUURUUUUURUUU, URUUUUUUUUURU, RUUUUURUUUUUU, RUUUUUURUUUUU, UURUUUUUURUUU, UUUUURRUUUUUU and RUUUUUUUUUUUR; or the PUCCH structure set includes one PUCCH structure, and the PUCCH structure included in the PUCCH structure set includes three or four symbol locations used for transmitting RS and is one of the following PUCCH structures: UURURUUURURUU, URUURUUURUURU, URURUUUUURURU, URUURUURUURUU, URUURUURUUURU, UURRUUUUURRUU, UUURRUUURRUUU, RUURUURUURUUU, RUURUUUUURUUR, RUUURUUURUUUR, RUUUURRUUUUUR, URUUURURUUURU, RUUURUURUUURU, UURUUURUUURUU, URUUUURUUUURU, RUUUUURUUUUUR, UUURUURUURUUU and UURUUUURUURUU; or the PUCCH structure set includes two PUCCH structures, wherein a first PUCCH structure includes one or two symbol locations used for transmitting RS and is one of the following PUCCH structures: UURUUUUUUURUU, UUURUUUUURUUU, URUUUUUUUUURU, RUUUUURUUUUU, RUUUUUURUUUUU, UURUUUUUURUUU, UUUUURRUUUUUU, RUUUUUUUUUUUR, RUUUUUUUUUUUU and UUUUUURUUUUUU; and a second PUCCH structure includes three or four symbol locations used for transmitting RS and is one of the following PUCCH structures: UURURUUURURUU, URUURUUURUURU, URURUUUUURURU, URUURUURUURUU, URUURUURUUURU, UURRUUUUURRUU, UUURRUUURRUUU, RUURUURUURUUU, RUURUUUURUUR, RUUURUUURUUUR, RUUUURRUUUUR, URUUURURUUURU, RUUURUURUUURU, UURUUURUUURUU, URUUUURUUUURU, RUUUUURUUUUR, UUURUURUURUUU and UURUUUURUURUU;

wherein in the PUCCH structure, U represents a symbol location used for transmitting UCI, and R represents a symbol location used for transmitting RS.

In one possible implementation, when the number A is 14:

the PUCCH structure set includes one PUCCH structure, and the PUCCH structure included in the PUCCH structure set includes two symbol locations used for transmitting RS and is one of the following PUCCH structures: UURUUUUUUURUU, UUUURUUUURUUUU, URUUUUUUUUUURU, RUUUUUURUUUUUU, UUURUUUUUURUUU, UUUUUURRUUUUUU and RUUUUUUUUUUUUR; or the PUCCH structure set includes one PUCCH structure, and the PUCCH structure included in the PUCCH structure set includes three or four symbol locations used for transmitting RS and is one of the following PUCCH structures: URUUURUURUUURU, UURURUUUURURUU, URUURUUUURUURU, URUURUUURUURUU, URURUUUUUURURU, UURUURUURUURUU, UURRUUUUUURRUU, UUURRUUUURRUUU, RUURUUURUURUUU, RUURUUUUUURUUR, RUUURUUUURUUUR, RUUUUURRUUUUUR, UURUURUUURUURU, URUUUURUUUURUU, URUUUURUUUUURU, URUUUUURUUUUURU, RUUUUURUUUUUUR, RUUUUUURUUUUUR, RUUUUURUUUUURU, URUUUUURUUUUUR, UUURUUURUURUUU, UUURUURUUURUUU, UURUUURUUURUUU and UURUUUURUUURUU; or the PUCCH structure set includes two PUCCH structures, wherein a first PUCCH structure includes one or two symbol locations used for transmitting RS and is one of the following PUCCH structures: UURUUUUUUUURUU, UUUURUUURUUUU, URUUUUUUUUUURU, RUUUUUURUUUUUU, UUURUUUUUURUUU, UUUUUURRUUUUUU, RUUUUUUUUUUUUR, RUUUUUUUUUUUUU and UUUUUURUUUUUUU; and a second PUCCH structure includes three or four symbol locations used for transmitting RS and is one of the following PUCCH structures: URUUURUURUUURU, UURURUUUURURUU, URUURUUUURUURU, URUURUUURUURUU, URURUUUUUURURU, UURUURUURUURUU, UURRUUUUUURRUU, UUURRUUUURRUUU, RUURUUURUURUUU, RUURUUUUUURUUR, RUUURUUUURUUUR, RUUUUURRUUUUUR, UURUURUUURUURU, URUUUURUUUURUU, URUUUURUUUUURU, URUUUUURUUUUURU, RUUUUURUUUUUUR, RUUUUUURUUUUUR, RUUUUURUUUUURU, URUUUUURUUUUUR, UUURUURUURUUU, UUURUURUUURUUU, UURUUURUUURUUU and UURUUUURUUURUU;

wherein in the PUCCH structure, U represents a symbol location used for transmitting UCI, and R represents a symbol location used for transmitting RS.

On the fifth aspect, provided is a computer storage medium, and a computer executable instruction is stored in the computer storage medium and is configured for making a computer execute the method in any one possible scheme in the above-mentioned first aspect or second aspect.

During implementation of the present application, firstly, the number A of symbols occupied by a PUCCH needing transmission is determined, then, a corresponding PUCCH structure set is determined according to the number A of the symbols, a PUCCH structure corresponding to the PUCCH is determined from the PUCCH structure set, and PUCCH transmission is performed on the basis of the PUCCH structure corresponding to the PUCCH.

The PUCCH structure set corresponds to the number of the symbols, and any one of the PUCCH structures includes symbol locations, the number of which is same as that of the symbols, and therefore, the PUCCH transmission method in the embodiment of the present application can meet the demand for the unfixed number of the symbols occupied by the PUCCH and support the PUCCH transmission in the new wireless communication system.

Further, in the embodiment of the present application, by determining a PUCCH structure from the PUCCH structure set after determining the PUCCH structure set, it is guaranteed that the PUCCH transmission can still be normally performed when the number of resource symbols corresponds to multiple PUCCH structures.

Further, the distribution rules for the symbol locations of different PUCCH structures in the PUCCH structure set and/or the number of the symbol locations used for transmitting RS are different, and therefore, the PUCCH transmission method in the embodiment of the present application can support different PUCCH transmission demands in scenes such as frequency hopping or not and different movement speeds.

BRIEF DESCRIPTION OF THE DRAWINGS

In order to more clearly describe technical schemes in the embodiments of the present application or the prior art, accompanying drawings required in the description of the embodiments and the prior art are simply introduced below, obviously, the accompanying drawings in the following description are used for illustrating some embodiments of the present application, and other accompanying drawings can also be obtained by those ordinarily skilled in the art without creative work according to the following ones.

DETAILED DESCRIPTION OF THE EMBODIMENTS

Figure 1:
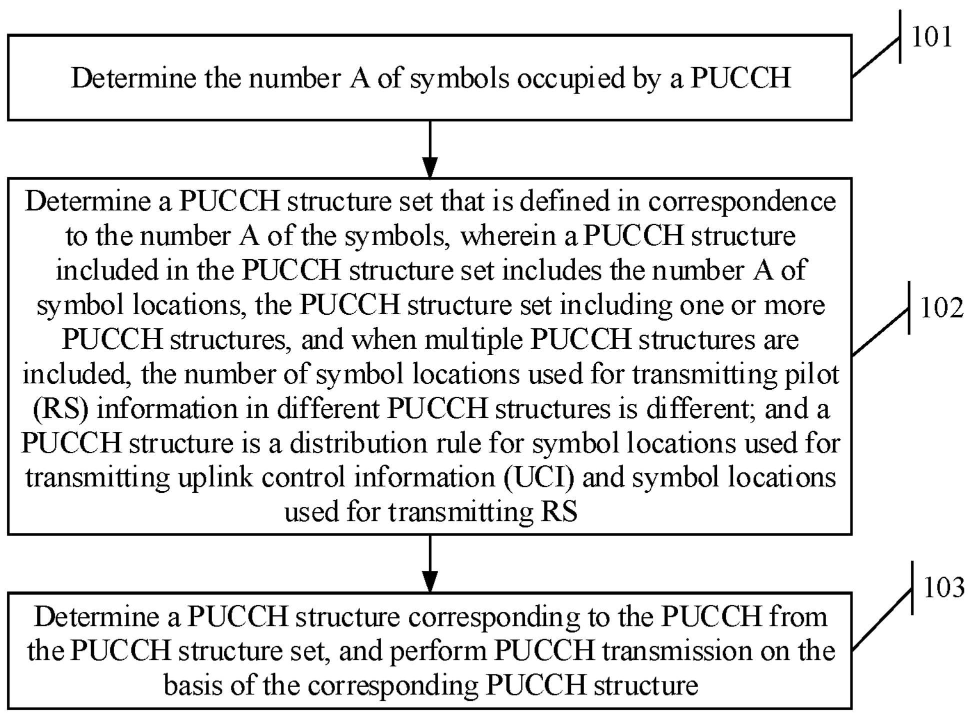
FIG. 1 is a flow diagram of a PUCCH transmission method in an embodiment of the present application.

In order to make the objectives, technical schemes and advantages of the present application clearer, the technical schemes in the embodiments of the present application will be clearly and completely described below in conjunction with the accompanying drawings in the embodiments of the present application, and obviously, the described embodiments are only illustrative ones, and are not all possible ones of the present application.

All other embodiments obtained by those ordinarily skilled in the art on the basis of the embodiments of the present application without creative work shall fall within the protection scope of the present application. The embodiments of the present application and features in the embodiments can be arbitrarily combined under the condition that no conflicts exist. Moreover, although a logic order is shown in the flow diagrams, the shown or described operations can be performed in an order different from the order given herein under some conditions.

In addition, items "and/or" used herein only represent an association relationship for describing associated objects and may refer to three relationships, for example, A and/or B can represent three situations that A exists alone, A and B exist at the same time, and B exists alone. In addition, unless otherwise specifically stated, the character "/" used herein generally shows that the front and back associated objects are in an "or" relationship.

For the sake of a better understanding of the above-mentioned technical schemes, the above-mentioned technical schemes will be described in detail below in conjunction with the accompanying drawings of the specification and specific implementations.

Firstly, the application scene of the present application is introduced.

Anew frame structure supporting different baseband parameters (numerology including parameters such as a subcarrier spacing) is defined in a new wireless communication system. For different baseband parameters, the length of one subframe is defined to be 1 ms all the time, one subframe contains the number A of slots. Corresponding to different baseband parameters, the number A may be different so as to meet the demand that the length of one subframe is 1 ms. For different baseband parameters, one slot may contain 7 or 14 symbols (symbols such as OFDM (Orthogonal Frequency Division Multiplexing) or DFT-S-OFDM (Discrete Fourier Transform-Spreading-OFDM)). One slot may have various slot structures/formats, and different slot structures/formats correspond to different uplink and downlink resource partitioning, for example, all of the plurality of symbols in one slot may be used for downlink transmission, namely DL only slot; all of the plurality of symbols in one slot may also be used for uplink transmission, namely UL only slot; or part of symbols in one slot may be used for uplink transmission and part of symbols in the one slot may be used for downlink transmission, namely DL+UL slot. A terminal may be informed of the slot structures/formats semi-statically by RRC signaling or dynamically by group common signaling (Group Common PDCCH), so that dynamic changes to the slot structures are realized.

The number of uplink symbols contained in one slot may be changed, and therefore, two NR-PUCCHs, namely a long NR-PUCCH (Physical Uplink Control Channel) and a short NR-PUCCH, are defined in a 5G NR system, wherein the long NR-PUCCH may be transmitted by occupying 4 to 14 symbols in one slot, and uplink control information (UCI) and pilots (a reference signal (RS)) are transmitted in a time division multiplexing (TDM) way, namely UCI and RS are transmitted by respectively occupying different symbols. In order to improve the uplink transmission performance, a frequency hopping structure may be used in the multiple symbols occupied by the long NR-PUCCH to obtain frequency domain diversity gains; of course, in order to increase the multiplexing capacity of users, the frequency hopping structure may not be used.

The core concept of the embodiments of the present application lies in that at least two UCI and RS structures are defined for each or parts of multiple transmission lengths supported by the long PUCHH, wherein the number of RS symbols of the different UCI and RS structures is different, or only one UCI and RS structure is defined for each of the multiple transmission lengths supported by the long PUCCH.

In order to better understand the above-mentioned technical schemes, the above-mentioned technical schemes will be described in detail below in conjunction with the accompanying drawings of the specification and the specific implementations.

It should be noted that the undermentioned embodiments are based on the same inventive concept, and contents recorded in other embodiments can be referred when the content of one of the embodiments is understood or explained.

Embodiment 1

Referring to FIG. 1, provided by an embodiment of the present application is a PUCCH transmission method which can be used for performing PUCCH transmission among equipments, such as PUCCH transmission from a user equipment (UE) to a base station, wherein the UE may be a personal computer (PC), a notebook computer, a mobile phone, Internet of things equipment, wearable equipment and the like, and the specific type of the UE is not limited in the embodiments of the present application.

The process of the PUCCH transmission method in the embodiment of the present application is described as follows.

Operation 101: the number A of symbols occupied by a PUCCH is determined, wherein the number A is a positive integer.

Operation 102: a PUCCH structure set that is defined in correspondence to the number A of the symbols is determined, a PUCCH structure included in the PUCCH structure set includes the number A of symbol locations, the PUCCH structure set includes one or more PUCCH structures, and when multiple PUCCH structures are included, the number of symbol locations used for transmitting pilot (RS) information in different PUCCH structures is different. wherein a PUCCH structure is a distribution rule for symbol locations used for transmitting uplink control information (UCI) and symbol locations used for transmitting RS.

Operation 103: a PUCCH structure corresponding to the PUCCH is determined from the PUCCH structure set, and PUCCH transmission is performed on the basis of the corresponding PUCCH structure.

In one possible implementation, the operation that a PUCCH structure corresponding to the PUCCH is determined from the PUCCH structure set when the PUCCH structure set includes one PUCCH structure includes: the PUCCH structure included in the PUCCH structure set is taken as the corresponding PUCCH structure; or the operation that a PUCCH structure corresponding to the PUCCH is determined from the PUCCH structure set when the PUCCH structure set includes multiple PUCCH structures includes:

one PUCCH structure is selected as the corresponding PUCCH structure from the PUCCH structure set according to an acquired configuration instruction; and/or the PUCCH structure with most symbol locations used for transmitting RS is selected as the corresponding PUCCH structure from the PUCCH structure set when it is determined that frequency hopping is performed during PUCCH transmission.

In one possible implementation, the PUCCH structure set including one or more PUCCH structures includes:

when the value of the number A of the symbols is X1 to X2, for each number A of the symbols within X1 to X2, at least two PUCCH structures are defined in the PUCCH structure set; when the value of the number A of the symbols is (X2+1) to X4, for each number A of the symbols within (X2+1) to X4, one PUCCH structure is defined in the PUCCH structure set; or when the value of the number A of the symbols is X1 to X2 and X3 to X4, for each number A of the symbols within X1 to X2 and X3 to X4, at least two PUCCH structures are defined in the PUCCH structure set; when the value of the number A of the symbols is (X2+1) to (X3−1), for each number A of the symbols within (X2+1) to (X3−1), one PUCCH structure is defined in the PUCCH structure set; or with regard to the value of each number A of the symbols supported by the PUCCH, at least two PUCCH structures are defined in the PUCCH structure set; or with regard to the value of each number A of the symbols supported by the PUCCH, one PUCCH structure is defined in the PUCCH structure set;

wherein X1, X2, X3 and X4 are positive integers, and X1<X2<X3<X4.

In one possible implementation, when at least two UCI and RS structures are defined, a first structure includes the number Y1 of pilot symbols, and a second structure includes the number Y2 of pilot symbols, wherein Y1<Y2; for example, Y1=1, Y2=2, of course, other values are not excluded; when only one UCI and RS structure is defined, the number of Y3 pilot symbols are included, 1<Y3<{ (rounding up or down (transmission length/X)), X is 2, 3 or 4, and Y3 can be the same or different for different transmission lengths; for example, Y3 is defined to be 4 for PUCCHs of which the transmission lengths are (X2+1) to X4 symbols, or Y3 is defined to be equal to 3 for parts of the transmission lengths in the PUCCHs of which the transmission lengths are (X2+1) to X4 symbols, Y3 is defined to be equal to 4 for parts of the transmission lengths in the PUCCHs of which the transmission lengths are (X2+1) to X4 symbols, or Y3 is defined to be equal to 5 for parts of the transmission lengths in the PUCCHs of which the transmission lengths are (X2+1) to X4 symbols.

In one possible implementation, the operation that a PUCCH structure corresponding to the PUCCH is determined from the PUCCH structure set when it is determined that frequency hopping is performed during PUCCH transmission, and PUCCH transmission is performed on the basis of the corresponding PUCCH structure, includes:

information carried in a first symbol group and information carried in a second symbol group are respectively transmitted at different frequency domain positions by taking first $$\left\lfloor \frac{A}{2} \right\rfloor$$

symbols included by the PUCCH as the first symbol group and last $$\left(A-\left\lfloor \frac{A}{2} \right\rfloor\right)$$

symbols included by the PUCCH as the second symbol group; or information carried in a first symbol group and information carried in a second symbol group are respectively transmitted at different frequency domain positions by taking first $$\left\lceil \frac{A}{2} \right\rceil$$

symbols included by the PUCCH as the first symbol group and last $$\left(A-\left\lceil \frac{A}{2} \right\rceil\right)$$

symbols included by the PUCCH as the second symbol group.

In one possible implementation, a terminal judges whether frequency hopping is performed or not during PUCCH transmission according to configuration signaling; in another possible implementation, the terminal judges whether frequency hopping is performed or not during PUCCH transmission according to preliminary definition, for example, it is preliminarily defined that frequency hopping is used all the time for one or multiple PUCCH structures or transmission lengths of the PUCCH, it is preliminarily defined that frequency hopping is not used all the time for one or multiple PUCCH structures or transmission lengths of the PUCCHs, or it is preliminarily defined that frequency hopping is used or not used all the time for any one of the PUCCH structures or the transmission lengths of the PUCCH.

In the embodiment of the present application, the symbol groups include at least one symbol and are used for representing time domain resources, each symbol location is partitioned by time division, while different symbol groups can transmit resources carried by the different symbol groups in different frequency domains on the premise of time division when it is determined that frequency hopping is required during PUCCH transmission after the time domain resources are determined.

In one possible implementation, when the number A of the symbols occupied by the PUCCH is 4:

the PUCCH structure set includes one PUCCH structure, and the PUCCH structure included in the PUCCH structure set includes one symbol location used for transmitting RS and is one of the following PUCCH structures: URUU, UURU and RUUU; or the PUCCH structure set includes one PUCCH structure, and the PUCCH structure included in the PUCCH structure set includes two symbol locations used for transmitting RS and is one of the following PUCCH structures: URRU, RURU, RUUR and URUR; or the PUCCH structure set includes two PUCCH structures, wherein a first PUCCH structure includes one symbol location used for transmitting RS and is one of the following PUCCH structures: URUU, UURU and RUUU; and a second PUCCH structure includes two symbol locations used for transmitting RS and is one of the following PUCCH structures: URRU, RURU, RUUR and URUR;

wherein in the PUCCH structure, U represents a symbol location used for transmitting UCI, and R represents a symbol location used for transmitting RS.

In one possible implementation, when the number A of the symbols occupied by the PUCCH is 5:

the PUCCH structure set includes one PUCCH structure, and the PUCCH structure included in the PUCCH structure set includes one symbol location used for transmitting RS and is one of the following PUCCH structures: UURUU, URUUU and RUUUU; or the PUCCH structure set includes one PUCCH structure, and the PUCCH structure included in the PUCCH structure set includes two symbol locations used for transmitting RS and is one of the following PUCCH structures: URRUU, UURRU, RUURU, RURUU and URURU; or the PUCCH structure set includes two PUCCH structures, wherein a first PUCCH structure includes one symbol location used for transmitting RS and is one of the following PUCCH structures: UURUU, URUUU and RUUUU; and a second PUCCH structure includes two symbol locations used for transmitting RS and is one of the following PUCCH structures: URRUU, UURRU, RUURU, RURUU and URURU;

wherein in the PUCCH structure, U represents a symbol location used for transmitting UCI, and R represents a symbol location used for transmitting RS.

In one possible implementation, when the number A of the symbols occupied by the PUCCH is 6:

the PUCCH structure set includes one PUCCH structure, and the PUCCH structure included in the PUCCH structure set includes one symbol location used for transmitting RS and is one of the following PUCCH structures: URUUUU, UURUUU, UUURUU and RUUUUU; or the PUCCH structure set includes one PUCCH structure, and the PUCCH structure included in the PUCCH structure set includes two symbol locations used for transmitting RS and is one of the following PUCCH structures: URURUU, URUURU, RUUUUR, URUUUR, RUUURU and UURRUU; or the PUCCH structure set includes two PUCCH structures, wherein a first PUCCH structure includes one symbol location used for transmitting RS and is one of the following PUCCH structures: URUUUU, UURUUU, UUURUU and RUUUUU; and a second PUCCH structure includes two symbol locations used for transmitting RS and is one of the following PUCCH structures: URURUU, URUURU, RUUUUR, URUUUR, RUUURU and UURRUU;

wherein in the PUCCH structure, U represents a symbol location used for transmitting UCI, and R represents a symbol location used for transmitting RS.

In one possible implementation, when the number A of the symbols occupied by the PUCCH is 7:

the PUCCH structure set includes one PUCCH structure, and the PUCCH structure included in the PUCCH structure set includes one symbol location used for transmitting RS and is one of the following PUCCH structures: URUUUUU, UURUUUU, UUURUUU and RUUUUUU; or the PUCCH structure set includes one PUCCH structure, and the PUCCH structure included in the PUCCH structure set includes two symbol locations used for transmitting RS and is one of the following PUCCH structures: RUUUUUR, URUUUUR, RUUUURU, URUUURU, URUURUU, UURURUU, UURRUUU and UUURRUU; or the PUCCH structure set includes two PUCCH structures, wherein a first PUCCH structure includes one symbol location used for transmitting RS and is one of the following PUCCH structures: URUUUUU, UURUUUU, UUURUUU and RUUUUUU; and a second PUCCH structure includes two symbol locations used for transmitting RS and is one of the following PUCCH structures: RUUUUUR, URUUUUR, RUUUURU, URUUURU, URUURUU, UURURUU, UURRUUU and UUURRUU;

wherein in the PUCCH structure, U represents a symbol location used for transmitting UCI, and R represents a symbol location used for transmitting RS.

In one possible implementation, when the number A of the symbols occupied by the PUCCH is 8:

the PUCCH structure set includes one PUCCH structure, and the PUCCH structure included in the PUCCH structure set includes two symbol locations used for transmitting RS and is one of the following PUCCH structures: URUUURU, URUUURUU, RUUUUUUR, RUUUUURU, RUUUURUU, RUUURUUU, UUURRUUU and UURUURUU; or the PUCCH structure set includes one PUCCH structure, and the PUCCH structure included in the PUCCH structure set includes three or four symbol locations used for transmitting RS and is one of the following PUCCH structures: URRUURRU, URURURUR, RURURURU, RUURRUUR, RURUURUR, RUURUURU, RUURUUUR, RUUURUUR, URURUURU and URURURUU; or the PUCCH structure set includes two PUCCH structures, wherein a first PUCCH structure includes one or two symbol locations used for transmitting RS and is one of the following PUCCH structures: URUUUURU, URUUURUU, RUUUUUUR, RUUUUURU, RUUUURUU, RUUURUUU, UUURRUUU, UURUURUU, UUURUUUU and RUUUUUUU; and a second PUCCH structure includes three or four symbol locations used for transmitting RS and is one of the following PUCCH structures: URRUURRU, URURURUR, RURURURU, RURUURUR, RUURRUUR, RUURUURU, RUURUUUR, RUUURUUR, URURUURU and URURURUU;

wherein in the PUCCH structure, U represents a symbol location used for transmitting UCI, and R represents a symbol location used for transmitting RS.

In one possible implementation, when the number A of the symbols occupied by the PUCCH is 9:

the PUCCH structure set includes one PUCCH structure, and the PUCCH structure included in the PUCCH structure set includes two symbol locations used for transmitting RS and is one of the following PUCCH structures: UURUUURUU, URUUUURUU, URUUUUURU, URUUURUUU, RUUURUUUU, RUUUUUUUR, RUUUUURUU, RUUUUUURU, RUUUURUUU, UURUUUURU, UUURRUUUU and UUURRUUUU; or the PUCCH structure set includes one PUCCH structure, and the PUCCH structure included in the PUCCH structure set includes three or four symbol locations used for transmitting RS and is one of the following PUCCH structures: URURURURU, URRUURRUU, URRUUURRU, RUURRUURU, RUURRUUUR, RUUURRUUR, RUURURUUR, RURUURUUR, URURURUUR, RUUURUUUR, URUURUURU and URUUURURU; or the PUCCH structure set includes two PUCCH structures, wherein a first PUCCH structure includes one or two symbol locations used for transmitting RS and is one of the following PUCCH structures: UURUUURUU, URUUUURUU, URUUUUURU, URUUURUUU, RUUURUUUU, RUUUUUUUR, RUUUUURUU, RUUUUUURU, RUUUURUUU, UURUUUURU, UUUURRUUU, UUURRUUUU, RUUUUUUUU and UUUURUUUU; and a second PUCCH structure includes three or four symbol locations used for transmitting RS and is one of the following PUCCH structures: URURURURU, URRUURRUU, URRUUURRU, RUURRUURU, RUURRUUUR, RUUURRUUR, RUURURUUR, RURUURUUR, URURURUUR, RUUURUUUR, URUURUURU and URUUURURU;

wherein in the PUCCH structure, U represents a symbol location used for transmitting UCI, and R represents a symbol location used for transmitting RS.

In one possible implementation, when the number A of the symbols occupied by the PUCCH is 10:

the PUCCH structure set includes one PUCCH structure, and the PUCCH structure included in the PUCCH structure set includes two symbol locations used for transmitting RS and is one of the following PUCCH structures: UURUUUURUU, URUUUURUUU, URUUUUUURU, RUUUURUUUU, UURUUURUUU, URUUURUUUU, URUUUUURUU, RUUUUUUUUR, RUUUUUURUU, RUUUUURUUU and UUUURRUUUU; or the PUCCH structure set includes one PUCCH structure, and the PUCCH structure included in the PUCCH structure set includes three or four symbol locations used for transmitting RS and is one of the following PUCCH structures: URURURURUU, URURUURURU, URUURRUURU, URRUUUURRU, UURRUURRUU, RUURUURUUR, RUUURRUUUR, URURURUURU, RUUURUUURU, RUUURUUUUR, URUURUURUU and URUUURUUUR; or the PUCCH structure set includes two PUCCH structures, wherein a first PUCCH structure includes one or two symbol locations used for transmitting RS and is one of the following PUCCH structures: UURUUUURUU, URUUUURUUU, URUUUUUURU, RUUUURUUUU, UURUUURUUU, URUUURUUUU, URUUUUURUU, RUUUUUUUUR, RUUUUUURUU, RUUUUURUUU, UUUURRUUUU, RUUUUUUUUU and UUUURUUUUU; and a second PUCCH structure includes three or four symbol locations used for transmitting RS and is one of the following PUCCH structures: URURURURUU, URURUURURU, URUURRUURU, URRUUUURRU, UURRUURRUU, RUURUURUUR, RUUURRUUUR, URURURUURU, RUUURUUURU, RUUURUUUUR, URUURUURUU and URUUURUUUR;

wherein in the PUCCH structure, U represents a symbol location used for transmitting UCI, and R represents a symbol location used for transmitting RS.

In one possible implementation, when the number A of the symbols occupied by the PUCCH is 11:

the PUCCH structure set includes one PUCCH structure, and the PUCCH structure included in the PUCCH structure set includes two symbol locations used for transmitting RS and is one of the following PUCCH structures: UURUUUURUUU, UURUUUUURUU, URUUUUURUUU, URUUUUUURU, RUUUURUUUUU, RUUUUURUUUU, UUURUUURUUU, URUUURUUUU, RUUUUUUUURU, URUUUUUUUUR, URUUUUUURUU, UUUURRUUUUU and RUUUUUUUUUR; or the PUCCH structure set includes one PUCCH structure, and the PUCCH structure included in the PUCCH structure set includes three or four symbol locations used for transmitting RS and is one of the following PUCCH structures: UURURURURUU, URURUURURUU, URURUURUURU, URURUUURURU, URUURURUURU, URRUUUURRU, UURRUUURRUU, RUURUUURUUR, RUUURURUUUR, RUUURRUUUR, RUUURRUUUR, URUUURUUURU, RUUUURUUUUR, UURUURUURUU and URUUURUUURU; or the PUCCH structure set includes two PUCCH structures, wherein a first PUCCH structure includes one or two symbol locations used for transmitting RS and is one of the following PUCCH structures: UURUUUURUUU, UURUUUUURUU, URUUUUURUUU, URUUUUUUURU, RUUUURUUUUU, RUUUUURUUUU, UUURUUURUUU, URUUURUUUU, RUUUUUUUURU, URUUUUUUUUR, URUUUUUURUU, UUUURRUUUUU, RUUUUUUUUUR, RUUUUUUUUUU and UUUUURUUUU; and a second PUCCH structure includes three or four symbol locations used for transmitting RS and is one of the following PUCCH structures: UURURURURUU, URURUURURUU, URURUURUURU, URURUUURURU, URUURURUURU, URRUUUURRU, URRUUURRUU, UURRUUURRUU, RUURUUURUUR, RUUURURUUUR, RUUURRUUUR, RUUUURRUUR, URUUURUUURU, RUUUURUUUUR, UURUURUURUU and URUUURUUURU;

wherein in the PUCCH structure, U represents a symbol location used for transmitting UCI, and R represents a symbol location used for transmitting RS.

In one possible implementation, when the number A of the symbols occupied by the PUCCH is 12:

the PUCCH structure set includes one PUCCH structure, and the PUCCH structure included in the PUCCH structure set includes two symbol locations used for transmitting RS and is one of the following PUCCH structures: UUURUUUURUUU, UURUUUUUURUU, UURUUUUURUUU, URUUUUUUUURU, RUUUURUUUUU, UURUUURUUUU, UUUUURRUUUUU and RUUUUUUUUUUR; or the PUCCH structure set includes one PUCCH structure, and the PUCCH structure included in the PUCCH structure set includes three or four symbol locations used for transmitting RS and is one of the following PUCCH structures: UURURUURURUU, URUURUURUURU, URURUUURURUU, URURUUUURURU, UURRUUUURRUU, UURRUUURRUUU, RUURUUUURUUR, RUUURUURUUUR, RUUUURRUUUUR, RUUURURUUURU, URUUURUUURUU, URUUURUUUURU, URUUUURUUURU, RUUUURUUUURU, RUUUURUUUUUR, RUUUURUUUUUR, UURUURUUURUU, UURUUURUURUU and UURUURUURUUU; or the PUCCH structure set includes two PUCCH structures, wherein a first PUCCH structure includes one or two symbol locations used for transmitting RS and is one of the following PUCCH structures: UUURUUUURUUU, UURUUUUUURUU, UURUUUUURUUU, URUUUUUUUURU, RUUUURUUUUU, UURUUURUUUU, UUUUURRUUUU, RUUUUUUUUUUR, RUUUUUUUUUUU and UUUUURUUUUUU; and a second PUCCH structure includes three or four symbol locations used for transmitting RS and is one of the following PUCCH structures: UURU- RUURURUU, URUURUURUURU, URURUUURURUU, URURUUUURURU, UURRUUUURRUU, UURRUUURRUUU, RUURUUUURUUR, RUUURUURUUUR, RUUUURRUUUUR, RUUURURUUURU, URUUURUUURUU, URUUURUUUURU, URUUUURUUURU, RUUUURUUUURU, RUUUUURUUUUR, RUUUURUUUUUR, UURUURUUURUU, UURUUURUURUU and UURUURUURUUU;

wherein in the PUCCH structure, U represents a symbol location used for transmitting UCI, and R represents a symbol location used for transmitting RS.

In one possible implementation, when the number A of the symbols occupied by the PUCCH is 13:

the PUCCH structure set includes one PUCCH structure, and the PUCCH structure included in the PUCCH structure set includes two symbol locations used for transmitting RS and is one of the following PUCCH structures: UURUUUUUURUU, UUURUUUURUUU, URUUUUUUUURU, RUUUUURUUUUUU, RUUUUUURUUUUU, UURUUUUUURUUU, UUUUURRUUUUUU and RUUUUUUUUUUUR; or the PUCCH structure set includes one PUCCH structure, and the PUCCH structure included in the PUCCH structure set includes three or four symbol locations used for transmitting RS and is one of the following PUCCH structures: UURURUUURURUU, URUURUUURUURU, URURUUUUURURU, URUURUURUURUU, URUURUURUURU, UURRUUUUURRUU, UUURRUUURRUUU, RUURUURUURUUU, RUURUUUUURUUR, RUUURUUURUUUR, RUUUURRUUUUUR, URUUURURUUURU, RUUURUURUUURU, UURUUURUUURUU, URUUUURUUUURU, RUUUUURUUUUUR, UUURUURUURUUU and UURUUUURUURUU; or the PUCCH structure set includes two PUCCH structures, wherein a first PUCCH structure includes one or two symbol locations used for transmitting RS and is one of the following PUCCH structures: UURUUUUUUURUU, UUURUUUURUUU, URUUUUUUUUURU, RUUUURUUUUUU, RUUUUUURUUUUU, UURUUUUUUURUUU, UUUUURRUUUUUU, RUUUUUUUUUUUR, RUUUUUUUUUUUU and UUUUUURUUUUUU; and a second PUCCH structure includes three or four symbol locations used for transmitting RS and is one of the following PUCCH structures: UURURUUURURUU, URUURUUURUURU, URURUUUUURURU, URUURUURUURUU, URUURUURUUURU, UURRUUUUURRUU, UUURRUUURRUUU, RUURUURUURUUU, RUURUUUUURUUR, RUUURUUURUUUR, RUUUURRUUUUR, URUUURURUUURU, RUUURUURUUURU, UURUUURUUURUU, URUUUURUUUURU, RUUUUURUUUUUR, UUURUURUURUUU and UURUUUURUURUU;

wherein in the PUCCH structure, U represents a symbol location used for transmitting UCI, and R represents a symbol location used for transmitting RS.

In one possible implementation, when the number A of the symbols occupied by the PUCCH is 14:

the PUCCH structure set includes one PUCCH structure, and the PUCCH structure included in the PUCCH structure set includes two symbol locations used for transmitting RS and is one of the following PUCCH structures: UURUUUUUUURUU, UUUURUUUURUUUU, URUUUUUUUUUURU, RUUUUUURUUUUUU, UUURUUUUUURUUU, UUUUUURRUUUUUU and RUUUUUUUUUUUUR; or the PUCCH structure set includes one PUCCH structure, and the PUCCH structure included in the PUCCH structure set includes three or four symbol locations used for transmitting RS and is one of the following PUCCH structures: URUUURUURUUURU, UURURUUUURURUU, URUURUUUURUURU, URUURUUURUURUU, URURUUUUUURURU, UURUURUURUURUU, UURRUUUUUURRUU, UUURRUUUURRUUU, RUURUUURUURUUU, RUURUUUUUURUUR, RUUURUUUURUUUR, RUUUUURRUUUUUR, UURUURUUURUURU, URUUUURUUUURUU, URUUUURUUUUURU, URUUUUURUUUURU, RUUUUURUUUUUUR, RUUUUUURUUUUUR, RUUUUURUUUUURU, URUUUUURUUUUUR, UUURUUURUURUUU, UUURUURUUURUUU, UURUUURUUURUUU and UURUUUURUUURUU; or the PUCCH structure set includes two PUCCH structures, wherein a first PUCCH structure includes one or two symbol locations used for transmitting RS and is one of the following PUCCH structures: UURUUUUUUUURUU, UUUURUUUURUUUU, URUUUUUUUUUURU, RUUUUUURUUUUUU, UUURUUUUUURUUU, UUUUUURRUUUUUU, RUUUUUUUUUUUUR, RUUUUUUUUUUUUU and UUUUUURUUUUUUU; and a second PUCCH structure includes three or four symbol locations used for transmitting RS and is one of the following PUCCH structures: URUUURUURUUURU, UURURUUUURURUU, URUURUUUURUURU, URUURUUURUURUU, URURUUUUUURURU, UURUURUURUURUU, UURRUUUUUURRUU, UUURRUUUURRUUU, RUURUUURUURUUU, RUURUUUUURUUR, RUUURUUUURUUUR, RUUUUURRUUUUUR, UURUURUUURUURU, URUUUURUUUURUU, URUUUURUUUUURU, URUUUUURUUUURU, RUUUUURUUUUUUR, RUUUUUURUUUUUR, RUUUUURUUUUURU, URUUUUURUUUUUR, UUURUURUURUUU, UUURUURUUURUUU, UURUUURUURUUU and UURUUUURUUURUU;

wherein in the PUCCH structure, U represents a symbol location used for transmitting UCI, and R represents a symbol location used for transmitting RS.

Embodiment 2

Figure 2:
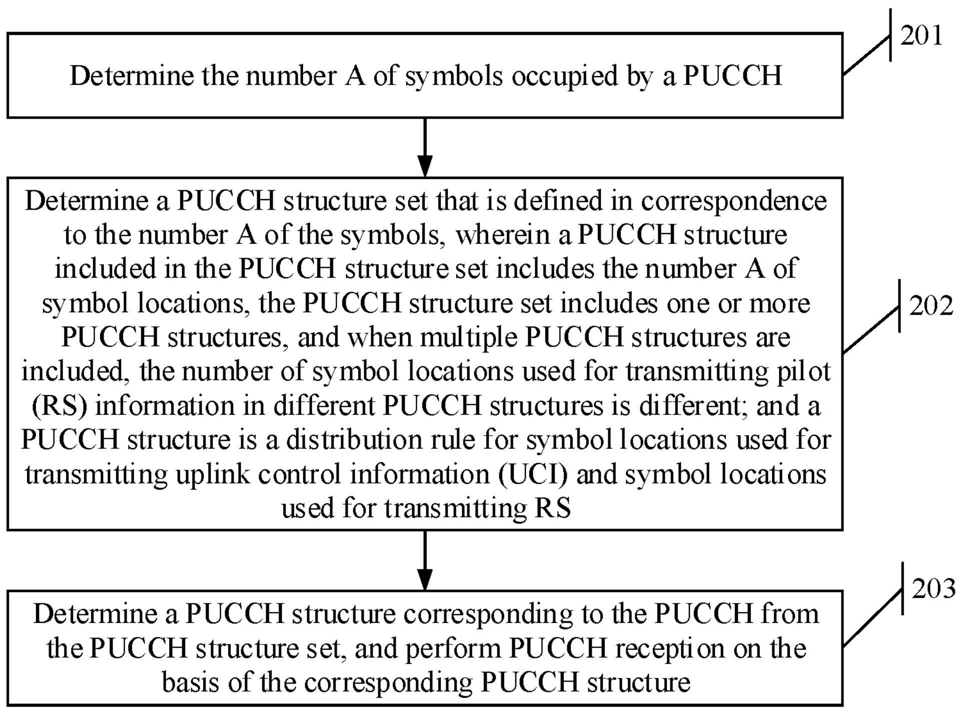
FIG. 2 is a flow diagram of another PUCCH transmission method in an embodiment of the present application.

Referring to FIG. 2, based on the same inventive concept of Embodiment 1, provided by an embodiment of the present application is another PUCCH transmission method including the following operations.

Operation 201: the number A of symbols occupied by a PUCCH is determined, wherein the number A is a positive integer.

Operation 202: a PUCCH structure set that is defined in correspondence to the number A of the symbols is determined, a PUCCH structure included in the PUCCH structure set includes the number A of symbol locations, the PUCCH structure set includes one or more PUCCH structures, and when multiple PUCCH structures are included, the number of symbol locations used for transmitting pilot (RS) information in different PUCCH structures is different. wherein a PUCCH structure is a distribution rule for symbol locations used for transmitting uplink control information (UCI) and symbol locations used for transmitting RS.

Operation 203: a PUCCH structure corresponding to the PUCCH is determined from the PUCCH structure set, and PUCCH reception is performed on the basis of the corresponding PUCCH structure.

In one possible implementation, the operation that a PUCCH structure corresponding to the PUCCH is determined from the PUCCH structure set when the PUCCH structure set includes one PUCCH structure includes: the PUCCH structure included in the PUCCH structure set is taken as the corresponding PUCCH structure; or the operation that a PUCCH structure corresponding to the PUCCH is determined from the PUCCH structure set when the PUCCH structure set includes multiple PUCCH structures includes:

one PUCCH structure is selected as the corresponding PUCCH structure from the PUCCH structure set, and a selection result is informed to a terminal through a configuration instruction; and/or the PUCCH structure with most symbol locations used for transmitting RS is selected as the corresponding PUCCH structure from the PUCCH structure set when it is determined that frequency hopping is performed during PUCCH transmission, and the terminal is informed of a demand for frequency hopping through the configuration instruction.

In one possible implementation, the PUCCH structure set including one or more PUCCH structures includes:

when the value of the number A of the symbols is X1 to X2, for each number A of the symbols within X1 to X2, at least two PUCCH structures are defined in the PUCCH structure set; when the value of the number A of the symbols is (X2+1) to X4, for each number A of the symbols within (X2+1) to X4, one PUCCH structure is defined in the PUCCH structure set; or when the value of the number A of the symbols is X1 to X2 and X3 to X4, for each number A of the symbols within X1 to X2 and X3 to X4, at least two PUCCH structures are defined in the PUCCH structure set; when the value of the number A of the symbols is (X2+1) to (X3−1), for each number A of the symbols within (X2+1) to (X3−1), one PUCCH structure is defined in the PUCCH structure set; or with regard to the value of each number A of the symbols supported by the PUCCH, at least two PUCCH structures are defined in the PUCCH structure set; or with regard to the value of each number A of the symbols supported by the PUCCH, one PUCCH structure is defined in the PUCCH structure set;

wherein X1, X2, X3 and X4 are positive integers, and X1<X2<X3<X4.

In one possible implementation, the operation that a PUCCH structure corresponding to the PUCCH is determined from the PUCCH structure set when it is determined that frequency hopping is performed during PUCCH transmission, and PUCCH reception is performed on the basis of the corresponding PUCCH structure, includes:

information carried in a first symbol group and information carried in a second symbol group are respectively received at different frequency domain positions by taking first $$\left\lfloor \frac{A}{2} \right\rfloor$$

symbols included by the PUCCH as the first symbol group and last $$\left(A-\left\lfloor \frac{A}{2} \right\rfloor\right)$$

symbols included by the PUCCH as the second symbol group; or information carried in a first symbol group and information carried in a second symbol group are respectively received at different frequency domain positions by taking first $$\left\lceil \frac{A}{2} \right\rceil$$

symbols included by the PUCCH as the first symbol group and last $$\left(A-\left\lceil \frac{A}{2} \right\rceil\right)$$

symbols included by the PUCCH as the second symbol group.

In one possible implementation, when the number A is 4:

the PUCCH structure set includes one PUCCH structure, and the PUCCH structure included in the PUCCH structure set includes one symbol location used for transmitting RS and is one of the following PUCCH structures: URUU, UURU and RUUU; or the PUCCH structure set includes one PUCCH structure, and the PUCCH structure included in the PUCCH structure set includes two symbol locations used for transmitting RS and is one of the following PUCCH structures: URRU, RURU, RUUR and URUR; or the PUCCH structure set includes two PUCCH structures, wherein a first PUCCH structure includes one symbol location used for transmitting RS and is one of the following PUCCH structures: URUU, UURU and RUUU; and a second PUCCH structure includes two symbol locations used for transmitting RS and is one of the following PUCCH structures: URRU, RURU, RUUR and URUR;

wherein in the PUCCH structure, U represents a symbol location used for transmitting UCI, and R represents a symbol location used for transmitting RS.

In one possible implementation, when the number A is 5:

the PUCCH structure set includes one PUCCH structure, and the PUCCH structure included in the PUCCH structure set includes one symbol location used for transmitting RS and is one of the following PUCCH structures: UURUU, URUUU and RUUUU; or the PUCCH structure set includes one PUCCH structure, and the PUCCH structure included in the PUCCH structure set includes two symbol locations used for transmitting RS and is one of the following PUCCH structures: URRUU, UURRU, RUURU, RURUU and URURU; or the PUCCH structure set includes two PUCCH structures, wherein a first PUCCH structure includes one symbol location used for transmitting RS and is one of the following PUCCH structures: UURUU, URUUU and RUUUU; and a second PUCCH structure includes two symbol locations used for transmitting RS and is one of the following PUCCH structures: URRUU, UURRU, RUURU, RURUU and URURU;

wherein in the PUCCH structure, U represents a symbol location used for transmitting UCI, and R represents a symbol location used for transmitting RS.

In one possible implementation, when the number A is 6:

the PUCCH structure set includes one PUCCH structure, and the PUCCH structure included in the PUCCH structure set includes one symbol location used for transmitting RS and is one of the following PUCCH structures: URUUUU, UURUUU, UUURUU and RUUUUU; or the PUCCH structure set includes one PUCCH structure, and the PUCCH structure included in the PUCCH structure set includes two symbol locations used for transmitting RS and is one of the following PUCCH structures: URURUU, URUURU, RUUUUR, URUUUR, RUUURU and UURRUU; or the PUCCH structure set includes two PUCCH structures, wherein a first PUCCH structure includes one symbol location used for transmitting RS and is one of the following PUCCH structures: URUUUU, UURUUU, UUURUU and RUUUUU; and a second PUCCH structure includes two symbol locations used for transmitting RS and is one of the following PUCCH structures: URURUU, URUURU, RUUUUR, URUUUR, RUUURU and UURRUU;

wherein in the PUCCH structure, U represents a symbol location used for transmitting UCI, and R represents a symbol location used for transmitting RS.

In one possible implementation, when the number A is 7:

the PUCCH structure set includes one PUCCH structure, and the PUCCH structure included in the PUCCH structure set includes one symbol location used for transmitting RS and is one of the following PUCCH structures: URUUUUU, UURUUUU, UUURUUU and RUUUUUU; or the PUCCH structure set includes one PUCCH structure, and the PUCCH structure included in the PUCCH structure set includes two symbol locations used for transmitting RS and is one of the following PUCCH structures: RUUUUUR, URUUUUR, RUUUURU, URUUURU, URUURUU, UURURUU, UURRUUU and UUURRUU; or the PUCCH structure set includes two PUCCH structures, wherein a first PUCCH structure includes one symbol location used for transmitting RS and is one of the following PUCCH structures: URUUUUU, UURUUUU, UUURUUU and RUUUUUU; and a second PUCCH structure includes two symbol locations used for transmitting RS and is one of the following PUCCH structures: RUUUUUR, URUUUUR, RUUUURU, URUUURU, URUURUU, UURURUU, UURRUUU and UUURRUU;

wherein in the PUCCH structure, U represents a symbol location used for transmitting UCI, and R represents a symbol location used for transmitting RS.

In one possible implementation, when the number A is 8:

the PUCCH structure set includes one PUCCH structure, and the PUCCH structure included in the PUCCH structure set includes two symbol locations used for transmitting RS and is one of the following PUCCH structures: URUUUURU, URUUURUU, RUUUUUUR, RUUUUURU, RUUUURUU, RUUURUUU, UUURRUUU and UURUURUU; or the PUCCH structure set includes one PUCCH structure, and the PUCCH structure included in the PUCCH structure set includes three or four symbol locations used for transmitting RS and is one of the following PUCCH structures: URRUURRU, URURURUR, RURURURU, RUURRUUR, RURUURUR, RUURUURU, RUURUUUR, RUUURUUR, URURUURU and URURURUU; or the PUCCH structure set includes two PUCCH structures, wherein a first PUCCH structure includes one or two symbol locations used for transmitting RS and is one of the following PUCCH structures: URUUUURU, URUUURUU, RUUUUUUR, RUUUUURU, RUUUURUU, RUUURUUU, UUURRUUU, UURUURUU, UUURUUUU and RUUUUUUU; and a second PUCCH structure includes three or four symbol locations used for transmitting RS and is one of the following PUCCH structures: URRUURRU, URURURUR, RURURURU, RURUURUR, RUURRUUR, RUURUURU, RUURUUUR, RUUURUUR, URURUURU and URURURUU;

wherein in the PUCCH structure, U represents a symbol location used for transmitting UCI, and R represents a symbol location used for transmitting RS.

In one possible implementation, when the number A is 9:

the PUCCH structure set includes one PUCCH structure, and the PUCCH structure included in the PUCCH structure set includes two symbol locations used for transmitting RS and is one of the following PUCCH structures: UURUUURUU, URUUUURUU, URUUUUURU, URUUURUUU, RUUURUUUU, RUUUUUUUR, RUUUUURUU, RUUUUUURU, RUUUURUUU, UURUUUURU, UUURRUUUU and UUURRUUUU; or the PUCCH structure set includes one PUCCH structure, and the PUCCH structure included in the PUCCH structure set includes three or four symbol locations used for transmitting RS and is one of the following PUCCH structures: URURURURU, URRUURRUU, URRUUURRU, RUURRUURU, RUURRUUUR, RUUURRUUR, RUURURUUR, RURUURUUR, URURURUUR, RUUURUUUR, URUURUURU and URUUURURU; or the PUCCH structure set includes two PUCCH structures, wherein a first PUCCH structure includes one or two symbol locations used for transmitting RS and is one of the following PUCCH structures: UURUUURUU, URUUUURUU, URUUUUURU, URUUURUUU, RUUURUUUU, RUUUUUUUR, RUUUUURUU, RUUUUUURU, RUUUURUUU, UURUUUURU, UUUURRUUU, UUURRUUUU, RUUUUUUUU and UUUURUUUU; and a second PUCCH structure includes three or four symbol locations used for transmitting RS and is one of the following PUCCH structures: URURURURU, URRUURRUU, URRUUURRU, RUURRUURU, RUURRUUUR, RUUURRUUR, RUURURUUR, RURUURUUR, URURURUUR, RUUURUUUR, URUURUURU and URUUURURU;

wherein in the PUCCH structure, U represents a symbol location used for transmitting UCI, and R represents a symbol location used for transmitting RS.

In one possible implementation, when the number A is 10:

the PUCCH structure set includes one PUCCH structure, and the PUCCH structure included in the PUCCH structure set includes two symbol locations used for transmitting RS and is one of the following PUCCH structures: UURUUUURUU, URUUUURUUU, URUUUUUURU, RUUUURUUUU, UURUUURUUU, URUUURUUUU, URUUUUURUU, RUUUUUUUUR, RUUUUUUURUU, RUUUUURUUU and UUUURRUUUU; or the PUCCH structure set includes one PUCCH structure, and the PUCCH structure included in the PUCCH structure set includes three or four symbol locations used for transmitting RS and is one of the following PUCCH structures: URURURURUU, URURUURURU, URUURRUURU, URRUUUURRU, UURRUURRUU, RUURUURUUR, RUUURRUUUR, URURURUURU, RUUURUUURU, RUUURUUUUR, URUURUURUU and URUUURUUUR; or the PUCCH structure set includes two PUCCH structures, wherein a first PUCCH structure includes one or two symbol locations used for transmitting RS and is one of the following PUCCH structures: UURUUUURUU, URUUUURUUU, URUUUUUURU, RUUUURUUUU, UURUUURUUU, URUUURUUUU, URUUUUURUU, RUUUUUUUUR, RUUUUUURUU, RUUUUURUUU, UUUURRUUUU, RUUUUUUUUU and UUUURU- UUUU; and a second PUCCH structure includes three or four symbol locations used for transmitting RS and is one of the following PUCCH structures: URURURURUU, URURUURURU, URUURRUURU, URRUUUURRU, UURRUURRUU, RUURUURUUR, RUUURRUUUR, URURURUURU, RUUURUUURU, RUUURUUUUR, URUURUURUU and URUUURUUUR;

wherein in the PUCCH structure, U represents a symbol location used for transmitting UCI, and R represents a symbol location used for transmitting RS.

In one possible implementation, when the number A is 11:

the PUCCH structure set includes one PUCCH structure, and the PUCCH structure included in the PUCCH structure set includes two symbol locations used for transmitting RS and is one of the following PUCCH structures: UURUUUURUUU, UURUUUUURUU, URUUUUURUUU, URUUUUUUURU, RUUURUUUUU, RUUUURUUUU, UUURUUURUUU, URUUURUUUU, RUUUUUUUURU, URUUUUUUUUR, URUUUUUURUU, UUUURRUUUU and RUUUUUUUUUR; or the PUCCH structure set includes one PUCCH structure, and the PUCCH structure included in the PUCCH structure set includes three or four symbol locations used for transmitting RS and is one of the following PUCCH structures: UURURURURUU, URURUURURUU, URURUURUURU, URURUUURURU, URUURURUURU, URRUUUURRU, URRUUUURRUU, UURRUUURRUU, RUURUUURUUR, RUUURURUUUR, RUUURRUUUR, RUUUURRUUUR, URUUURUUURU, RUUUURUUUUR, UURUURUURUU and URUUURUUURU; or the PUCCH structure set includes two PUCCH structures, wherein a first PUCCH structure includes one or two symbol locations used for transmitting RS and is one of the following PUCCH structures: UURUUUURUUU, UURUUUUURUU, URUUUUURUUU, URUUUUUUURU, RUUUURUUUUU, RUUUUURUUUU, UUURUUURUUU, URUUURUUUU, RUUUUUUUURU, URUUUUUUUUR, URUUUUUURUU, UUUURRUUUUU, RUUUUUUUUUR, RUUUUUUUUUU and UUUUURUUUU; and a second PUCCH structure includes three or four symbol locations used for transmitting RS and is one of the following PUCCH structures: UURURURURUU, URURUURURUU, URURUURUURU, URURUUURURU, URUURURUURU, URRUUUUURRU, URRUUURRUU, UURRUUURRUU, RUURUUURUUR, RUUURURUUUR, RUUURRUUUUR, RUUUURRUUR, URUUURUUURU, RUUUURUUUUR, UURUURUURUU and URUUURUUURU;

wherein in the PUCCH structure, U represents a symbol location used for transmitting UCI, and R represents a symbol location used for transmitting RS.

In one possible implementation, when the number A is 12:

the PUCCH structure set includes one PUCCH structure, and the PUCCH structure included in the PUCCH structure set includes two symbol locations used for transmitting RS and is one of the following PUCCH structures: UUURUUUURUUU, UURUUUUUURUU, UURUUUUURUUU, URUUUUUUUURU, RUUUURUUUUU, UURUUURUUUU, UUUURRUUUUU and RUUUUUUUUUR; or the PUCCH structure set includes one PUCCH structure, and the PUCCH structure included in the PUCCH structure set includes three or four symbol locations used for transmitting RS and is one of the following PUCCH structures: UURURUURURUU, URUURUURUURU, URURUUURURUU, URURUUUURURU, UURRUUUURRUU, UURRUUURRUUU, RUURUUUURUUR, RUUURUURUUUR, RUUUURRUUUUR, RUUURURUUURU, URUUURUUURUU, URUUURUUUURU, URUUUURUUURU, RUUUURUUUURU, RUUUUURUUUUR, RUUUURUUUUUR, UURUURUUURUU, UURUUURUURUU and UURUURUURUUU; or the PUCCH structure set includes two PUCCH structures, wherein a first PUCCH structure includes one or two symbol locations used for transmitting RS and is one of the following PUCCH structures: UUURUUUURUUU, UURUUUUUURUU, UURUUUUURUUU, URUUUUUUUURU, RUUUUURUUUUU, UURUURUUUU, UUUURRUUUU, RUUUUUUUUUUR, RUUUUUUUUUUU and UUUUURUUUUUU; and a second PUCCH structure includes three or four symbol locations used for transmitting RS and is one of the following PUCCH structures: UURURUURURUU, URUURUURUURU, URURUUURURUU, URURUUUURURU, UURRUUUURRUU, UURRUUURRUUU, RUURUUUURUUR, RUUURUURUUUR, RUUUURRUUUUR, RUUURURUUURU, URUUURUUURUU, URUUURUUUURU, URUUUURUUURU, RUUUURUUUURU, RUUUUURUUUUR, RUUUURUUUUR, UURUURUUURUU, UURUUURUURUU and UURUURUURUUU;

wherein in the PUCCH structure, U represents a symbol location used for transmitting UCI, and R represents a symbol location used for transmitting RS.

In one possible implementation, when the number A is 13:

the PUCCH structure set includes one PUCCH structure, and the PUCCH structure included in the PUCCH structure set includes two symbol locations used for transmitting RS and is one of the following PUCCH structures: UURUUUUUUURUU, UUURUUUUURUUU, URUUUUUUUUURU, RUUUUURUUUUUU, RUUUUUURUUUUU, UURUUUUUURUUU, UUUUURRUUUUUU and RUUUUUUUUUUUR; or the PUCCH structure set includes one PUCCH structure, and the PUCCH structure included in the PUCCH structure set includes three or four symbol locations used for transmitting RS and is one of the following PUCCH structures: UURURUUURURUU, URUURUUURUURU, URURUUUUURURU, URUURUURUURUU, URUURUURUUURU, UURRUUUUURRUU, UUURRUUURRUUU, RUURUURUURUUU, RUURUUUUURUUR, RUUURUUURUUUR, RUUUURRUUUUUR, URUUURURUUURU, RUUURUURUUURU, UURUUURUUURUU, URUUUURUUUURU, RUUUUURUUUUUR, UUURUURUURUUU and UURUUUURUURUU; or the PUCCH structure set includes two PUCCH structures, wherein a first PUCCH structure includes one or two symbol locations used for transmitting RS and is one of the following PUCCH structures: UURUUUUUUURUU, UUURUUUURUUU, URUUUUUUUUURU, RUUUURUUUUU, RUUUUUURUUUUU, UURUUUUUURUUU, UUUUURRUUUUUU, RUUUUUUUUUUUR, RUUUUUUUUUUUU and UUUUUURUUUUUU; and a second PUCCH structure includes three or four symbol locations used for transmitting RS and is one of the following PUCCH structures: UURURUUURURUU, URUURUUURUURU, URURUUUUURURU, URUURUURUURUU, URUURUURUUURU, UURRUUUUURRUU, UUURRUUURRUUU, RUURUURUURUUU, RUURUUUUURUUR, RUUURUUURUUUR, RUUUURRUUUUR, URUUURURUUURU, RUUURUURUUURU, UURUUURUUURUU, URUUUURUUUURU, RUUUUURUUUUUR, UUURUURUURUUU and UURUUUURUURUU;

wherein in the PUCCH structure, U represents a symbol location used for transmitting UCI, and R represents a symbol location used for transmitting RS.

In one possible implementation, when the number A is 14:

the PUCCH structure set includes one PUCCH structure, and the PUCCH structure included in the PUCCH structure set includes two symbol locations used for transmitting RS and is one of the following PUCCH structures: UURUUUUUUUURUU, UUUURUUUURUUUU, URUUUUUUUUUURU, RUUUUUURUUUUUU, UUURUUUUUURUUU, UUUUUURRUUUUUU and RUUUUUUUUUUUUR; or the PUCCH structure set includes one PUCCH structure, and the PUCCH structure included in the PUCCH structure set includes three or four symbol locations used for transmitting RS and is one of the following PUCCH structures: URUUURUURUUURU, UURURUUUURURUU, URUURUUUURUURU, URUURUUURUURUU, URURUUUUUURURU, UURUURUURUURUU, UURRUUUUUURRUU, UUURRUUUURRUUU, RUURUUURUURUUU, RUURUUUUUURUUR, RUUURUUUURUUUR, RUUUUURRUUUUUR, UURUURUUURUURU, URUUUURUUUURUU, URUUUURUUUUURU, URUUUUURUUUURU, RUUUUURUUUUUUR, RUUUUUURUUUUUR, RUUUUURUUUUURU, URUUUUURUUUUUR, UUURUUURUURUUU, UUURUURUUURUUU, UURUUURUUURUUU and UURUUUURUUURUU; or the PUCCH structure set includes two PUCCH structures, wherein a first PUCCH structure includes one or two symbol locations used for transmitting RS and is one of the following PUCCH structures: UURUUUUUUUURUU, UUUURUUUURUUUU, URUUUUUUUUUURU, RUUUUUURUUUUUU, UUURUUUUUURUUU, UUUUUURRUUUUUU, RUUUUUUUUUUUUR, RUUUUUUUUUUUUU and UUUUUURUUUUUUU; and a second PUCCH structure includes three or four symbol locations used for transmitting RS and is one of the following PUCCH structures: URUUURUURUUURU, UURURUUUURURUU, URUURUUUURUURU, URUURUUURUURUU, URURUUUUUURURU, UURUURUURUURUU, UURRUUUUUURRUU, UUURRUUUURRUUU, RUURUUURUURUUU, RUURUUUUUURUUR, RUUURUUUURUUUR, RUUUUURRUUUUUR, UURUURUUURUURU, URUUUURUUUURUU, URUUUURUUUUURU, URUUUUURUUUURU, RUUUUURUUUUUUR, RUUUUUURUUUUUR, RUUUUURUUUUURU, URUUUUURUUUUUR, UUURUUURUURUUU, UUURUURUUURUUU, UURUUURUUURUUU and UURUUUURUUURUU;

wherein in the PUCCH structure, U represents a symbol location used for transmitting UCI, and R represents a symbol location used for transmitting RS.

Embodiment 3

Figure 3:
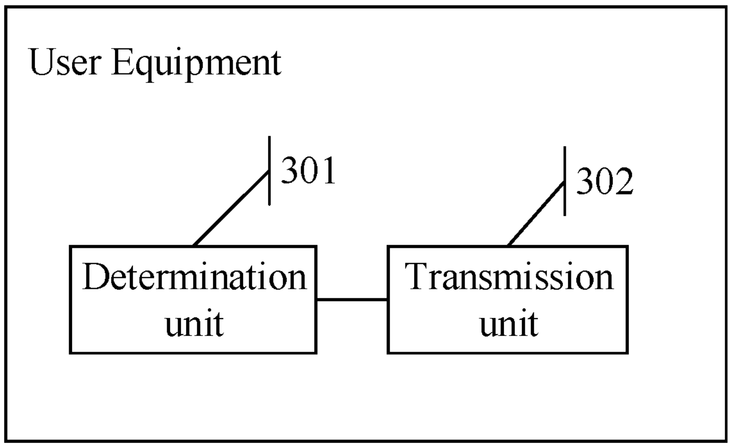
FIG. 3 is a structural block diagram of a user equipment in an embodiment of the present application.

Referring to FIG. 3, provided by an embodiment of the present application is a user equipment including a determination unit 301 and a transmission unit 302, wherein:

the determination unit 301 is configured for determining the number A of symbols occupied by a PUCCH, the number A being a positive integer; determining a PUCCH structure set that is defined in correspondence to the number A of the symbols, a PUCCH structure included in the PUCCH structure set including the number A of symbol locations, the PUCCH structure set including one or more PUCCH structures, and when multiple PUCCH structures are included, the number of symbol locations used for transmitting pilot (RS) information in different PUCCH structures being different, wherein a PUCCH structure is a distribution rule for symbol locations used for transmitting uplink control information (UCI) and symbol locations used for transmitting RS; and determining a PUCCH structure corresponding to the PUCCH from the PUCCH structure set; and the transmission unit 302 is configured for performing PUCCH transmission on the basis of the corresponding PUCCH structure.

In one possible implementation, the determination unit 301 is configured for:

taking a PUCCH structure included in the PUCCH structure set as the corresponding PUCCH structure when the PUCCH structure set includes one PUCCH structure; or selecting one PUCCH structure as the corresponding PUCCH structure from the PUCCH structure set according to an acquired configuration instruction when the PUCCH structure set includes multiple PUCCH structures; and/or selecting the PUCCH structure with most symbol locations used for transmitting RS as the corresponding PUCCH structure from the PUCCH structure set when it is determined that frequency hopping is performed during PUCCH transmission.

In one possible implementation, the PUCCH structure set including one or more PUCCH structures includes:

when the value of the number A of the symbols is X1 to X2, for each number A of the symbols within X1 to X2, at least two PUCCH structures are defined in the PUCCH structure set; when the value of the number A of the symbols is (X2+1) to X4, for each number A of the symbols within (X2+1) to X4, one PUCCH structure is defined in the PUCCH structure set; or when the value of the number A of the symbols is X1 to X2 and X3 to X4, for each number A of the symbols within X1 to X2 and X3 to X4, at least two PUCCH structures are defined in the PUCCH structure set; when the value of the number A of the symbols is (X2+1) to (X3−1), for each number A of the symbols within (X2+1) to (X3−1), one PUCCH structure is defined in the PUCCH structure set; or with regard to the value of each number A of the symbols supported by the PUCCH, at least two PUCCH structures are defined in the PUCCH structure set; or with regard to the value of each number A of the symbols supported by the PUCCH, one PUCCH structure is defined in the PUCCH structure set;

wherein X1, X2, X3 and X4 are positive integers, and X1<X2<X3<X4.

In one possible implementation, when it is determined that frequency hopping is performed during PUCCH transmission, the transmission unit 302 is configured for:

respectively transmitting information carried in a first symbol group and information carried in a second symbol group at different frequency domain positions by taking first $$\left\lfloor \frac{A}{2} \right\rfloor$$

symbols included by the PUCCH as the first symbol group and last $$\left(A-\left\lfloor \frac{A}{2} \right\rfloor\right)$$

symbols included by the PUCCH as the second symbol group; or respectively transmitting information carried in a first symbol group and information carried in a second symbol group at different frequency domain positions by taking first $$\left\lceil \frac{A}{2} \right\rceil$$

symbols included by the PUCCH as the first symbol group and last $$\left(A-\left\lceil \frac{A}{2} \right\rceil\right)$$

symbols included by the PUCCH as the second symbol group.

In one possible implementation, when the number A is 4:

the PUCCH structure set includes one PUCCH structure, and the PUCCH structure included in the PUCCH structure set includes one symbol location used for transmitting RS and is one of the following PUCCH structures: URUU, UURU and RUUU; or the PUCCH structure set includes one PUCCH structure, and the PUCCH structure included in the PUCCH structure set includes two symbol locations used for transmitting RS and is one of the following PUCCH structures: URRU, RURU, RUUR and URUR; or the PUCCH structure set includes two PUCCH structures, wherein a first PUCCH structure includes one symbol location used for transmitting RS and is one of the following PUCCH structures: URUU, UURU and RUUU; and a second PUCCH structure includes two symbol locations used for transmitting RS and is one of the following PUCCH structures: URRU, RURU, RUUR and URUR;

wherein in the PUCCH structure, U represents a symbol location used for transmitting UCI, and R represents a symbol location used for transmitting RS.

In one possible implementation, when the number A is 5:

the PUCCH structure set includes one PUCCH structure, and the PUCCH structure included in the PUCCH structure set includes one symbol location used for transmitting RS and is one of the following PUCCH structures: UURUU, URUUU and RUUUU; or the PUCCH structure set includes one PUCCH structure, and the PUCCH structure included in the PUCCH structure set includes two symbol locations used for transmitting RS and is one of the following PUCCH structures: URRUU, UURRU, RUURU, RURUU and URURU; or the PUCCH structure set includes two PUCCH structures, wherein a first PUCCH structure includes one symbol location used for transmitting RS and is one of the following PUCCH structures: UURUU, URUUU and RUUUU; and a second PUCCH structure includes two symbol locations used for transmitting RS and is one of the following PUCCH structures: URRUU, UURRU, RUURU, RURUU and URURU;

wherein in the PUCCH structure, U represents a symbol location used for transmitting UCI, and R represents a symbol location used for transmitting RS.

In one possible implementation, when the number A is 6:

the PUCCH structure set includes one PUCCH structure, and the PUCCH structure included in the PUCCH structure set includes one symbol location used for transmitting RS and is one of the following PUCCH structures: URUUUU, UURUUU, UUURUU and RUUUUU; or the PUCCH structure set includes one PUCCH structure, and the PUCCH structure included in the PUCCH structure set includes two symbol locations used for transmitting RS and is one of the following PUCCH structures: URURUU, URUURU, RUUUUR, URUUUR, RUUURU and UURRUU; or the PUCCH structure set includes two PUCCH structures, wherein a first PUCCH structure includes one symbol location used for transmitting RS and is one of the following PUCCH structures: URUUUU, UURUUU, UUURUU and RUUUUU; and a second PUCCH structure includes two symbol locations used for transmitting RS and is one of the following PUCCH structures: URURUU, URUURU, RUUUUR, URUUUR, RUUURU and UURRUU;

wherein in the PUCCH structure, U represents a symbol location used for transmitting UCI, and R represents a symbol location used for transmitting RS.

In one possible implementation, when the number A is 7:

the PUCCH structure set includes one PUCCH structure, and the PUCCH structure included in the PUCCH structure set includes one symbol location used for transmitting RS and is one of the following PUCCH structures: URUUUUU, UURUUUU, UUURUUU and RUUUUUU; or the PUCCH structure set includes one PUCCH structure, and the PUCCH structure included in the PUCCH structure set includes two symbol locations used for transmitting RS and is one of the following PUCCH structures: RUUUUUR, URUUUUR, RUUUURU, URUUURU, URUURUU, UURURUU, UURRUUU and UUURRUU; or the PUCCH structure set includes two PUCCH structures, wherein a first PUCCH structure includes one symbol location used for transmitting RS and is one of the following PUCCH structures: URUUUUU, UURUUUU, UUURUUU and RUUUUUU; and a second PUCCH structure includes two symbol locations used for transmitting RS and is one of the following PUCCH structures: RUUUUUR, URUUUUR, RUUUURU, URUUURU, URUURUU, UURURUU, UURRUUU and UUURRUU;

wherein in the PUCCH structure, U represents a symbol location used for transmitting UCI, and R represents a symbol location used for transmitting RS.

In one possible implementation, when the number A is 8:

the PUCCH structure set includes one PUCCH structure, and the PUCCH structure included in the PUCCH structure set includes two symbol locations used for transmitting RS and is one of the following PUCCH structures: URUUURU, URUUURUU, RUUUUUUR, RUUUUURU, RUUUURUU, RUUURUUU, UUURRUUU and UURUURUU; or the PUCCH structure set includes one PUCCH structure, and the PUCCH structure included in the PUCCH structure set includes three or four symbol locations used for transmitting RS and is one of the following PUCCH structures: URRUURRU, URURURUR, RURURURU, RUURRUUR, RURUURUR, RUURUURU, RUURUUUR, RUUURUUR, URURUURU and URURURUU; or the PUCCH structure set includes two PUCCH structures, wherein a first PUCCH structure includes one or two symbol locations used for transmitting RS and is one of the following PUCCH structures: URUUUURU, URUUURUU, RUUUUUUR, RUUUUURU, RUUUURUU, RUUURUUU, UUURRUUU, UURUURUU, UUURUUUU and RUUUUUUU; and a second PUCCH structure includes three or four symbol locations used for transmitting RS and is one of the following PUCCH structures: URRUURRU, URURURUR, RURURURU, RURUURUR, RUURRUUR, RUURUURU, RUURUUUR, RUUURUUR, URURUURU and URURURUU;

wherein in the PUCCH structure, U represents a symbol location used for transmitting UCI, and R represents a symbol location used for transmitting RS.

In one possible implementation, when the number A is 9:

the PUCCH structure set includes one PUCCH structure, and the PUCCH structure included in the PUCCH structure set includes two symbol locations used for transmitting RS and is one of the following PUCCH structures: UURUUURUU, URUUUURUU, URUUUUURU, URUUURUUU, RUUURUUUU, RUUUUUUUR, RUUUUURUU, RUUUUUURU, RUUUURUUU, UURUUUURU, UUURRUUUU and UUURRUUUU; or the PUCCH structure set includes one PUCCH structure, and the PUCCH structure included in the PUCCH structure set includes three or four symbol locations used for transmitting RS and is one of the following PUCCH structures: URURURURU, URRUURRUU, URRUUURRU, RUURRUURU, RUURRUUUR, RUUURRUUR, RUURURUUR, RURUURUUR, URURURUUR, RUUURUUUR, URUURUURU and URUUURURU; or the PUCCH structure set includes two PUCCH structures, wherein a first PUCCH structure includes one or two symbol locations used for transmitting RS and is one of the following PUCCH structures: UURUUURUU, URUUUURUU, URUUUUURU, URUUURUUU, RUUURUUUU, RUUUUUUUR, RUUUUURUU, RUUUUUURU, RUUUURUUU, UURUUUURU, UUUURRUUU, UUURRUUUU, RUUUUUUUU and UUUURUUUU; and a second PUCCH structure includes three or four symbol locations used for transmitting RS and is one of the following PUCCH structures: URURURURU, URRUURRUU, URRUUURRU, RUURRUURU, RUURRUUUR, RUUURRUUR, RUURURUUR, RURUURUUR, URURURUUR, RUUURUUUR, URUURUURU and URUUURURU;

wherein in the PUCCH structure, U represents a symbol location used for transmitting UCI, and R represents a symbol location used for transmitting RS.

In one possible implementation, when the number A is 10:

the PUCCH structure set includes one PUCCH structure, and the PUCCH structure included in the PUCCH structure set includes two symbol locations used for transmitting RS and is one of the following PUCCH structures: UURUUUURUU, URUUUURUUU, URUUUUUURU, RUUUURUUUU, UURUUURUUU, URUUURUUUU, URUUUUURUU, RUUUUUUUUR, RUUUUUURUU, RUUUUURUUU and UUUURRUUUU; or the PUCCH structure set includes one PUCCH structure, and the PUCCH structure included in the PUCCH structure set includes three or four symbol locations used for transmitting RS and is one of the following PUCCH structures: URURURURUU, URURUURURU, URUURRUURU, URRUUUURRU, UURRUURRUU, RUURUURUUR, RUUURRUUUR, URURURUURU, RUUURUUURU, RUUURUUUUR, URUURUURUU and URUUURUUUR; or the PUCCH structure set includes two PUCCH structures, wherein a first PUCCH structure includes one or two symbol locations used for transmitting RS and is one of the following PUCCH structures: UURUUUURUU, URUUUURUUU, URUUUUUURU, RUUUURUUUU, UURUUURUUU, URUUURUUUU, URUUUUURUU, RUUUUUUUUR, RUUUUUURUU, RUUUUURUUU, UUUURRUUUU, RUUUUUUUUU and UUUURUUUUU; and a second PUCCH structure includes three or four symbol locations used for transmitting RS and is one of the following PUCCH structures: URURURURUU, URURUURURU, URUURRUURU, URRUUUURRU, UURRUURRUU, RUURUURUUR, RUUURRUUUR, URURURUURU, RUUURUUURU, RUUURUUUUR, URUURUURUU and URUUURUUUR;

wherein in the PUCCH structure, U represents a symbol location used for transmitting UCI, and R represents a symbol location used for transmitting RS.

In one possible implementation, when the number A is 11:

the PUCCH structure set includes one PUCCH structure, and the PUCCH structure included in the PUCCH structure set includes two symbol locations used for transmitting RS and is one of the following PUCCH structures: UURUUUURUUU, UURUUUUURUU, URUUUUURUUU, URUUUUUUURU, RUUUURUUUUU, RUUUUURUUUU, UUURUUURUUU, URUUURUUUU, RUUUUUUUURU, URUUUUUUUUR, URUUUUUURUU, UUUURRUUUUU and RUUUUUUUUUR; or the PUCCH structure set includes one PUCCH structure, and the PUCCH structure included in the PUCCH structure set includes three or four symbol locations used for transmitting RS and is one of the following PUCCH structures: UURURURURUU, URURUURURUU, URURUURUURU, URURUUURURU, URUURURUURU, URRUUUUURRU, URRUUUURRUU, UURRUUURRUU, RUURUUURUUR, RUUURURUUUR, RUUURRUUUR, RUUUURRUUUR, URUUURUUURU, RUUUURUUUUR, UURUURUURUU and URUUURUUURU; or the PUCCH structure set includes two PUCCH structures, wherein a first PUCCH structure includes one or two symbol locations used for transmitting RS and is one of the following PUCCH structures: UURUUUURUUU, UURUUUUURUU, URUUUUURUUU, URUUUUUUURU, RUUUURUUUUU, RUUUUURUUUU, UUURUUURUUU, URUUURUUUU, RUUUUUUUURU, URUUUUUUUUR, URUUUUUURUU, UUUURRUUUUU, RUUUUUUUUUR, RUUUUUUUUUU and UUUUURUUUUU; and a second PUCCH structure includes three or four symbol locations used for transmitting RS and is one of the following PUCCH structures: UURURURURUU, URURUURURUU, URURUURUURU, URURUUURURU, URUURURUURU, URRUUUUURRU, URRUUUURRUU, UURRUUURRUU, RUURUUURUUR, RUUURURUUUR, RUUURRUUUUR, RUUUURRUUUR, URUUURUUURU, RUUUURUUUUR, UURUURUURUU and URUUURUUURU;

wherein in the PUCCH structure, U represents a symbol location used for transmitting UCI, and R represents a symbol location used for transmitting RS.

In one possible implementation, when the number A is 12:

the PUCCH structure set includes one PUCCH structure, and the PUCCH structure included in the PUCCH structure set includes two symbol locations used for transmitting RS and is one of the following PUCCH structures: UUURUUUURUUU, UURUUUUUURUU, UURUUUUURUUU, URUUUUUUUURU, RUUUURUUUUU, UURUUURUUUU, UUUUURRUUUUU and RUUUUUUUUUUR; or the PUCCH structure set includes one PUCCH structure, and the PUCCH structure included in the PUCCH structure set includes three or four symbol locations used for transmitting RS and is one of the following PUCCH structures: UURURUURURUU, URUURUURUURU, URURUUURURUU, URURUUUURURU, UURRUUUURRUU, UURRUUURRUUU, RUURUUUURUUR, RUUURUU- RUUUR, RUUUURRUUUUR, RUUURURUUURU, URUUURUUURUU, URUUURUUUURU, URUUUURUUURU, RUUUURUUUURU, RUUUUURUUUUR, RUUUURUUUUUR, UURUURUUURUU, UURUUURUURUU and UURUURUURUUU; or the PUCCH structure set includes two PUCCH structures, wherein a first PUCCH structure includes one or two symbol locations used for transmitting RS and is one of the following PUCCH structures: UUURUUUURUUU, UURUUUUUURUU, UURUUUUURUUU, URUUUUUUUURU, RUUUUURUUUUU, UURUUURUUUU, UUUUURRUUUU, RUUUUUUUUUUR, RUUUUUUUUUUU and UUUUURUUUUUU; and a second PUCCH structure includes three or four symbol locations used for transmitting RS and is one of the following PUCCH structures: UURURUURURUU, URUURUURUURU, URURUUURURUU, URURUUUURURU, UURRUUUURRUU, UURRUUURRUUU, RUURUUUURUUR, RUUURUURUUUR, RUUUURRUUUUR, RUUURURUUURU, URUUURUUURUU, URUUURUUUURU, URUUUURUUURU, RUUUURUUUURU, RUUUUURUUUUR, RUUUURUUUUUR, UURUURUUURUU, UURUUURUURUU and UURUURUURUUU;

wherein in the PUCCH structure, U represents a symbol location used for transmitting UCI, and R represents a symbol location used for transmitting RS.

In one possible implementation, when the number A is 13:

the PUCCH structure set includes one PUCCH structure, and the PUCCH structure included in the PUCCH structure set includes two symbol locations used for transmitting RS and is one of the following PUCCH structures: UURUUUUUURUU, UUURUUUUURUUU, URUUUUUUUUURU, RUUUUURUUUUUU, RUUUUUURUUUUU, UURUUUUUURUUU, UUUUURRUUUUUU and RUUUUUUUUUUUR; or the PUCCH structure set includes one PUCCH structure, and the PUCCH structure included in the PUCCH structure set includes three or four symbol locations used for transmitting RS and is one of the following PUCCH structures: UURURUUURURUU, URUURUUURUURU, URURUUUURURU, URUURUURUURUU, URUURUURUUURU, UURRUUUUURRUU, UUURRUUURRUUU, RUURUURUURUUU, RUURUUUUURUUR, RUUURUUURUUUR, RUUUURRUUUUUR, URUUURURUUURU, RUUURUURUUURU, UURUUURUUURUU, URUUUURUUUURU, RUUUUURUUUUUR, UUURUURUURUUU and UURUUUURUURUU; or the PUCCH structure set includes two PUCCH structures, wherein a first PUCCH structure includes one or two symbol locations used for transmitting RS and is one of the following PUCCH structures: UURUUUUUUURUU, UUURUUUURUUU, URUUUUUUUUURU, RUUUUURUUUUU, RUUUUUURUUUUU, UURUUUUUURUUU, UUUUURRUUUUUU, RUUUUUUUUUUUR, RUUUUUUUUUUUU and UUUUUURUUUUUU; and a second PUCCH structure includes three or four symbol locations used for transmitting RS and is one of the following PUCCH structures: UURURUUURURUU, URUURUUURUURU, URURUUUUURURU, URUURUURUURUU, URUURUURUUURU, UURRUUUUURRUU, UUURRUUURRUUU, RUURUURUURUUU, RUURUUUUURUUR, RUUURUUURUUUR, RUUUURRUUUUR, URUUURURUUURU, RUUURUURUUURU, UURUUURUUURUU, URUUUURUUUURU, RUUUUURUUUUUR, UUURUURUURUUU and UURUUUURUURUU;

wherein in the PUCCH structure, U represents a symbol location used for transmitting UCI, and R represents a symbol location used for transmitting RS.

In one possible implementation, when the number A is 14:

the PUCCH structure set includes one PUCCH structure, and the PUCCH structure included in the PUCCH structure set includes two symbol locations used for transmitting RS and is one of the following PUCCH structures: UURUUUUUUURUU, UUUURUUUURUUUU, URUUUUUUUUURU, RUUUUURUUUUUU, UUURUUUUURUUU, UUUUUURRUUUUUU and RUUUUUUUUUUUUR; or the PUCCH structure set includes one PUCCH structure, and the PUCCH structure included in the PUCCH structure set includes three or four symbol locations used for transmitting RS and is one of the following PUCCH structures: URUUURUURUUURU, UURURUUUURURUU, URUURUUUURUURU, URUURUUURUURUU, URURUUUUUURURU, UURUURUURUURUU, UURRUUUUUURRUU, UUURRUUUURRUUU, RUURUUURUURUUU, RUURUUUUUURUUR, RUUURUUUURUUUR, RUUUUURRUUUUUR, UURUURUUURUURU, URUUUURUUUURUU, URUUUURUUUURU, URUUUUURUUUURU, RUUUUURUUUUUUR, RUUUUUURUUUUUR, RUUUUURUUUUURU, URUUUUURUUUUUR, UUURUUURUURUUU, UUURUURUUURUUU, UURUUURUUURUUU and UURUUUURUUURUU; or the PUCCH structure set includes two PUCCH structures, wherein a first PUCCH structure includes one or two symbol locations used for transmitting RS and is one of the following PUC CH structures: UURUUUUUUUURUU, UUUURUUURUUUU, URUUUUUUUUUURU, RUUUUUURUUUUUU, UUURUUUUUURUUU, UUUUUURRUUUUUU, RUUUUUUUUUUUUR, RUUUUUUUUUUUUU and UUUUUURUUUUUUU; and a second PUCCH structure includes three or four symbol locations used for transmitting RS and is one of the following PUCCH structures: URUUURUURUUURU, UURURUUUURURUU, URUURUUUURUURU, URUURUUURUURUU, URURUUUUUURURU, UURUURUURUURUU, UURRUUUUUURRUU, UUURRUUUURRUUU, RUURUUURUURUUU, RUURUUUUURUUR, RUUURUUUURUUUR, RUUUUURRUUUUR, UURUURUUURUURU, URUUUURUUUURUU, URUUUURUUUUURU, URUUUURUUUURU, RUUUUURUUUUUR, RUUUUUURUUUUUR, RUUUUURUUUUURU, URUUUURUUUUUR, UUURUUURUURUUU, UUURUURUUURUUU, UURUUURUUURUUU and UURUUUURUUURUU;

wherein in the PUCCH structure, U represents a symbol location used for transmitting UCI, and R represents a symbol location used for transmitting RS.

Embodiment 4

Figure 4:
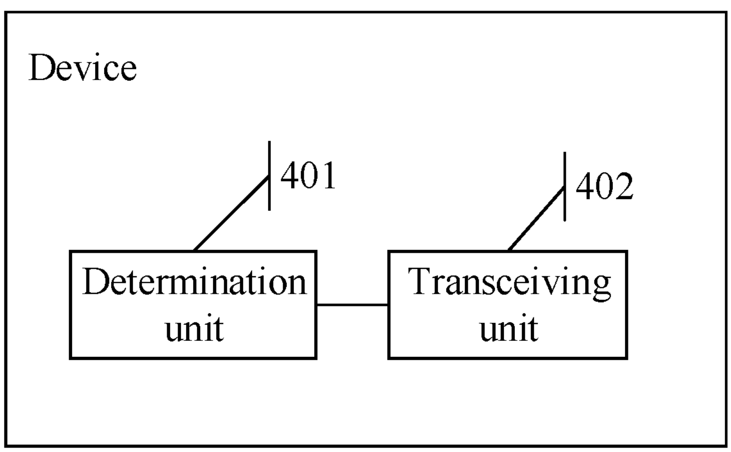
FIG. 4 is a structural block diagram of a device in an embodiment of the present embodiment.

Referring to FIG. 4, provided by an embodiment of the present application is a device including a determination unit 401 and a transceiving unit 402.

The determination unit 401 is configured for determining the number A of symbols occupied by a PUCCH, the number A being a positive integer; determining a PUCCH structure set that is defined in correspondence to the number A of the symbols, a PUCCH structure included in the PUCCH structure set including the number A of symbol locations, the PUCCH structure set including one or more PUCCH structures, and when multiple PUCCH structures are included, the number of symbol locations used for transmitting pilot (RS) information in different PUCCH structures being different, wherein a PUCCH structure is a distribution rule for symbol locations used for transmitting uplink control information (UCI) and symbol locations used for transmitting RS; and determining a PUCCH structure corresponding to the PUCCH from the PUCCH structure set;

The transceiving unit 402 is configured for performing PUCCH reception on the basis of the corresponding PUCCH structure.

In one possible implementation, the determination unit 401 is configured for:

taking a PUCCH structure included in the PUCCH structure set as the corresponding PUCCH structure when the PUCCH structure set includes one PUCCH structure; or selecting one PUCCH structure as the corresponding PUCCH structure from the PUCCH structure set when the PUCCH structure set includes multiple PUCCH structures;

the transceiving unit 402 is further configured for informing a selection result to a terminal through a configuration instruction;

the determination unit 401 is configured for selecting the PUCCH structure with most symbol locations used for transmitting RS as the corresponding PUCCH structure from the PUCCH structure set when it is determined that frequency hopping is performed during PUCCH transmission; and the transceiving unit 402 is further configured for informing the terminal of a demand for frequency hopping through a configuration instruction.

In one possible implementation, the PUCCH structure set including one or more PUCCH structures includes:

when the value of the number A of the symbols is X1 to X2, for each number A of the symbols within X1 to X2, at least two PUCCH structures are defined in the PUCCH structure set; when the value of the number A of the symbols is (X2+1) to X4, for each number A of the symbols within (X2+1) to X4, one PUCCH structure is defined in the PUCCH structure set; or when the value of the number A of the symbols is X1 to X2 and X3 to X4, for each number A of the symbols within X1 to X2 and X3 to X4, at least two PUCCH structures are defined in the PUCCH structure set; when the value of the number A of the symbols is (X2+1) to (X3−1), for each number A of the symbols within (X2+1) to (X3−1), one PUCCH structure is defined in the PUCCH structure set; or with regard to the value of each number A of the symbols supported by the PUCCH, at least two PUCCH structures are defined in the PUCCH structure set; or with regard to the value of each number A of the symbols supported by the PUCCH, one PUCCH structure is defined in the PUCCH structure set;

wherein X1, X2, X3 and X4 are positive integers, and X1<X2<X3<X4.

In one possible implementation, the transceiving unit 402 is configured for:

respectively receiving information carried in a first symbol group and information carried in a second symbol group at different frequency domain positions by taking first $$\left\lfloor \frac{A}{2} \right\rfloor$$

symbols included by the PUCCH as the first symbol group and last $$\left(A-\left\lfloor \frac{A}{2} \right\rfloor\right)$$

symbols included by the PUCCH as the second symbol group when it is determined that frequency hopping is performed during PUCCH transmission; or respectively receiving information carried in a first symbol group and information carried in a second symbol group at different frequency domain positions by taking first $$\left\lceil \frac{A}{2} \right\rceil$$

symbols included by the PUCCH as the first symbol group and last $$\left(A-\left\lceil \frac{A}{2} \right\rceil\right)$$

symbols included by the PUCCH as the second symbol group.

In one possible implementation, when the number A is 4:

the PUCCH structure set includes one PUCCH structure, and the PUCCH structure included in the PUCCH structure set includes one symbol location used for transmitting RS and is one of the following PUCCH structures: URUU, UURU and RUUU; or the PUCCH structure set includes one PUCCH structure, and the PUCCH structure included in the PUCCH structure set includes two symbol locations used for transmitting RS and is one of the following PUCCH structures: URRU, RURU, RUUR and URUR; or the PUCCH structure set includes two PUCCH structures, wherein a first PUCCH structure includes one symbol location used for transmitting RS and is one of the following PUCCH structures: URUU, UURU and RUUU; and a second PUCCH structure includes two symbol locations used for transmitting RS and is one of the following PUCCH structures: URRU, RURU, RUUR and URUR;

wherein in the PUCCH structure, U represents a symbol location used for transmitting UCI, and R represents a symbol location used for transmitting RS.

In one possible implementation, when the number A is 5:

the PUCCH structure set includes one PUCCH structure, and the PUCCH structure included in the PUCCH structure set includes one symbol location used for transmitting RS and is one of the following PUCCH structures: UURUU, URUUU and RUUUU; or the PUCCH structure set includes one PUCCH structure, and the PUCCH structure included in the PUCCH structure set includes two symbol locations used for transmitting RS and is one of the following PUCCH structures: URRUU, UURRU, RUURU, RURUU and URURU; or the PUCCH structure set includes two PUCCH structures, wherein a first PUCCH structure includes one symbol location used for transmitting RS and is one of the following PUCCH structures: UURUU, URUUU and RUUUU; and a second PUCCH structure includes two symbol locations used for transmitting RS and is one of the following PUCCH structures: URRUU, UURRU, RUURU, RURUU and URURU;

wherein in the PUCCH structure, U represents a symbol location used for transmitting UCI, and R represents a symbol location used for transmitting RS.

In one possible implementation, when the number A is 6:

the PUCCH structure set includes one PUCCH structure, and the PUCCH structure included in the PUCCH structure set includes one symbol location used for transmitting RS and is one of the following PUCCH structures: URUUUU, UURUUU, UUURUU and RUUUUU; or the PUCCH structure set includes one PUCCH structure, and the PUCCH structure included in the PUCCH structure set includes two symbol locations used for transmitting RS and is one of the following PUCCH structures: URURUU, URUURU, RUUUUR, URUUUR, RUUURU and UURRUU; or the PUCCH structure set includes two PUCCH structures, wherein a first PUCCH structure includes one symbol location used for transmitting RS and is one of the following PUCCH structures: URUUUU, UURUUU, UUURUU and RUUUUU; and a second PUCCH structure includes two symbol locations used for transmitting RS and is one of the following PUCCH structures: URURUU, URUURU, RUUUUR, URUUUR, RUUURU and UURRUU;

wherein in the PUCCH structure, U represents a symbol location used for transmitting UCI, and R represents a symbol location used for transmitting RS.

In one possible implementation, when the number A is 7:

the PUCCH structure set includes one PUCCH structure, and the PUCCH structure included in the PUCCH structure set includes one symbol location used for transmitting RS and is one of the following PUCCH structures: URUUUUU, UURUUUU, UUURUUU and RUUUUUU; or the PUCCH structure set includes one PUCCH structure, and the PUCCH structure included in the PUCCH structure set includes two symbol locations used for transmitting RS and is one of the following PUCCH structures: RUUUUUR, URUUUUR, RUUUURU, URUUURU, URUURUU, UURURUU, UURRUUU and UUURRUU; or the PUCCH structure set includes two PUCCH structures, wherein a first PUCCH structure includes one symbol location used for transmitting RS and is one of the following PUCCH structures: URUUUUU, UURUUUU, UUURUUU and RUUUUUU; and a second PUCCH structure includes two symbol locations used for transmitting RS and is one of the following PUCCH structures: RUUUUUR, URUUUUR, RUUUURU, URUUURU, URUURUU, UURURUU, UURRUUU and UUURRUU;

wherein in the PUCCH structure, U represents a symbol location used for transmitting UCI, and R represents a symbol location used for transmitting RS.

In one possible implementation, when the number A is 8:

the PUCCH structure set includes one PUCCH structure, and the PUCCH structure included in the PUCCH structure set includes two symbol locations used for transmitting RS and is one of the following PUCCH structures: URUUUURU, URUUURUU, RUUUUUUR, RUUUUURU, RUUUURUU, RUUURUUU, UUURRUUU and UURUURUU; or the PUCCH structure set includes one PUCCH structure, and the PUCCH structure included in the PUCCH structure set includes three or four symbol locations used for transmitting RS and is one of the following PUCCH structures: URRUURRU, URURURUR, RURURURU, RUURRUUR, RURUURUR, RUURUURU, RUURUUUR, RUUURUUR, URURUURU and URURURUU; or the PUCCH structure set includes two PUCCH structures, wherein a first PUCCH structure includes one or two symbol locations used for transmitting RS and is one of the following PUCCH structures: URUUUURU, URUUURUU, RUUUUUUR, RUUUUURU, RUUUURUU, RUUURUUU, UUURRUUU, UURUURUU, UUURUUUU and RUUUUUUU; and a second PUCCH structure includes three or four symbol locations used for transmitting RS and is one of the following PUCCH structures: URRUURRU, URURURUR, RURURURU, RURUURUR, RUURRUUR, RUURUURU, RUURUUUR, RUUURUUR, URURUURU and URURURUU;

wherein in the PUCCH structure, U represents a symbol location used for transmitting UCI, and R represents a symbol location used for transmitting RS.

In one possible implementation, when the number A is 9:

the PUCCH structure set includes one PUCCH structure, and the PUCCH structure included in the PUCCH structure set includes two symbol locations used for transmitting RS and is one of the following PUCCH structures: UURUUURUU, URUUUURUU, URUUUUURU, URUUURUUU, RUUURUUUU, RUUUUUUUR, RUUUUURUU, RUUUUUURU, RUUUURUUU, UURUUUURU, UUUURRUUU and UUURRUUUU; or the PUCCH structure set includes one PUCCH structure, and the PUCCH structure included in the PUCCH structure set includes three or four symbol locations used for transmitting RS and is one of the following PUCCH structures: URURURURU, URRUURRUU, URRUUURRU, RUURRUURU, RUURRUUUR, RUUURRUUR, RUURURUUR, RURUURUUR, URURURUUR, RUUURUUUR, URUURUURU and URUUURURU; or the PUCCH structure set includes two PUCCH structures, wherein a first PUCCH structure includes one or two symbol locations used for transmitting RS and is one of the following PUCCH structures: UURUUURUU, URUUUURUU, URUUUUURU, URUUURUUU, RUUURUUUU, RUUUUUUUR, RUUUUURUU, RUUUUUURU, RUUUURUUU, UURUUUURU, UUUURRUUU, UUURRUUUU, RUUUUUUUU and UUUURUUUU; and a second PUCCH structure includes three or four symbol locations used for transmitting RS and is one of the following PUCCH structures: URURURURU, URRUURRUU, URRUUURRU, RUURRUURU, RUURRUUUR, RUUURRUUR, RUURURUUR, RURUURUUR, URURURUUR, RUUURUUUR, URUURUURU and URUUURURU;

wherein in the PUCCH structure, U represents a symbol location used for transmitting UCI, and R represents a symbol location used for transmitting RS.

In one possible implementation, when the number A is 10:

the PUCCH structure set includes one PUCCH structure, and the PUCCH structure included in the PUCCH structure set includes two symbol locations used for transmitting RS and is one of the following PUCCH structures: UURUUUURUU, URUUUURUUU, URUUUUUURU, RUUUURUUUU, UURUUURUUU, URUUURUUUU, URUUUUURUU, RUUUUUUUUR, RUUUUUURUU, RUUUUURUUU and UUUURRUUUU; or the PUCCH structure set includes one PUCCH structure, and the PUCCH structure included in the PUCCH structure set includes three or four symbol locations used for transmitting RS and is one of the following PUCCH structures: URURURURUU, URURUURURU, URUURRUURU, URRUUUURRU, UURRUURRUU, RUURUURUUR, RUUURRUUUR, URURURUURU, RUUURUUURU, RUUURUUUUR, URUURUURUU and URUUURUUUR; or the PUCCH structure set includes two PUCCH structures, wherein a first PUCCH structure includes one or two symbol locations used for transmitting RS and is one of the following PUCCH structures: UURUUUURUU, URUUUURUUU, URUUUUUURU, RUUUURUUUU, UURUUURUUU, URUUURUUUU, URUUUUURUU, RUUUUUUUUR, RUUUUUURUU, RUUUUURUUU, UUUURRUUUU, RUUUUUUUUU and UUUURUUUUU; and a second PUCCH structure includes three or four symbol locations used for transmitting RS and is one of the following PUCCH structures: URURURURUU, URURUURURU, URUURRUURU, URRUUUURRU, UURRUURRUU, RUURUURUUR, RUUURRUUUR, URURURUURU, RUUURUUURU, RUUURUUUUR, URUURUURUU and URUUURUUUR;

wherein in the PUCCH structure, U represents a symbol location used for transmitting UCI, and R represents a symbol location used for transmitting RS.

In one possible implementation, when the number A is 11:

the PUCCH structure set includes one PUCCH structure, and the PUCCH structure included in the PUCCH structure set includes two symbol locations used for transmitting RS and is one of the following PUCCH structures: UURUUURUUU, UURUUUUURUU, URUUUUURUUU, URUUUUUUURU, RUUUURUUUUU, RUUUUURUUUU, UUURUUURUUU, URUUURUUUU, RUUUUUUUURU, URUUUUUUUUR, URUUUUUURUU, UUUURRUUUUU and RUUUUUUUUUR; or the PUCCH structure set includes one PUCCH structure, and the PUCCH structure included in the PUCCH structure set includes three or four symbol locations used for transmitting RS and is one of the following PUCCH structures: UURURURURUU, URURUURURUU, URURUURUURU, URURUUURURU, URUURURUURU, URRUUUURRU, URRUUUURRUU, UURRUUURRUU, RUURUUURUUR, RUUURURUUUR, RUUURRUUUR, RUUUURRUUUR, URUUURUUURU, RUUUURUUUUR, UURUURUURUU and URUUURUUURU; or the PUCCH structure set includes two PUCCH structures, wherein a first PUCCH structure includes one or two symbol locations used for transmitting RS and is one of the following PUCCH structures: UURUUUURUUU, UURUUUUURUU, URUUUUURUUU, URUUUUUUURU, RUUUURUUUUU, RUUUUURUUUU, UUURUUURUUU, URUUURUUUU, RUUUUUUUURU, URUUUUUUUUR, URUUUUUURUU, UUUURRUUUUU, RUUUUUUUUUR, RUUUUUUUUUU and UUUUURUUUUU; and a second PUCCH structure includes three or four symbol locations used for transmitting RS and is one of the following PUCCH structures: UURURURURUU, URURUURURUU, URURUURUURU, URURUUURURU, URUURURUURU, URRUUUUURRU, URRUUUURRUU, UURRUUURRUU, RUURUUURUUR, RUUURURUUUR, RUUURRUUUUR, RUUUURRUUUR, URUUURUUURU, RUUUURUUUUR, UURUURUURUU and URUUURUUURU;

wherein in the PUCCH structure, U represents a symbol location used for transmitting UCI, and R represents a symbol location used for transmitting RS.

In one possible implementation, when the number A is 12:

the PUCCH structure set includes one PUCCH structure, and the PUCCH structure included in the PUCCH structure set includes two symbol locations used for transmitting RS and is one of the following PUCCH structures: UUURUUUURUUU, UURUUUUUURUU, UURUUUUURUUU, URUUUUUUUURU, RUUUUURUUUUU, UURUUURUUUU, UUUUURRUUUUU and RUUUUUUUUUUR; or the PUCCH structure set includes one PUCCH structure, and the PUCCH structure included in the PUCCH structure set includes three or four symbol locations used for transmitting RS and is one of the following PUCCH structures: UURURUURURUU, URUURUURUURU, URURUUURURUU, URURUUUURURU, UURRUUUURRUU, UURRUUURRUUU, RUURUUUURUUR, RUUURUURUUUR, RUUUURRUUUUR, RUUURURUUURU, URUUURUUURUU, URUUURUUUURU, URUUUURUUURU, RUUUURUUUURU, RUUUUURUUUUR, RUUUURUUUUUR, UURUURUUURUU, UURUUURUURUU and UURUURUURUUU; or the PUCCH structure set includes two PUCCH structures, wherein a first PUCCH structure includes one or two symbol locations used for transmitting RS and is one of the following PUCCH structures: UUURUUUURUUU, UURUUUUURUU, UURUUUUURUUU, URUUUUUUUURU, RUUUUURUUUUU, UURUUURUUUU, UUUUURRUUUU, RUUUUUUUUUUR, RUUUUUUUUUUU and UUUUURUUUUUU; and a second PUCCH structure includes three or four symbol locations used for transmitting RS and is one of the following PUCCH structures: UURURUURURUU, URUURUURUURU, URURUUURURUU, URURUUUURURU, UURRUUUURRUU, UURRUUURRUUU, RUURUUUURUUR, RUUURUURUUUR, RUUUURRUUUUR, RUUURURUUURU, URUUURUUURUU, URUUURUUUURU, URUUUURUUURU, RUUUURUUUURU, RUUUUURUUUUR, RUUUURUUUUUR, UURUURUUURUU, UURUUURUURUU and UURUURUURUUU;

wherein in the PUCCH structure, U represents a symbol location used for transmitting UCI, and R represents a symbol location used for transmitting RS.

In one possible implementation, when the number A is 13:

the PUCCH structure set includes one PUCCH structure, and the PUCCH structure included in the PUCCH structure set includes two symbol locations used for transmitting RS and is one of the following PUCCH structures: UURUUUUUUURUU, UUURUUUUURUUU, URUUUUUUUUURU, RUUUUURUUUUUU, RUUUUUURUUUUU, UURUUUUUURUUU, UUUUURRUUUUUU and RUUUUUUUUUUUR; or the PUCCH structure set includes one PUCCH structure, and the PUCCH structure included in the PUCCH structure set includes three or four symbol locations used for transmitting RS and is one of the following PUCCH structures: UURURUUURURUU, URUURUUURUURU, URURUUUUURURU, URUURUURUURUU, URUURUURUUURU, UURRUUUUURRUU, UUURRUUURRUUU, RUURUURUURUUU, RUURUUUUURUUR, RUUURUUURUUUR, RUUUURRUUUUUR, URUUURURUUURU, RUUURUURUUURU, UURUUURUUURUU, URUUUURUUUURU, RUUUUURUUUUUR, UURUURUURUUU and UURUUUURUURUU; or the PUCCH structure set includes two PUCCH structures, wherein a first PUCCH structure includes one or two symbol locations used for transmitting RS and is one of the following PUCCH structures: UURUUUUUUURUU, UUURUUUURUUU, URUUUUUUUUURU, RUUUURUUUUUU, RUUUUUURUUUUU, UURUUUUUURUUU, UUUUURRUUUUUU, RUUUUUUUUUUUR, RUUUUUUUUUUUU and UUUUUURUUUUUU; and a second PUCCH structure includes three or four symbol locations used for transmitting RS and is one of the following PUCCH structures: UURURUUURURUU, URUURUUURUURU, URURUUUUURURU, URUURUURUURUU, URUURUURUUURU, UURRUUUUURRUU, UUURRUUURRUUU, RUURUURUURUUU, RUURUUUUURUUR, RUUURUUURUUUR, RUUUURRUUUUR, URUUURURUUURU, RUUURUURUUURU, UURUUURUUURUU, URUUUURUUUURU, RUUUUURUUUUR, UUURUURUURUUU and UURUUUURUURUU;

wherein in the PUCCH structure, U represents a symbol location used for transmitting UCI, and R represents a symbol location used for transmitting RS.

In one possible implementation, when the number A is 14:

the PUCCH structure set includes one PUCCH structure, and the PUCCH structure included in the PUCCH structure set includes two symbol locations used for transmitting RS and is one of the following PUCCH structures: UURUUUUUUURUU, UUUURUUUURUUUU, URUUUUUUUUURU, RUUUUUURUUUUUU, UUURUUUUURUUU, UUUUUURRUUUUUU and RUUUUUUUUUUUUR; or the PUCCH structure set includes one PUCCH structure, and the PUCCH structure included in the PUCCH structure set includes three or four symbol locations used for transmitting RS and is one of the following PUCCH structures: URUUURUURUUURU, UURURUUUURURUU, URUURUUURUURU, URUURUUURUURUU, URURUUUUURURU, UURUURUURUURUU, UURRUUUUURRUU, UUURRUUURRUUU, RUURUUURUURUUU, RUURUUUUURUUR, RUUURUUUURUUUR, RUUUUURRUUUUUR, UURUURUUURUURU, URUUUURUUUURUU, URUUUURUUUURU, URUUUUURUUUURU, RUUUUURUUUUUR, RUUUUUURUUUUUR, RUUUUURUUUUURU, URUUUUURUUUUUR, UUURUUURUURUUU, UUURUURUUURUUU, UURUUURUUURUUU and UURUUUURUUURUU; or the PUCCH structure set includes two PUCCH structures, wherein a first PUCCH structure includes one or two symbol locations used for transmitting RS and is one of the following PUCCH structures: UURUUUUUUUURUU, UUUURUUUURUUUU, URUUUUUUUUUURU, RUUUUUURUUUUUU, UUURUUUUUURUUU, UUUUUURRUUUUUU, RUUUUUUUUUUUUR, RUUUUUUUUUUUUU and UUUUUURUUUUUUU; and a second PUCCH structure includes three or four symbol locations used for transmitting RS and is one of the following PUCCH structures: URUUURUURUUURU, UURURUUUURURUU, URUURUUUURUURU, URUURUUURUURUU, URURUUUUUURURU, UURUURUURUURUU, UURRUUUUUURRUU, UUURRUUUURRUUU, RUURUUURUURUUU, RUURUUUUURUUR, RUUURUUUURUUUR, RUUUURRUUUUR, UURUURUUURUURU, URUUUURUUUURUU, URUUUURUUUUURU, URUUUURUUUURU, RUUUUURUUUUUR, RUUUUUURUUUUUR, RUUUUURUUUUURU, URUUUURUUUUUR, UUURUUURUURUUU, UUURUURUUURUUU, UURUUURUUURUUU and UURUUUURUUURUU;

wherein in the PUCCH structure, U represents a symbol location used for transmitting UCI, and R represents a symbol location used for transmitting RS.

Embodiment 5

Figure 5:
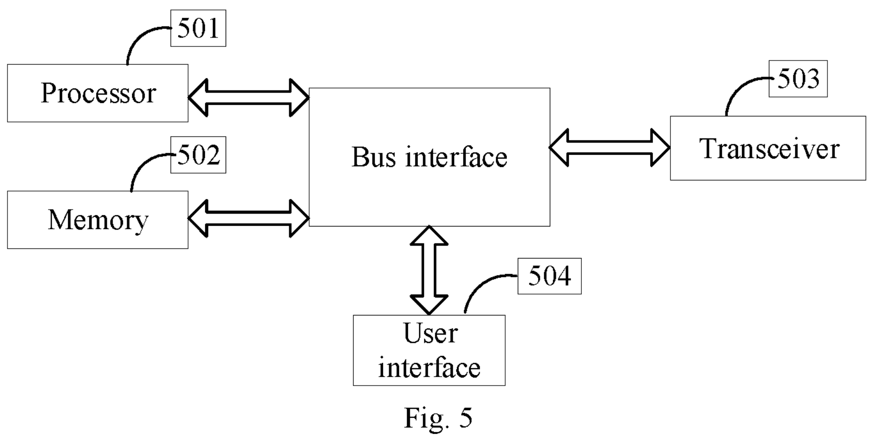
FIG. 5 is a schematic structural diagram of a user equipment in an embodiment of the present application.

Referring to FIG. 5, provided by an embodiment of the present application is another user equipment including a processor 501 as well as a memory 502 and a transceiver 503 connected with the processor 501. The processor 501 is configured for reading a program in the memory 502 to execute the following process.

In FIG. 5, a bus structure can include any number of interconnected buses and bridges and can specifically link various circuits of one or more processors represented by the processor 501 and a memory represented by the memory 502 together. The bus structure can also link various other circuits such as peripheral equipment, a voltage stabilizer and a power management circuit together, which are publically known by those skilled in the art and will not be further described herein. A bus interface is provided with an interface. The transceiver 503 can be multiple elements, namely a transmitter and a receiver, and is provided with units for communication with various other devices on a transmission medium. For different user equipments, the user interface 504 can also be an interface which can be externally or internally connected with required equipment, and the connected equipment includes, but is not limited, to a keypad, a display, a loudspeaker, a microphone, an operating lever and the like.

The processor 501 takes charge of managing the bus structure and ordinary processing, and the memory 502 can store data used when the processor 501 performs operations.

The processor 501 is configured for reading a program in the memory 502 to execute the following process:

the number A of symbols occupied by a PUCCH is determined, and the number A is a positive integer;

a PUCCH structure set that is defined in correspondence to the number A of the symbols is determined, a PUCCH structure included in the PUCCH structure set includes the number A of symbol locations, the PUCCH structure set includes one or more PUCCH structures, and when multiple PUCCH structures are included, the number of symbol locations used for transmitting pilot (RS) information in different PUCCH structures is different, wherein a PUCCH structure is a distribution rule for symbol locations used for transmitting uplink control information (UCI) and symbol locations used for transmitting RS; and a PUCCH structure corresponding to the PUCCH is determined from the PUCCH structure set, and PUCCH transmission is performed through the transceiver 503 on the basis of the corresponding PUCCH structure.

In one possible implementation, the operation that a PUCCH structure corresponding to the PUCCH is determined from the PUCCH structure set when the PUCCH structure set includes one PUCCH structure includes: a PUCCH structure included in the PUCCH structure set is taken as the corresponding PUCCH structure; or the operation that a PUCCH structure corresponding to the PUCCH is determined from the PUCCH structure set when the PUCCH structure set includes multiple PUCCH structures includes:

one PUCCH structure is selected as the corresponding PUCCH structure from the PUCCH structure set according to an acquired configuration instruction; and/or the PUCCH structure with most symbol locations used for transmitting RS is selected as the corresponding PUCCH structure from the PUCCH structure set when it is determined that frequency hopping is performed during PUCCH transmission.

In one possible implementation, the PUCCH structure set including one or more PUCCH structures includes:

when the value of the number A of the symbols is X1 to X2, for each number A of the symbols within X1 to X2, at least two PUCCH structures are defined in the PUCCH structure set; when the value of the number A of the symbols is (X2+1) to X4, for each number A of the symbols within (X2+1) to X4, one PUCCH structure is defined in the PUCCH structure set; or when the value of the number A of the symbols is X1 to X2 and X3 to X4, for each number A of the symbols within X1 to X2 and X3 to X4, at least two PUCCH structures are defined in the PUCCH structure set; when the value of the number A of the symbols is (X2+1) to (X3−1), for each number A of the symbols within (X2+1) to (X3−1), one PUCCH structure is defined in the PUCCH structure set; or with regard to the value of each number A of the symbols supported by the PUCCH, at least two PUCCH structures are defined in the PUCCH structure set; or with regard to the value of each number A of the symbols supported by the PUCCH, one PUCCH structure is defined in the PUCCH structure set;

wherein X1, X2, X3 and X4 are positive integers, and X1<X2<X3<X4.

In one possible implementation, the operation that a PUCCH structure corresponding to the PUCCH is determined from the PUCCH structure set when it is determined that frequency hopping is performed during PUCCH transmission, and the transceiver 503 is controlled to perform PUCCH transmission on the basis of the corresponding PUCCH structure, includes:

the transceiver 503 is controlled to respectively transmit information carried in a first symbol group and information carried in a second symbol group at different frequency domain positions by taking first $$\left\lfloor \frac{A}{2} \right\rfloor$$

symbols included by the PUCCH as the first symbol group and last $$\left(A - \left\lfloor \frac{A}{2} \right\rfloor\right)$$

symbols included by the PUCCH as the second symbol group; or the transceiver 503 is controlled to respectively transmit information carried in a first symbol group and information carried in a second symbol group at different frequency domain positions by taking first $$\left\lceil \frac{A}{2} \right\rceil$$

symbols included by the PUCCH as the first symbol group and last $$\left(A - \left\lceil \frac{A}{2} \right\rceil\right)$$

symbols included by the PUCCH as the second symbol group.

In one possible implementation, when the number A is 4:

the PUCCH structure set includes one PUCCH structure, and the PUCCH structure included in the PUCCH structure set includes one symbol location used for transmitting RS and is one of the following PUCCH structures: URUU, UURU and RUUU; or the PUCCH structure set includes one PUCCH structure, and the PUCCH structure included in the PUCCH structure set includes two symbol locations used for transmitting RS and is one of the following PUCCH structures: URRU, RURU, RUUR and URUR; or the PUCCH structure set includes two PUCCH structures, wherein a first PUCCH structure includes one symbol location used for transmitting RS and is one of the following PUCCH structures: URUU, UURU and RUUU; and a second PUCCH structure includes two symbol locations used for transmitting RS and is one of the following PUCCH structures: URRU, RURU, RUUR and URUR;

wherein in the PUCCH structure, U represents a symbol location used for transmitting UCI, and R represents a symbol location used for transmitting RS.

In one possible implementation, when the number A is 5:

the PUCCH structure set includes one PUCCH structure, and the PUCCH structure included in the PUCCH structure set includes one symbol location used for transmitting RS and is one of the following PUCCH structures: UURUU, URUUU and RUUUU; or the PUCCH structure set includes one PUCCH structure, and the PUCCH structure included in the PUCCH structure set includes two symbol locations used for transmitting RS and is one of the following PUCCH structures: URRUU, UURRU, RUURU, RURUU and URURU; or the PUCCH structure set includes two PUCCH structures, wherein a first PUCCH structure includes one symbol location used for transmitting RS and is one of the following PUCCH structures: UURUU, URUUU and RUUUU; and a second PUCCH structure includes two symbol locations used for transmitting RS and is one of the following PUCCH structures: URRUU, UURRU, RUURU, RURUU and URURU;

wherein in the PUCCH structure, U represents a symbol location used for transmitting UCI, and R represents a symbol location used for transmitting RS.

In one possible implementation, when the number A is 6:

the PUCCH structure set includes one PUCCH structure, and the PUCCH structure included in the PUCCH structure set includes one symbol location used for transmitting RS and is one of the following PUCCH structures: URUUUU, UURUUU, UUURUU and RUUUUU; or the PUCCH structure set includes one PUCCH structure, and the PUCCH structure included in the PUCCH structure set includes two symbol locations used for transmitting RS and is one of the following PUCCH structures: URURUU, URUURU, RUUUUR, URUUUR, RUUURU and UURRUU; or the PUCCH structure set includes two PUCCH structures, wherein a first PUCCH structure includes one symbol location used for transmitting RS and is one of the following PUCCH structures: URUUUU, UURUUU, UUURUU and RUUUUU; and a second PUCCH structure includes two symbol locations used for transmitting RS and is one of the following PUCCH structures: URURUU, URUURU, RUUUUR, URUUUR, RUUURU and UURRUU;

wherein in the PUCCH structure, U represents a symbol location used for transmitting UCI, and R represents a symbol location used for transmitting RS.

In one possible implementation, when the number A is 7:

the PUCCH structure set includes one PUCCH structure, and the PUCCH structure included in the PUCCH structure set includes one symbol location used for transmitting RS and is one of the following PUCCH structures: URUUUUU, UURUUUU, UUURUUU and RUUUUUU; or the PUCCH structure set includes one PUCCH structure, and the PUCCH structure included in the PUCCH structure set includes two symbol locations used for transmitting RS and is one of the following PUCCH structures: RUUUUUR, URUUUUR, RUUUURU, URUUURU, URUURUU, UURURUU, UURRUUU and UUURRUU; or the PUCCH structure set includes two PUCCH structures, wherein a first PUCCH structure includes one symbol location used for transmitting RS and is one of the following PUCCH structures: URUUUUU, UURUUUU, UUURUUU and RUUUUUU; and a second PUCCH structure includes two symbol locations used for transmitting RS and is one of the following PUCCH structures: RUUUUUR, URUUUUR, RUUUURU, URUUURU, URUURUU, UURURUU, UURRUUU and UUURRUU;

wherein in the PUCCH structure, U represents a symbol location used for transmitting UCI, and R represents a symbol location used for transmitting RS.

In one possible implementation, when the number A is 8:

the PUCCH structure set includes one PUCCH structure, and the PUCCH structure included in the PUCCH structure set includes two symbol locations used for transmitting RS and is one of the following PUCCH structures: URUUUURU, URUUURUU, RUUUUUUR, RUUUUURU, RUUUURUU, RUUURUUU, UUURRUUU and UURUURUU; or the PUCCH structure set includes one PUCCH structure, and the PUCCH structure included in the PUCCH structure set includes three or four symbol locations used for transmitting RS and is one of the following PUCCH structures: URRUURRU, URURURUR, RURURURU, RUURRUUR, RURUURUR, RUURUURU, RUURUUUR, RUUURUUR, URURUURU and URURURUU; or the PUCCH structure set includes two PUCCH structures, wherein a first PUCCH structure includes one or two symbol locations used for transmitting RS and is one of the following PUCCH structures: URUUUURU, URUUURUU, RUUUUUUR, RUUUUURU, RUUUURUU, RUUURUUU, UUURRUUU, UURUURUU, UUURUUUU and RUUUUUUU; and a second PUCCH structure includes three or four symbol locations used for transmitting RS and is one of the following PUCCH structures: URRUURRU, URURURUR, RURURURU, RURUURUR, RUURRUUR, RUURUURU, RUURUUUR, RUUURUUR, URURUURU and URURURUU;

wherein in the PUCCH structure, U represents a symbol location used for transmitting UCI, and R represents a symbol location used for transmitting RS.

In one possible implementation, when the number A is 9:

the PUCCH structure set includes one PUCCH structure, and the PUCCH structure included in the PUCCH structure set includes two symbol locations used for transmitting RS and is one of the following PUCCH structures: UURUUURUU, URUUUURUU, URUUUUURU, URUUURUUU, RUUURUUUU, RUUUUUUUR, RUUUUURUU, RUUUUUURU, RUUUURUUU, UURUUUURU, UUURRUUUU and UUURRUUUU; or the PUCCH structure set includes one PUCCH structure, and the PUCCH structure included in the PUCCH structure set includes three or four symbol locations used for transmitting RS and is one of the following PUCCH structures: URURURURU, URRUURRUU, URRUUURRU, RUURRUURU, RUURRUUUR, RUUURRUUR, RUURURUUR, RURUURUUR, URURURUUR, RUUURUUUR, URUURUURU and URUUURURU; or the PUCCH structure set includes two PUCCH structures, wherein a first PUCCH structure includes one or two symbol locations used for transmitting RS and is one of the following PUCCH structures: UURUUURUU, URUUUURUU, URUUUUURU, URUUURUUU, RUUURUUUU, RUUUUUUUR, RUUUUURUU, RUUUUUURU, RUUUURUUU, UURUUUURU, UUUURRUUU, UUURRUUUU, RUUUUUUUU and UUUURUUUU; and a second PUCCH structure includes three or four symbol locations used for transmitting RS and is one of the following PUCCH structures: URURURURU, URRUURRUU, URRUUURRU, RUURRUURU, RUURRUUUR, RUUURRUUR, RUURURUUR, RURUURUUR, URURURUUR, RUUURUUUR, URUURUURU and URUUURURU;

wherein in the PUCCH structure, U represents a symbol location used for transmitting UCI, and R represents a symbol location used for transmitting RS.

In one possible implementation, when the number A is 10:

the PUCCH structure set includes one PUCCH structure, and the PUCCH structure included in the PUCCH structure set includes two symbol locations used for transmitting RS and is one of the following PUCCH structures: UURUUUURUU, URUUUURUUU, URUUUUUURU, RUUUURUUUU, UURUUURUUU, URUUURUUUU, URUUUUURUU, RUUUUUUUUR, RUUUUUURUU, RUUUUURUUU and UUUURRUUUU; or the PUCCH structure set includes one PUCCH structure, and the PUCCH structure included in the PUCCH structure set includes three or four symbol locations used for transmitting RS and is one of the following PUCCH structures: URURURURUU, URURUURURU, URUURRUURU, URRUUUURRU, UURRUURRUU, RUURUURUUR, RUUURRUUUR, URURURUURU, RUUURUUURU, RUUURUUUUR, URUURUURUU and URUUURUUUR; or the PUCCH structure set includes two PUCCH structures, wherein a first PUCCH structure includes one or two symbol locations used for transmitting RS and is one of the following PUCCH structures: UURUUUURUU, URUUUURUUU, URUUUUUURU, RUUUURUUUU, UURUUURUUU, URUUURUUUU, URUUUUURUU, RUUUUUUUUR, RUUUUUURUU, RUUUUURUUU, UUUURRUUUU, RUUUUUUUUU and UUUURUUUUU; and a second PUCCH structure includes three or four symbol locations used for transmitting RS and is one of the following PUCCH structures: URURURURUU, URURUURURU, URUURRUURU, URRUUUURRU, UURRUURRUU, RUURUURUUR, RUUURRUUUR, URURURUURU, RUUURUUURU, RUUURUUUUR, URUURUURUU and URUUURUUUR;

wherein in the PUCCH structure, U represents a symbol location used for transmitting UCI, and R represents a symbol location used for transmitting RS.

In one possible implementation, when the number A is 11:

the PUCCH structure set includes one PUCCH structure, and the PUCCH structure included in the PUCCH structure set includes two symbol locations used for transmitting RS and is one of the following PUCCH structures: UURUUUURUUU, UURUUUUURUU, URUUUUURUUU, URUUUUUUURU, RUUUURUUUUU, RUUUUURUUUU, UUURUUURUUU, URUUURUUUU, RUUUUUUUURU, URUUUUUUUUR, URUUUUUURUU, UUUURRUUUUU and RUUUUUUUUUR; or the PUCCH structure set includes one PUCCH structure, and the PUCCH structure included in the PUCCH structure set includes three or four symbol locations used for transmitting RS and is one of the following PUCCH structures: UURURURURUU, URURUURURUU, URURUURUURU, URURUUURURU, URUURURUURU, URRUUUUURRU, URRUUUURRUU, UURRUUURRUU, RUURUUURUUR, RUUURURUUUR, RUUURRUUUUR, RUUUURRUUUR, URUUURUUURU, RUUUURUUUUR, UURUURUURUU and URUUURUUURU; or the PUCCH structure set includes two PUCCH structures, wherein a first PUCCH structure includes one or two symbol locations used for transmitting RS and is one of the following PUCCH structures: UURUUUURUUU, UURUUUUURUU, URUUUUURUUU, URUUUUUUURU, RUUUURUUUUU, RUUUUURUUUU, UUURUUURUUU, URUUURUUUU, RUUUUUUUURU, URUUUUUUUUR, URUUUUUURUU, UUUURRUUUUU, RUUUUUUUUUR, RUUUUUUUUUU and UUUUURUUUU; and a second PUCCH structure includes three or four symbol locations used for transmitting RS and is one of the following PUCCH structures: UURURURURUU, URURUURURUU, URURUURUURU, URURUUURURU, URUURURUURU, URRUUUUURRU, URRUUUURRUU, UURRUUURRUU, RUURUUURUUR, RUUURURUUUR, RUUURRUUUUR, RUUUURRUUUR, URUUURUUURU, RUUUURUUUUR, UURUURUURUU and URUUURUUURU;

wherein in the PUCCH structure, U represents a symbol location used for transmitting UCI, and R represents a symbol location used for transmitting RS.

In one possible implementation, when the number A is 12:

the PUCCH structure set includes one PUCCH structure, and the PUCCH structure included in the PUCCH structure set includes two symbol locations used for transmitting RS and is one of the following PUCCH structures: UUURUUUURUUU, UURUUUUUURUU, UURUUUUURUUU, URUUUUUUUURU, RUUUUURUUUUU, UURUUURUUUU, UUUUURRUUUUU and RUUUUUUUUUUR; or the PUCCH structure set includes one PUCCH structure, and the PUCCH structure included in the PUCCH structure set includes three or four symbol locations used for transmitting RS and is one of the following PUCCH structures: UURURUURURUU, URUURUURUURU, URURUUURURUU, URURUUUURURU, UURRUUUURRUU, UURRUUURRUUU, RUURUUUURUUR, RUUURUURUUUR, RUUUURRUUUUR, RUUURURUUURU, URUUURUUURUU, URUUURUUUURU, URUUUURUUURU, RUUUURUUUURU, RUUUUURUUUUR, RUUUURUUUUUR, UURUURUUURUU, UURUUURUURUU and UURUURUURUUU; or the PUCCH structure set includes two PUCCH structures, wherein a first PUCCH structure includes one or two symbol locations used for transmitting RS and is one of the following PUCCH structures: UUURUUUURUUU, UURUUUUUURUU, UURUUUUURUUU, URUUUUUUUURU, RUUUUURUUUUU, UURUUURUUUU, UUUUURRUUUUU, RUUUUUUUUUUR, RUUUUUUUUUUU and UUUUURUUUUUU; and a second PUCCH structure includes three or four symbol locations used for transmitting RS and is one of the following PUCCH structures: UURURUURURUU, URUURUURUURU, URURUUURURUU, URURUUUURURU, UURRUUUURRUU, UURRUUURRUUU, RUURUUUURUUR, RUUURUURUUUR, RUUUURRUUUUR, RUUURURUUURU, URUUURUURUU, URUUURUUUURU, URUUUURUUURU, RUUUURUUUURU, RUUUUURUUUUR, RUUUURUUUUUR, UURUURUUURUU, UURUUURUURUU and UURUURUURUUU;

wherein in the PUCCH structure, U represents a symbol location used for transmitting UCI, and R represents a symbol location used for transmitting RS.

In one possible implementation, when the number A is 13:

the PUCCH structure set includes one PUCCH structure, and the PUCCH structure included in the PUCCH structure set includes two symbol locations used for transmitting RS and is one of the following PUCCH structures: UURUUUUUURUU, UUURUUUUURUUU, URUUUUUUUUURU, RUUUUURUUUUUU, RUUUUUURUUUUU, UURUUUUUURUUU, UUUUURRUUUUUU and RUUUUUUUUUUUR; or the PUCCH structure set includes one PUCCH structure, and the PUCCH structure included in the PUCCH structure set includes three or four symbol locations used for transmitting RS and is one of the following PUCCH structures: UURURUUURURUU, URUURUUURUURU, URURUUUURURU, URUURUURUURUU, URUURUURUURU, UURRUUUUURRUU, UUURRUUURRUUU, RUURUURUURUUU, RUURUUUUURUUR, RUUURUUURUUUR, RUUUURRUUUUUR, URUUURURUUURU, RUUURUURUUURU, UURUUURUUURUU, URUUUURUUUURU, RUUUUURUUUUUR, UUURUURUURUUU and UURUUUURUURUU; or the PUCCH structure set includes two PUCCH structures, wherein a first PUCCH structure includes one or two symbol locations used for transmitting RS and is one of the following PUCCH structures: UURUUUUUUURUU, UUURUUUUURUUU, URUUUUUUUUURU, RUUUUURUUUUUU, RUUUUUURUUUUU, UURUUUUUURUUU, UUUUURRUUUUUU, RUUUUUUUUUUUR, RUUUUUUUUUUUU and UUUUUURUUUUUU; and a second PUCCH structure includes three or four symbol locations used for transmitting RS and is one of the following PUCCH structures: UURURUUURURUU, URUURUUURUURU, URURUUUUURURU, URUURUURUURUU, URUURUURUUURU, UURRUUUUURRUU, UUURRUUURRUUU, RUURUURUURUUU, RUURUUUURUUR, RUUURUUURUUUR, RUUUURRUUUUR, URUUURURUUURU, RUUURUURUUURU, UURUUURUUURUU, URUUUURUUUURU, RUUUUURUUUUR, UUURUURUURUUU and UURUUUURUURUU;

wherein in the PUCCH structure, U represents a symbol location used for transmitting UCI, and R represents a symbol location used for transmitting RS.

In one possible implementation, when the number A is 14:

the PUCCH structure set includes one PUCCH structure, and the PUCCH structure included in the PUCCH structure set includes two symbol locations used for transmitting RS and is one of the following PUCCH structures: UURUUUUUUURUU, UUUURUUUURUUUU, URUUUUUUUUUURU, RUUUUUURUUUUUU, UUURUUUUURUUU, UUUUUURRUUUUUU and RUUUUUUUUUUUUR; or the PUCCH structure set includes one PUCCH structure, and the PUCCH structure included in the PUCCH structure set includes three or four symbol locations used for transmitting RS and is one of the following PUCCH structures: URUUURUURUUURU, UURURUUUURURUU, URUURUUUURUURU, URUURUUURUURUU, URURUUUUUURURU, UURUURUURUURUU, UURRUUUUUURRUU, UUURRUUUURRUUU, RUURUUURUURUUU, RUURUUUUUURUUR, RUUURUUUURUUUR, RUUUURRUUUUUUR, UURUURUUURUURU, URUUURUUUURUU, URUUUURUUUUURU, URUUUUURUUUURU, RUUUUURUUUUUUR, RUUUUUURUUUUUR, RUUUUURUUUUURU, URUUUUURUUUUUR, UUURUUURUURUUU, UUURUURUUURUUU, UURUUURUUURUUU and UURUUUURUUURUU; or the PUCCH structure set includes two PUCCH structures, wherein a first PUCCH structure includes one or two symbol locations used for transmitting RS and is one of the following PUCCH structures: UURUUUUUUUURUU, UUUURUUUURUUUU, URUUUUUUUUUURU, RUUUUUURUUUUUU, UUURUUUUUURUUU, UUUUUURRUUUUUU, RUUUUUUUUUUUUR, RUUUUUUUUUUUUU and UUUUUURUUUUUUU; and a second PUCCH structure includes three or four symbol locations used for transmitting RS and is one of the following PUCCH structures: URUUURUURUUURU, UURURUUUURURUU, URUURUUUURUURU, URUURUUURUURUU, URURUUUUUURURU, UURUURUURUURUU, UURRUUUUUURRUU, UUURRUUUURRUUU, RUURUUURUURUUU, RUURUUUUUURUUR, RUUURUUUURUUUR, RUUUUURRUUUUUR, UURUURUUURUURU, URUUUURUUUURUU, URUUUURUUUUURU, URUUUUURUUUURU, RUUUUURUUUUUUR, RUUUUUURUUUUUR, RUUUUURUUUUURU, URUUUUURUUUUUR, UUURUUURUURUUU, UUURUURUUURUUU, UURUUURUUURUUU and UURUUUURUUURUU;

wherein in the PUCCH structure, U represents a symbol location used for transmitting UCI, and R represents a symbol location used for transmitting RS.

Embodiment 6

Figure 6:
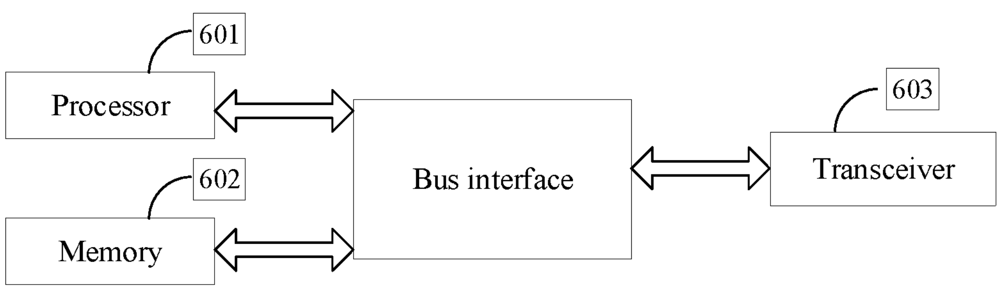
FIG. 6 is a schematic structural diagram of a device in an embodiment of the present invention.

Referring to FIG. 6, provided by an embodiment of the present application is another device including a processor 601 as well as a memory 602 and a transceiver 603 connected with the processor 601.

In FIG. 6, a bus structure can include any number of interconnected buses and bridges and can specifically link various circuits of one or more processors represented by the processor 601 and a memory represented by the memory 602 together. The bus structure can also link various other circuits such as peripheral equipment, a voltage stabilizer and a power management circuit together, which are publically known by those skilled in the art and will not be further described herein. A bus interface is provided with an interface. The transceiver 603 can be multiple elements, namely a transmitter and a receiver, and is provided with units for communication with various other devices on a transmission medium. The processor 601 takes charge of managing the bus structure and ordinary processing, and the memory 602 can store data used when the processor 601 performs operations.

The processor 601 is configured for reading a program in the memory 602 to execute the following process:

the number A of symbols occupied by a PUCCH is determined, and the number A is a positive integer;

a PUCCH structure set that is defined in correspondence to the number A of the symbols is determined, a PUCCH structure included in the PUCCH structure set includes the number A of symbol locations, the PUCCH structure set includes one or more PUCCH structures, and when multiple PUCCH structures are included, the number of symbol locations used for transmitting pilot (RS) information in different PUCCH structures is different, wherein a PUCCH structure is a distribution rule for symbol locations used for transmitting uplink control information (UCI) and symbol locations used for transmitting RS; and a PUCCH structure corresponding to the PUCCH is determined from the PUCCH structure set, and the transceiver 603 is controlled to perform PUCCH reception on the basis of the corresponding PUCCH structure.

In one possible implementation, the operation that a PUCCH structure corresponding to the PUCCH is determined from the PUCCH structure set when the PUCCH structure set includes one PUCCH structure includes: a PUCCH structure included in the PUCCH structure set is taken as the corresponding PUCCH structure; or the operation that a PUCCH structure corresponding to the PUCCH is determined from the PUCCH structure set when the PUCCH structure set includes multiple PUCCH structures includes:

one PUCCH structure is selected as the corresponding PUCCH structure from the PUCCH structure set, and the transceiver 603 is controlled to inform a selection result to a terminal according to a configuration instruction; and/or the PUCCH structure with most symbol locations used for transmitting RS is selected as the corresponding PUCCH structure from the PUCCH structure set when it is determined that frequency hopping is performed during PUCCH transmission, and the transceiver 603 is controlled to inform the terminal of a demand for frequency hopping through the configuration instruction.

In one possible implementation, the PUCCH structure set including one or more PUCCH structures includes:

when the value of the number A of the symbols is X1 to X2, for each number A of the symbols within X1 to X2, at least two PUCCH structures are defined in the PUCCH structure set; when the value of the number A of the symbols is (X2+1) to X4, for each number A of the symbols within (X2+1) to X4, one PUCCH structure is defined in the PUCCH structure set; or when the value of the number A of the symbols is X1 to X2 and X3 to X4, for each number A of the symbols within X1 to X2 and X3 to X4, at least two PUCCH structures are defined in the PUCCH structure set; when the value of the number A of the symbols is (X2+1) to (X3−1), for each number A of the symbols within (X2+1) to (X3−1), one PUCCH structure is defined in the PUCCH structure set; or with regard to the value of each number A of the symbols supported by the PUCCH, at least two PUCCH structures are defined in the PUCCH structure set; or with regard to the value of each number A of the symbols supported by the PUCCH, one PUCCH structure is defined in the PUCCH structure set;

wherein X1, X2, X3 and X4 are positive integers, and $X1<X2<X3<X4$.

In one possible implementation, the operation that a PUCCH structure corresponding to the PUCCH is determined from the PUCCH structure set when it is determined that frequency hopping is performed during PUCCH transmission, and the transceiver 603 is controlled to perform PUCCH reception on the basis of the corresponding PUCCH structure, includes:

the transceiver 603 is controlled to respectively receive information carried in a first symbol group and information carried in a second symbol group at different frequency domain positions by taking first $$\left\lfloor \frac{A}{2} \right\rfloor$$

symbols included by the PUCCH as the first symbol group and last $$\left(A-\left\lfloor \frac{A}{2} \right\rfloor\right)$$

symbols included by the PUCCH as the second symbol group; or the transceiver 603 is controlled to respectively receive information carried in a first symbol group and information carried in a second symbol group at different frequency domain positions by taking first $$\left\lceil \frac{A}{2} \right\rceil$$

symbols included by the PUCCH as the first symbol group and last $$\left(A-\left\lceil \frac{A}{2} \right\rceil\right)$$

symbols included by the PUCCH as the second symbol group.

In one possible implementation, when the number A is 4:

the PUCCH structure set includes one PUCCH structure, and the PUCCH structure included in the PUCCH structure set includes one symbol location used for transmitting RS and is one of the following PUCCH structures: URUU, UURU and RUUU; or the PUCCH structure set includes one PUCCH structure, and the PUCCH structure included in the PUCCH structure set includes two symbol locations used for transmitting RS and is one of the following PUCCH structures: URRU, RURU, RUUR and URUR; or the PUCCH structure set includes two PUCCH structures, wherein a first PUCCH structure includes one symbol location used for transmitting RS and is one of the following PUCCH structures: URUU, UURU and RUUU; and a second PUCCH structure includes two symbol locations used for transmitting RS and is one of the following PUCCH structures: URRU, RURU, RUUR and URUR;

wherein in the PUCCH structure, U represents a symbol location used for transmitting UCI, and R represents a symbol location used for transmitting RS.

In one possible implementation, when the number A is 5:

the PUCCH structure set includes one PUCCH structure, and the PUCCH structure included in the PUCCH structure set includes one symbol location used for transmitting RS and is one of the following PUCCH structures: UURUU, URUUU and RUUUU; or the PUCCH structure set includes one PUCCH structure, and the PUCCH structure included in the PUCCH structure set includes two symbol locations used for transmitting RS and is one of the following PUCCH structures: URRUU, UURRU, RUURU, RURUU and URURU; or the PUCCH structure set includes two PUCCH structures, wherein a first PUCCH structure includes one symbol location used for transmitting RS and is one of the following PUCCH structures: UURUU, URUUU and RUUUU; and a second PUCCH structure includes two symbol locations used for transmitting RS and is one of the following PUCCH structures: URRUU, UURRU, RUURU, RURUU and URURU;

wherein in the PUCCH structure, U represents a symbol location used for transmitting UCI, and R represents a symbol location used for transmitting RS.

In one possible implementation, when the number A is 6:

the PUCCH structure set includes one PUCCH structure, and the PUCCH structure included in the PUCCH structure set includes one symbol location used for transmitting RS and is one of the following PUCCH structures: URUUUU, UURUUU, UUURUU and RUUUUU; or the PUCCH structure set includes one PUCCH structure, and the PUCCH structure included in the PUCCH structure set includes two symbol locations used for transmitting RS and is one of the following PUCCH structures: URURUU, URUURU, RUUUUR, URUUUR, RUUURU and UURRUU; or the PUCCH structure set includes two PUCCH structures, wherein a first PUCCH structure includes one symbol location used for transmitting RS and is one of the following PUCCH structures: URUUUU, UURUUU, UUURUU and RUUUUU; and a second PUCCH structure includes two symbol locations used for transmitting RS and is one of the following PUCCH structures: URURUU, URUURU, RUUUUR, URUUUR, RUUURU and UURRUU;

wherein in the PUCCH structure, U represents a symbol location used for transmitting UCI, and R represents a symbol location used for transmitting RS.

In one possible implementation, when the number A is 7:

the PUCCH structure set includes one PUCCH structure, and the PUCCH structure included in the PUCCH structure set includes one symbol location used for transmitting RS and is one of the following PUCCH structures: URUUUUU, UURUUUU, UUURUUU and RUUUUUU; or the PUCCH structure set includes one PUCCH structure, and the PUCCH structure included in the PUCCH structure set includes two symbol locations used for transmitting RS and is one of the following PUCCH structures: RUUUUUR, URUUUUR, RUUUURU, URUUURU, URUURUU, UURURUU, UURRUUU and UUURRUU; or the PUCCH structure set includes two PUCCH structures, wherein a first PUCCH structure includes one symbol location used for transmitting RS and is one of the following PUCCH structures: URUUUUU, UURUUUU, UUURUUU and RUUUUUU; and a second PUCCH structure includes two symbol locations used for transmitting RS and is one of the following PUCCH structures: RUUUUUR, URUUUUR, RUUUURU, URUUURU, URUURUU, UURURUU, UURRUUU and UUURRUU;

wherein in the PUCCH structure, U represents a symbol location used for transmitting UCI, and R represents a symbol location used for transmitting RS.

In one possible implementation, when the number A is 8:

the PUCCH structure set includes one PUCCH structure, and the PUCCH structure included in the PUCCH structure set includes two symbol locations used for transmitting RS and is one of the following PUCCH structures: URUUURU, URUUURUU, RUUUUUUR, RUUUUURU, RUUUURUU, RUUURUUU, UUURRUUU and UURUURUU; or the PUCCH structure set includes one PUCCH structure, and the PUCCH structure included in the PUCCH structure set includes three or four symbol locations used for transmitting RS and is one of the following PUCCH structures: URRUURRU, URURURUR, RURURURU, RUURRUUR, RURUURUR, RUURUURU, RUURUUUR, RUUURUUR, URURUURU and URURURUU; or the PUCCH structure set includes two PUCCH structures, wherein a first PUCCH structure includes one or two symbol locations used for transmitting RS and is one of the following PUCCH structures: URUUUURU, URUUURUU, RUUUUUUR, RUUUUURU, RUUUURUU, RUUURUUU, UUURRUUU, UURUURUU, UUURUUUU and RUUUUUUU; and a second PUCCH structure includes three or four symbol locations used for transmitting RS and is one of the following PUCCH structures: URRUURRU, URURURUR, RURURURU, RURUURUR, RUURRUUR, RUURUURU, RUURUUUR, RUUURUUR, URURUURU and URURURUU;

wherein in the PUCCH structure, U represents a symbol location used for transmitting UCI, and R represents a symbol location used for transmitting RS.

In one possible implementation, when the number A is 9:

the PUCCH structure set includes one PUCCH structure, and the PUCCH structure included in the PUCCH structure set includes two symbol locations used for transmitting RS and is one of the following PUCCH structures: UURUUURUU, URUUUURUU, URUUUUURU, URUUURUUU, RUUURUUUU, RUUUUUUUR, RUUUUURUU, RUUUUUURU, RUUUURUUU, UURUUUURU, UUUURRUUU and UUURRUUUU; or the PUCCH structure set includes one PUCCH structure, and the PUCCH structure included in the PUCCH structure set includes three or four symbol locations used for transmitting RS and is one of the following PUCCH structures: URURURURU, URRUURRUU, URRUUURRU, RUURRUURU, RUURRUUUR, RUUURRUUR, RUURURUUR, RURUURUUR, URURURUUR, RUUURUUUR, URUURUURU and URUUURURU; or the PUCCH structure set includes two PUCCH structures, wherein a first PUCCH structure includes one or two symbol locations used for transmitting RS and is one of the following PUCCH structures: UURUUURUU, URUUUURUU, URUUUUURU, URUUURUUU, RUUURUUUU, RUUUUUUUR, RUUUUURUU, RUUUUUURU, RUUUURUUU, UURUUUURU, UUUURRUUU, UUURRUUUU, RUUUUUUUU and UUUURUUUU; and a second PUCCH structure includes three or four symbol locations used for transmitting RS and is one of the following PUCCH structures: URURURURU, URRUURRUU, URRUUURRU, RUURRUURU, RUURRUUUR, RUUURRUUR, RUURURUUR, RURUURUUR, URURURUUR, RUUURUUUR, URUURUURU and URUUURURU;

wherein in the PUCCH structure, U represents a symbol location used for transmitting UCI, and R represents a symbol location used for transmitting RS.

In one possible implementation, when the number A is 10:

the PUCCH structure set includes one PUCCH structure, and the PUCCH structure included in the PUCCH structure set includes two symbol locations used for transmitting RS and is one of the following PUCCH structures: UURUUUURUU, URUUUURUUU, URUUUUUURU, RUUUURUUUU, UURUUURUUU, URUUURUUUU, URUUUUURUU, RUUUUUUUUR, RUUUUUURUU, RUUUUURUUU and UUUURRUUUU; or the PUCCH structure set includes one PUCCH structure, and the PUCCH structure included in the PUCCH structure set includes three or four symbol locations used for transmitting RS and is one of the following PUCCH structures: URURURURUU, URURUURURU, URUURRUURU, URRUUUURRU, UURRUURRUU, RUURUURUUR, RUUURRUUUR, URURURUURU, RUUURUUURU, RUUURUUUUR, URUURUURUU and URUUURUUUR; or the PUCCH structure set includes two PUCCH structures, wherein a first PUCCH structure includes one or two symbol locations used for transmitting RS and is one of the following PUCCH structures: UURUUUURUU, URUUUURUUU, URUUUUUURU, RUUUURUUUU, UURUUURUUU, URUUURUUUU, URUUUUURUU, RUUUUUUUUR, RUUUUUURUU, RUUUUURUUU, UUUURRUUUU, RUUUUUUUUU and UUUURUUUUU; and a second PUCCH structure includes three or four symbol locations used for transmitting RS and is one of the following PUCCH structures: URURURURUU, URURUURURU, URUURRUURU, URRUUUURRU, UURRUURRUU, RUURUURUUR, RUUURRUUUR, URURURUURU, RUUURUUURU, RUUURUUUUR, URUURUURUU and URUUURUUUR;

wherein in the PUCCH structure, U represents a symbol location used for transmitting UCI, and R represents a symbol location used for transmitting RS.

In one possible implementation, when the number A is 11:

the PUCCH structure set includes one PUCCH structure, and the PUCCH structure included in the PUCCH structure set includes two symbol locations used for transmitting RS and is one of the following PUCCH structures: UURUUUURUUU, UURUUUUURUU, URUUUUURUUU, URUUUUUUURU, RUUUURUUUUU, RUUUUURUUUU, UUURUUURUUU, URUUURUUUUU, RUUUUUUUURU, URUUUUUUUUR, URUUUUUURUU, UUUURRUUUUU and RUUUUUUUUUR; or the PUCCH structure set includes one PUCCH structure, and the PUCCH structure included in the PUCCH structure set includes three or four symbol locations used for transmitting RS and is one of the following PUCCH structures: UURURURURUU, URURUURURUU, URURUURUURU, URURUUURURU, URUURURUURU, URRUUUUURRU, URRUUUURRUU, UURRUUURRUU, RUURUUURUUR, RUUURURUUUR, RUUURRUUUUR, RUUUURRUUUR, URUUURUUURU, RUUUURUUUUR, UURUURUURUU and URUUURUUURU; or the PUCCH structure set includes two PUCCH structures, wherein a first PUCCH structure includes one or two symbol locations used for transmitting RS and is one of the following PUCCH structures: UURUUUURUUU, UURUUUUURUU, URUUUUURUUU, URUUUUUUURU, RUUUURUUUUU, RUUUUURUUUU, UUURUUURUUU, URUUURUUUUU, RUUUUUUUURU, URUUUUUUUUR, URUUUUUURUU, UUUURRUUUUU, RUUUUUUUUUR, RUUUUUUUUUU and UUUUURUUUUU; and a second PUCCH structure includes three or four symbol locations used for transmitting RS and is one of the following PUCCH structures: UURURURURUU, URURUURURUU, URURUURUURU, URURUUURURU, URUURURUURU, URRUUUUURRU, URRUUUURRUU, UURRUUURRUU, RUURUUURUUR, RUUURURUUUR, RUUURRUUUUR, RUUUURRUUUR, URUUURUUURU, RUUUURUUUUR, UURUURUURUU and URUUURUUURU;

wherein in the PUCCH structure, U represents a symbol location used for transmitting UCI, and R represents a symbol location used for transmitting RS.

In one possible implementation, when the number A is 12:

the PUCCH structure set includes one PUCCH structure, and the PUCCH structure included in the PUCCH structure set includes two symbol locations used for transmitting RS and is one of the following PUCCH structures: UUURU- UUURUUU, UURUUUUUURUU, UURUUUUURUUU, URUUUUUUUURU, RUUUUURUUUUU, UURUUURUUUU, UUUUURRUUUUU and RUUUUUUUUUUR; or the PUCCH structure set includes one PUCCH structure, and the PUCCH structure included in the PUCCH structure set includes three or four symbol locations used for transmitting RS and is one of the following PUCCH structures: UURURUURURUU, URUURUURUURU, URURUUURURUU, URURUUUURURU, UURRUUUURRUU, UURRUUURRUUU, RUURUUUURUUR, RUUURUURUUUR, RUUUURRUUUUR, RUUURURUUURU, URUUURUUURUU, URUUURUUUURU, URUUUURUUURU, RUUUURUUUURU, RUUUUURUUUUR, RUUUURUUUUUR, UURUURUUURUU, UURUUURUURUU and UURUURUURUUU; or the PUCCH structure set includes two PUCCH structures, wherein a first PUCCH structure includes one or two symbol locations used for transmitting RS and is one of the following PUCCH structures: UUURUUUURUUU, UURUUUUUURUU, UURUUUUURUUU, URUUUUUUUURU, RUUUUURUUUUU, UURUUURUUUU, UUUUURRUUUU, RUUUUUUUUUUR, RUUUUUUUUUUU and UUUUURUUUUUU; and a second PUCCH structure includes three or four symbol locations used for transmitting RS and is one of the following PUCCH structures: UURURUURURUU, URUURUURUURU, URURUUURURUU, URURUUUURURU, UURRUUUURRUU, UURRUUURRUUU, RUURUUUURUUR, RUUURUURUUUR, RUUUURRUUUUR, RUUURURUUURU, URUUURUUURUU, URUUURUUUURU, URUUUURUUURU, RUUUURUUUURU, RUUUUURUUUUR, RUUUURUUUUUR, UURUURUUURUU, UURUUURUURUU and UURUURUURUUU;

wherein in the PUCCH structure, U represents a symbol location used for transmitting UCI, and R represents a symbol location used for transmitting RS.

In one possible implementation, when the number A is 13:

the PUCCH structure set includes one PUCCH structure, and the PUCCH structure included in the PUCCH structure set includes two symbol locations used for transmitting RS and is one of the following PUCCH structures: UURUUUUUUURUU, UUURUUUUURUUU, URUUUUUUUUURU, RUUUUURUUUUUU, RUUUUUURUUUUU, UURUUUUUURUUU, UUUUURRUUUUUU and RUUUUUUUUUUUR; or the PUCCH structure set includes one PUCCH structure, and the PUCCH structure included in the PUCCH structure set includes three or four symbol locations used for transmitting RS and is one of the following PUCCH structures: UURURUUURURUU, URUURUUURUURU, URURUUUURURU, URUURUURUURUU, URUURUURUUURU, UURRUUUUURRUU, UUURRUUURRUUU, RUURUURUURUUU, RUURUUUUURUUR, RUUURUUURUUUR, RUUUURRUUUUUR, URUUURURUUURU, RUUURUURUUURU, UURUUURUUURUU, URUUUURUUUURU, RUUUUURUUUUUR, UUURUURUURUUU and UURUUUURUURUU; or the PUCCH structure set includes two PUCCH structures, wherein a first PUCCH structure includes one or two symbol locations used for transmitting RS and is one of the following PUCCH structures: UURUUUUUUURUU, UUURUUUUURUUU, URUUUUUUUUURU, RUUUUURUUUUU, RUUUUUURUUUUU, UURUUUUUURUUU, UUUUURRUUUUUU, RUUUUUUUUUUUR, RUUUUUUUUUUUU and UUUUUURUUUUUU; and a second PUCCH structure includes three or four symbol locations used for transmitting RS and is one of the following PUCCH structures: UURURUUURURUU, URUURUUURUURU, URURUUUUURURU, URUURUURUURUU, URUURUURUUURU, UURRUUUUURRUU, UUURRUUURRUUU, RUURUURUURUUU, RUURUUUUURUUR, RUUURUUURUUUR, RUUUURRUUUUUR, URUUURURUUURU, RUUURUURUUURU, UURUUURUUURUU, URUUUURUUUURU, RUUUUURUUUUUR, UUURUURUURUUU and UURUUUURUURUU;

wherein in the PUCCH structure, U represents a symbol location used for transmitting UCI, and R represents a symbol location used for transmitting RS.

In one possible implementation, when the number A is 14:

the PUCCH structure set includes one PUCCH structure, and the PUCCH structure included in the PUCCH structure set includes two symbol locations used for transmitting RS and is one of the following PUCCH structures: UURUUUUUUUURUU, UUUURUUUURUUUU, URUUUUUUUUUURU, RUUUUUURUUUUUU, UUURUUUUUURUUU, UUUUUURRUUUUUU and RUUUUUUUUUUUUR; or the PUCCH structure set includes one PUCCH structure, and the PUCCH structure included in the PUCCH structure set includes three or four symbol locations used for transmitting RS and is one of the following PUCCH structures: URUUURUURUUURU, UURURUUUURURUU, URUURUUUURUURU, URUURUUURUURUU, URURUUUUUURURU, UURUURUURUURUU, UURRUUUUUURRUU, UUURRUUUURRUUU, RUURUUURUURUUU, RUURUUUUUURUUR, RUUURUUUURUUUR, RUUUUURRUUUUUR, UURUURUUURUURU, URUUUURUUUURUU, URUUUURUUUUURU, URUUUUURUUUURU, RUUUURUUUUUUR, RUUUUUURUUUUUR, RUUUUURUUUUURU, URUUUUURUUUUUR, UUURUUURUURUUU, UUURUURUUURUUU, UURUUURUUURUUU and UURUUUURUUURUU; or the PUCCH structure set includes two PUCCH structures, wherein a first PUCCH structure includes one or two symbol locations used for transmitting RS and is one of the following PUCCH structures: UURUUUUUUUURUU, UUUURUUURUUUU, URUUUUUUUUUURU, RUUUUUURUUUUUU, UUURUUUUUURUUU, UUUUUURRUUUUUU, RUUUUUUUUUUUUR, RUUUUUUUUUUUUU and UUUUUURUUUUUUU; and a second PUCCH structure includes three or four symbol locations used for transmitting RS and is one of the following PUCCH structures: URUUURUURUUURU, UURURUUUURURUU, URUURUUUURUURU, URUURUUURUURUU, URURUUUUUURURU, UURUURUURUURUU, UURRUUUUUURRUU, UUURRUUUURRUUU, RUURUUURUURUUU, RUURUUUUUURUUR, RUUURUUUURUUUR, RUUUUURRUUUUUR, UURUURUUURUURU, URUUUURUUUURUU, URUUUURUUUUURU, URUUUURUUUURU, RUUUUURUUUUUUR, RUUUUUURUUUUUR, RUUUUURUUUUURU, URUUUURUUUUUR, UUURUUURUURUUU, UUURUURUUURUUU, UURUUURUUURUUU and UURUUUURUUURUU;

wherein in the PUCCH structure, U represents a symbol location used for transmitting UCI, and R represents a symbol location used for transmitting RS.

Embodiment 7

As shown in Table 1, different UCI and RS patterns are defined for different transmission lengths of the PUCCH, wherein pattern represents a symbol group, for example, pattern 1 can represent a first symbol group, pattern 2 can represent a second symbol group, U represents a symbol location used for transmitting UCI, R represents a symbol location used for transmitting RS, an RS symbol number is the number of symbol locations used for transmitting RS in a PUCCH structure, and "|" represents a specific frequency hopping position when frequency hopping is configurated.

TABLE 1

<table>
<tr><th>Symbol Length of PUCCH</th><th></th><th></th></tr>
<tr><td></td><td>Pattern 1</td><td>Pattern 2</td></tr>
<tr><td>4</td><td>URUU</td><td>RU|RU (Of course, it can also be replaced with, for example, UR|UR)</td></tr>
<tr><td>5</td><td>UURUU</td><td>UR|URU (Of course, it can also be replaced with, for example, URU|RU or RU|URU)</td></tr>
<tr><td>6</td><td>UURUUU</td><td>URU|URU</td></tr>
<tr><td>7</td><td>UUURUUU</td><td>URU|UURU (Of course, it can also be replaced with, for example, URUU|URU)</td></tr>
<tr><td></td><td colspan="2">Only one Pattern</td></tr>
<tr><td>8</td><td colspan="2">URUU|UURU (Of course, it can also be replaced with, for example, URUU|URUU)</td></tr>
<tr><td>9</td><td colspan="2">URUU|UURUU (Of course, it can also be replaced with, for example, UURUU|URUU)</td></tr>
<tr><td>10</td><td colspan="2">UURUU|UURUU (Of course, it can also be replaced with, for example, URUUUUUURU)</td></tr>
<tr><td></td><td>Pattern 1</td><td>Pattern2</td></tr>
<tr><td>11</td><td>UURUU|UURUUU (Of course, it can also be replaced with, for example, UURUUU|UURUU)</td><td>URURU|URUURU (Of course, it can also be replaced with, for example, URURUU|URURU or URUURU|RUURU)</td></tr>
<tr><td>12</td><td>UURUUU|UURUUU (Of course, it can also be replaced with, for example, UURUUU|UUURUU)</td><td>URUURU|URUURU (Of course, it can also be replaced with, for example, URURUU|UURURU)</td></tr>
<tr><td>13</td><td>UURUUU|UUURUUU (Of course, it can also be replaced with, for example, UUURUUU|UURUUU)</td><td>URUURU|URUUURU ((Of course, it can also be replaced with, for example, URUURUU|URUURU or URURUUU|UURURU)</td></tr>
<tr><td>14</td><td>UUURUUU|UUURUUU</td><td>URUUURU|URUUURU (Of course, it can also be replaced with, for example, UURUURU|URUURUU)</td></tr>
</table>

In Table 1, with regard to 4-7 symbol lengths of PUCCH, each symbol length corresponds to two patterns; due to a relatively small RS symbol number, pattern 1 is relatively suitable for a low-speed scene and a scene that frequency hopping in a time slot is not supported; and due to a relatively large RS symbol number, pattern 2 can be suitable for a high-speed scene to provide more accurate channel estimation and can support frequency hopping in a time slot, of course, pattern 2 can also be used if frequency hopping is not configured or used, and one of the patterns can be selected by a base station according to an actual demand and can be informed to a terminal through configuration signaling. For 8-14 symbol lengths of PUCCH, only one pattern is defined for each symbol length, in this case, the specific pattern does not need to be informed, and the corresponding pattern can be determined by the terminal according to the symbol length of the PUCCH. For the PUCCH of which the length is 4-7 symbols, if frequency hopping is configured to be used, the specific pattern may not be informed to the terminal either, and in this case, the terminal is appointed to selected pattern 2.

It should be known that table 1 is only exemplary, in a specific implementation process, for different symbol lengths of the PUCCH (namely the number A of symbols occupied by the PUCCH), other distribution rules for symbol locations can also be adopted in the patterns.

Embodiment 8

As shown in Table 2, different UCI and RS patterns are defined for different transmission lengths of the PUCCH, wherein pattern represents a symbol group, for example, pattern 1 can represent a first symbol group, pattern 2 can represent a second symbol group, U represents a symbol location used for transmitting UCI, R represents a symbol location used for transmitting RS, an RS symbol number is the number of symbol locations used for transmitting RS in a PUCCH structure, and "|" represents a specific frequency hopping position when frequency hopping is configurated.

TABLE 2

<table>
<tr><th>Symbol Length of PUCCH</th><th></th><th></th></tr>
<tr><td></td><td>Pattern 1</td><td>Pattern 2</td></tr>
<tr><td>4</td><td>URUU</td><td>RU|RU (Of course, it can also be replaced with, for example, UR|UR)</td></tr>
<tr><td>5</td><td>UURUU</td><td>UR|URU (Of course, it can also be replaced with, for example, URU|RU or RU|URU)</td></tr>
<tr><td>6</td><td>UURUUU</td><td>URU|URU</td></tr>
<tr><td>7</td><td>UUURUUU</td><td>URU|UURU (Of course, it can also be replaced with, for example, URUU|URU)</td></tr>
<tr><td></td><td colspan="2">Only one Pattern</td></tr>
<tr><td>8</td><td colspan="2">URUU|UURU (Of course, it can also be replaced with, for example, URUU|URUU)</td></tr>
<tr><td>9</td><td colspan="2">URUU|UURUU (Of course, it can also be replaced with, for example, UURUU|URUU)</td></tr>
<tr><td>10</td><td colspan="2">UURUU|UURUU (Of course, it can also be replaced with, for example, URUUUUUURU)</td></tr>
<tr><td></td><td>Pattern 1</td><td>Pattern2</td></tr>
<tr><td>11</td><td>UURUU|UURUUU (Of course, it can also be replaced with, for example, UURUUU|UURUU)</td><td>URURU|URUURU (Of course, it can also be replaced with, for example, URURUU|URURU or URUURU|RUURU)</td></tr>
<tr><td>12</td><td>UURUUU|UURUUU (Of course, it can also be replaced with, for example, UURUUU|UUURUU)</td><td>URUURU|URUURU (Of course, it can also be replaced with, for example, URURUU|UURURU)</td></tr>
<tr><td>13</td><td>UURUUU|UUURUUU (Of course, it can also be replaced with, for example, UUURUUU|UURUUU)</td><td>URUURU|URUUURU (Of course, it can also be replaced with, for example, URUURUU|URUURU or URURUUU|UURURU)</td></tr>
</table>

TABLE 2-continued

| Symbol Length of PUCCH | | |
|---|---|---|
| 14 | UUURUUU\|UUURUUU | URUUURU\|URUUURU (Of course, it can also be replaced with, for example, UURUURU\|URUURUU) |

In Table 2, with regard to 4-7 symbol lengths and 11-14 symbol lengths, each symbol length corresponds to two patterns; due to a relatively small RS symbol number, pattern 1 is relatively suitable for a low-speed scene and a scene that frequency hopping in a time slot is not supported; and due to a relatively large RS symbol number, pattern 2 can be suitable for a high-speed scene to provide more accurate channel estimation and can support frequency hopping in a time slot, of course, pattern 2 can also be used if frequency hopping is not configured or used, and one of the patterns can be selected by a base station according to an actual demand and can be informed to a terminal through configuration signaling. For 8-10 symbol lengths, only one pattern is defined for each symbol length, in this case, the specific pattern does not need to be informed, and the corresponding pattern can be determined by the terminal according to the symbol length of the PUCCH. For the PUCCH of which the length is 4-7 symbols or 11-14 symbols, if frequency hopping is configured to be used, the specific pattern may not be informed to the terminal either, and in this case, the terminal is appointed to selected pattern 2.

It should be known that table 2 is only exemplary, in a specific implementation process, for different symbol lengths of the PUCCH (namely the number A of symbols occupied by the PUCCH), other distribution rules for symbol locations can also be adopted in the patterns.

Embodiment 9

As shown in Table 3, different UCI and RS patterns are defined for different transmission lengths of the PUCCH, wherein pattern represents a symbol group, for example, pattern 1 can represent a first symbol group, pattern 2 can represent a second symbol group, U represents a symbol location used for transmitting UCI, R represents a symbol location used for transmitting RS, an RS symbol number is the number of symbol locations used for transmitting RS in a PUCCH structure, and "|" represents a specific frequency hopping position when frequency hopping is configurated.

TABLE 3

| Symbol Length of PUCCH | Pattern 1 | Pattern 2 |
|---|---|---|
| 4 | URUU | RU\|RU (Of course, it can also be replaced with, for example, UR\|UR) |
| 5 | UURUU | UR\|URU (Of course, it can also be replaced with, for example, URU\|RU or RU\|URU) |
| 6 | UURUUU | URU\|URU |
| 7 | UUURUUU | URU\|UURU (Of course, it can also be replaced with, for example, URUU\|URU) |

TABLE 3-continued

| Symbol Length of PUCCH | Pattern 1 | Pattern 2 |
|---|---|---|
| 8 | URUU\|UURU (Of course, it can also be replaced with, for example, URUU\|URUU) | URUR\|URUR (Of course, it can also be replaced with, for example, RUUR\|RUUR) |
| 9 | URUU\|UURUU (Of course, it can also be replaced with, for example, UURUU\|URUU) | URUR\|URURU (Of course, it can also be replaced with, for example, RUUR\|URUUR) |
| 10 | UURUU\|UURUU (Of course, it can also be replaced with, for example, URUUUUUURU) | URURU\|URURU |
| 11 | UURUU\|UURUUU (Of course, it can also be replaced with, for example, UURUUU\|UURUU) | URURU\|URUURU (Of course, it can also be replaced with, for example, URURUU\|URURU or URUURU\|RUURU) |
| 12 | UURUUU\|UURUUU (Of course, it can also be replaced with, for example, UURUUU\|UUURUU) | URUURU\|URUURU (Of course, it can also be replaced with, for example, URURUU\|UURURU) |
| 13 | UURUUU\|UUURUUU (Of course, it can also be replaced with, for example, UUURUUU\|UURUUU) | URUURU\|URUUURU (Of course, it can also be replaced with, for example, URUURUU\|URUURU or URURUUU\|UURURU) |
| 14 | UUURUUU\|UUURUUU | URUUURU\|URUUURU (Of course, it can also be replaced with, for example, UURUURU\|URUURUU) |

In Table 3, two patterns are defined for each transmission length of the PUCCH in 4-14 symbols; due to a relatively small RS symbol number, pattern 1 is relatively suitable for a low-speed scene and a scene that frequency hopping in a time slot is not supported; and due to relatively large RS symbol number, pattern 2 can be suitable for a high-speed scene to provide more accurate channel estimation and can support frequency hopping in a time slot, of course, pattern 2 can also be used if frequency hopping is not configured or used, and one of the patterns can be selected by a base station according to an actual demand and can be informed to a terminal through configuration signaling. If frequency hopping is configured to be used, the specific pattern may not be informed to the terminal either, and in this case, the terminal is appointed to selected pattern 2.

It should be known that Table 3 is only exemplary, in a specific implementation process, for different symbol lengths of the PUCCH (namely the number A of symbols occupied by the PUCCH), other distribution rules for symbol locations can also be adopted in the patterns.

Embodiment 10

As shown in table 4, one UCI and RS pattern is defined for one transmission length of the PUCCH, wherein pattern represents a symbol group, U represents a symbol location used for transmitting UCI, R represents a symbol location used for transmitting RS, an RS symbol number is the number of symbol locations used for transmitting RS in a PUCCH structure, and "|" represents a specific frequency hopping position when frequency hopping is configurated.

TABLE 4

| Configuration Index | Symbol Length of PUCCH | Pattern |
|---|---|---|
| 0 | 4 | RU\|RU (Of course, it can also be replaced with, for example, UR\|UR) |
| 1 | 5 | UR\|URU (Of course, it can also be replaced with, for example, URU\|RU or RU\|URU) |
| 2 | 6 | URU\|URU |
| 3 | 7 | URU\|UURU (Of course, it can also be replaced with, for example, URUU\|URU) |
| 4 | 8 | URUR\|URUR (Of course, it can also be replaced with, for example, RUUR\|RUUR) |
| 5 | 9 | URUR\|URURU (Of course, it can also be replaced with, for example, RUUR\|URUUR) |
| 6 | 10 | URURU\|URURU |
| 7 | 11 | URURU\|URUURU (Of course, it can also be replaced with, for example, URURUU\|URURU or URUURU\|RUURU) |
| 8 | 12 | URUURU\|URUURU (Of course, it can also be replaced with, for example, URURUU\|UURURU) |
| 9 | 13 | URUURU\|URUUURU (Of course, it can also be replaced with, for example, URUURUU\|URUURU or URURUUU\|UURURU) |
| 10 | 14 | URUUURU\|URUUURU (Of course, it can also be replaced with, for example, UURUURU\|URUURUU) |

In Table 4, one pattern is defined for each transmission length of the PUCCH in 4-14 symbols, due to a relatively large RS symbol number, the pattern can be suitable for a high-speed scene to provide more accurate channel estimation and can support frequency hopping in a time slot, of course, the pattern can also be used if frequency hopping is not configured or used, and the pattern can also support a low-speed scene. Therefore, in this case, a terminal can determine the corresponding pattern according to the number A if only the transmission length A of the PUCCH is obtained. A specific signaling configuration process can be that the terminal is informed of the symbol length of the PUCCH to be transmitted through high level signaling or an indication domain in a PDCCH so that the terminal can determine the corresponding pattern according to the symbol length, or the terminal is informed of a pattern index or serial number through the high level signaling or the indication domain in the PDCCH so that the terminal can determine the corresponding pattern and the corresponding symbol length according to the pattern index or serial number.

One or more technical schemes in the above-mentioned technical schemes have the following technical effects or advantages:

during the implementation of the present application, firstly, the number A of symbols occupied by a PUCCH needing transmission is determined, then, a corresponding PUCCH structure set is determined according to the number A of the symbols, a PUCCH structure corresponding to the PUCCH is determined from the PUCCH structure set, and PUCCH transmission is performed on the basis of the PUCCH structure corresponding to the PUCCH.

The PUCCH structure set corresponds to the number of the symbols, and any one of the PUCCH structures includes symbol locations of which the number is same as that of the symbols, and therefore, the PUCCH transmission method in the embodiment of the present application can meet the demand for the unfixed number of the symbols occupied by the PUCCH and support the PUCCH transmission in the new wireless communication system.

Further, in the embodiment of the present application, by determining a PUCCH structure from the PUCCH structure set after determining the PUCCH structure set, it is guaranteed that the PUCCH transmission can still be normally performed when the number of resource symbols corresponds to multiple PUCCH structures.

Further, the distribution rules for the symbol locations of the different PUCCH structures in the PUCCH structure set and/or the number of the symbol locations used for transmitting RS in different PUCCH structures of the PUCCH structure set are different, and therefore, the PUCCH transmission method in the embodiment of the present application can support different PUCCH transmission demands in scenes such as frequency hopping or not and different movement speeds.

Further, in the embodiment of the present application, for one transmission length of PUCCH, the same PUCCH structure or multiple PUCCH structures with different RS symbol numbers are defined to support the normal transmission of the PUCCH under different transmission demands.

It should be known that Table 3 is only exemplary, in a specific implementation process, for different symbol lengths of the PUCCH (namely the number A of symbols occupied by the PUCCH), other distribution rules for symbol locations can also be adopted in the patterns.

Based on the same technical concept, provided by an embodiment of the present application is a computer storage medium. A computer executable instruction is stored in the computer readable storage medium and is configured for enabling a computer execute the processes of the PUCCH transmission method described in the above-mentioned embodiments.

Although embodiments of the present application have been described, those skilled in the art can make additional alterations and modifications on the embodiments once they know the basic creative concept. Therefore, the annexed claims are intended to be interpreted to include the embodiments and all the alterations and modifications falling within the scope of the present application.

Those skilled in the art can make various alterations and variations on the present application without departing from the spirit and scope of the present application. In this way, if the alterations and variations of the present application fall within the scope of the claims of the present application and their equivalents, the present application is also intended to include these alterations and variations.

What is claimed is:

1. A PUCCH transmission method, comprising:

determining the number A of symbols occupied by a Physical Uplink Control Channel, PUCCH, the number A being a positive integer;

determining a PUCCH structure set that is defined in correspondence to the number A of the symbols, a PUCCH structure comprised in the PUCCH structure set comprising the number A of symbol locations, the PUCCH structure set comprising one or multiple PUCCH structures, and when the PUCCH structure set comprises multiple PUCCH structures, the number of symbol locations used for transmitting Reference Signals, RS, in different PUCCH structures being different, wherein a PUCCH structure is a distribution rule for symbol locations used for transmitting Uplink Control Information, UCI and symbol locations used for transmitting RS; and determining a PUCCH structure corresponding to the PUCCH from the PUCCH structure set, and performing PUCCH transmission on the basis of the corresponding PUCCH structure.

2. The method according to claim 1, wherein when the PUCCH structure set comprises one PUCCH structure, the determining a PUCCH structure corresponding to the PUCCH from the PUCCH structure set comprises: taking the one PUCCH structure comprised in the PUCCH structure set as the corresponding PUCCH structure; or when the PUCCH structure set comprises multiple PUCCH structures, the determining a PUCCH structure corresponding to the PUCCH from the PUCCH structure set comprises:

selecting a PUCCH structure as the corresponding PUCCH structure from the PUCCH structure set according to an acquired configuration instruction; and/or selecting a PUCCH structure with most symbol locations used for transmitting RS as the corresponding PUCCH structure from the PUCCH structure set upon determining that frequency hopping is performed during PUCCH transmission.

3. The method according to claim 1, wherein:

when the value of the number A of the symbols is X1 to X2, for each number A of the symbols within X1 to X2, at least two PUCCH structures are defined in the PUCCH structure set; when the value of the number A of the symbols is (X2+1) to X4, for each number A of the symbols within (X2+1) to X4, one PUCCH structure is defined in the PUCCH structure set; or when the value of the number A of the symbols is X1 to X2 and X3 to X4, for each number A of the symbols within X1 to X2 and X3 to X4, at least two PUCCH structures are defined in the PUCCH structure set; when the value of the number A of the symbols is (X2+1) to (X3−1), for each number A of the symbols within (X2+1) to (X3−1), one PUCCH structure is defined in the PUCCH structure set; or with regard to the value of each number A of the symbols supported by the PUCCH, one or at least two PUCCH structures are defined in the PUCCH structure set;

wherein X1, X2, X3 and X4 are positive integers, and X1≤X2≤X3<X4.

4. The method according to claim 1, wherein when it is determined that frequency hopping is performed during PUCCH transmission, the determining a PUCCH structure corresponding to the PUCCH from the PUCCH structure set, and performing PUCCH transmission on the basis of the corresponding PUCCH structure, comprise:

respectively transmitting information carried in a first symbol group and information carried in a second symbol group at different frequency domain positions by taking first $$\left\lfloor \frac{A}{2} \right\rfloor$$

symbols comprised by the PUCCH as the first symbol group and last $$\left(A-\left\lfloor \frac{A}{2} \right\rfloor\right)$$

symbols comprised by the PUCCH as the second symbol group; or respectively transmitting information carried in a first symbol group and information carried in a second symbol group at different frequency domain positions by taking first $$\left\lceil \frac{A}{2} \right\rceil$$

symbols comprised by the PUCCH as the first symbol group and last $$\left(A-\left\lceil \frac{A}{2} \right\rceil\right)$$

symbols comprised by the PUCCH as the second symbol group.

5. The method according to claim 1, wherein:

when the number A is 4, one of following schemes 1-3 is selected:

scheme 1: the PUCCH structure set comprises one PUCCH structure, and the PUCCH structure comprised in the PUCCH structure set comprises one symbol location used for transmitting RS and is one of following PUCCH structures: URUU, UURU and RUUU;

scheme 2: the PUCCH structure set comprises one PUCCH structure, and the PUCCH structure comprised in the PUCCH structure set comprises two symbol locations used for transmitting RS and is one of following PUCCH structures: URRU, RURU, RUUR and URUR; and scheme 3: the PUCCH structure set comprises two PUCCH structures, wherein a first PUCCH structure comprises one symbol location used for transmitting RS and is one of following PUCCH structures: URUU, UURU and RUUU; and a second PUCCH structure comprises two symbol locations used for transmitting RS and is one of following PUCCH structures: URRU, RURU, RUUR and URUR;

and/or when the number A is 5, one of following schemes 4-6 is selected:

scheme 4: the PUCCH structure set comprises one PUCCH structure, and the PUCCH structure comprised in the PUCCH structure set comprises one symbol location used for transmitting RS and is one of following PUCCH structures: UURUU, URUUU and RUUUU;

scheme 5: the PUCCH structure set comprises one PUCCH structure, and the PUCCH structure comprised in the PUCCH structure set comprises two symbol locations used for transmitting RS and is one of following PUCCH structures: URRUU, UURRU, RUURU, RURUU and URURU; and scheme 6: the PUCCH structure set comprises two PUCCH structures, wherein a first PUCCH structure comprises one symbol location used for transmitting RS and is one of following PUCCH structures: UURUU, URUUU and RUUUU; and a second PUCCH structure comprises two symbol locations used for transmitting RS and is one of following PUCCH structures: URRUU, UURRU, RUURU, RURUU and URURU;

and/or when the number A is 6, one of following schemes 7-9 is selected:

scheme 7: the PUCCH structure set comprises one PUCCH structure, and the PUCCH structure comprised in the PUCCH structure set comprises one symbol location used for transmitting RS and is one of following PUCCH structures: URUUUU, UURUUU, UUURUU and RUUUUU;

scheme 8: the PUCCH structure set comprises one PUCCH structure, and the PUCCH structure comprised in the PUCCH structure set comprises two symbol locations used for transmitting RS and is one of following PUCCH structures: URURUU, URUURU, RUUUUR, URUUUR, RUUURU and UURRUU; and scheme 9: the PUCCH structure set comprises two PUCCH structures, wherein a first PUCCH structure comprises one symbol location used for transmitting RS and is one of following PUCCH structures: URUUUU, UURUUU, UUURUU and RUUUUU; and a second PUCCH structure comprises two symbol locations used for transmitting RS and is one of following PUCCH structures: URURUU, URUURU, RUUUUR, URUUUR, RUUURU and UURRUU;

and/or when the number A is 7, one of following schemes 10-12 is selected:

scheme 10: the PUCCH structure set comprises one PUCCH structure, and the PUCCH structure comprised in the PUCCH structure set comprises one symbol location used for transmitting RS and is one of following PUCCH structures: URUUUUU, UURUUUU, UUURUUU and RUUUUUU;

scheme 11: the PUCCH structure set comprises one PUCCH structure, and the PUCCH structure comprised in the PUCCH structure set comprises two symbol locations used for transmitting RS and is one of following PUCCH structures: RUUUUUR, URUUUUR, RUUUURU, URUUURU, URUURUU, UURURUU, UURRUUU and UUURRUU; and scheme 12: the PUCCH structure set comprises two PUCCH structures, wherein a first PUCCH structure comprises one symbol location used for transmitting RS and is one of following PUCCH structures: URUUUUU, UURUUUU, UUURUUU and RUUUUUU; and a second PUCCH structure comprises two symbol locations used for transmitting RS and is one of following PUCCH structures: RUUUUUR, URUUUUR, RUUUURU, URUUURU, URUURUU, UURURUU, UURRUUU and UUURRUU;

and/or when the number A is 8, one of following schemes 13-15 is selected:

scheme 13: the PUCCH structure set comprises one PUCCH structure, and the PUCCH structure comprised in the PUCCH structure set comprises two symbol locations used for transmitting RS and is one of following PUCCH structures: URUUUURU, URUUURUU, RUUUUUUR, RUUUUURU, RUUUURUU, RUUURUUU, UUURRUUU and UURUURUU;

scheme 14: the PUCCH structure set comprises one PUCCH structure, and the PUCCH structure comprised in the PUCCH structure set comprises three or four symbol locations used for transmitting RS and is one of following PUCCH structures: URRUURRU, URURURUR, RURURURU, RUURRUUR, RURUURUR, RUURUURU, RUURUUUR, RUUURUUR, URURUURU and URURURUU; and scheme 15: the PUCCH structure set comprises two PUCCH structures, wherein a first PUCCH structure comprises one or two symbol locations used for transmitting RS and is one of following PUCCH structures: URUUUURU, URUUURUU, RUUUUUUR, RUUUUURU, RUUUURUU, RUUURUUU, UUURRUUU, UURUURUU, UUURUUUU and RUUUUUUU; and a second PUCCH structure comprises three or four symbol locations used for transmitting RS and is one of following PUCCH structures: URRUURRU, URURURUR, RURURURU, RURUURUR, RUURRUUR, RUURUURU, RUURUUUR, RUUURUUR, URURUURU and URURURUU;

and/or when the number A is 9, one of following schemes 16-18 is selected:

scheme 16: the PUCCH structure set comprises one PUCCH structure, and the PUCCH structure comprised in the PUCCH structure set comprises two symbol locations used for transmitting RS and is one of following PUCCH structures: UURUUURUU, URUUUURUU, URUUUUURU, URUUURUUU, RUUURUUUU, RUUUUUUUR, RUUUUURUU, RUUUUUURU, RUUUURUUU, UURUUUURU, UUURRUUU and UUURRUUUU;

scheme 17: the PUCCH structure set comprises one PUCCH structure, and the PUCCH structure comprised in the PUCCH structure set comprises three or four symbol locations used for transmitting RS and is one of following PUCCH structures: URURURURU, URRUURRUU, URRUUURRU, RUURRUURU, RUURRUUUR, RUUURRUUR, RUURURUUR, RURUURUUR, URURURUUR, RUUURUUUR, URUURUURU and URURURURU; and scheme 18: the PUCCH structure set comprises two PUCCH structures, wherein a first PUCCH structure comprises one or two symbol locations used for transmitting RS and is one of following PUCCH structures: UURUUURUU, URUUUURUU, URURURURU, URUUURUUU, RUUURUUUU, RUUUUUUUR, RUUUUURUU, RUUUUUURU, RUUUURUUU, UURUUUURU, UUUURRUUU, UUURRUUUU, RUUUUUUUU and UUUURUUUU; and a second PUCCH structure comprises three or four symbol locations used for transmitting RS and is one of following PUCCH structures: URURURURU, URRUURRUU, URRUUURRU, RUURRUURU, RUURRUUUR, RUUURRUUR, RUURURUUR, RURUURUUR, URURURUUR, RUUURUUUR, URUURUURU and URURURURU;

and/or when the number A is 10, one of following schemes 19-21 is selected:

scheme 19: the PUCCH structure set comprises one PUCCH structure, and the PUCCH structure comprised in the PUCCH structure set comprises two symbol locations used for transmitting RS and is one of following PUCCH structures: UURUUUURUU, URUUUURUUU, URUUUUUURU, RUUUURUUUU, UURUUURUUU, URUUURUUUU, URUUUUURUU, RUUUUUUUUR, RUUUUUURUU, RUUUUURUUU and UUUURRUUUU;

scheme 20: the PUCCH structure set comprises one PUCCH structure, and the PUCCH structure comprised in the PUCCH structure set comprises three or four symbol locations used for transmitting RS and is one of following PUCCH structures: URURURURUU, URURUURURU, URUURRUURU, URRUUUURRU, UURRUURRUU, RUURUURUUR, RUUURRUUUR, URURURUURU, RUUURUUURU, RUUURRUUUR, URUURUURUU and URUUURUUUR; and scheme 21: the PUCCH structure set comprises two PUCCH structures, wherein a first PUCCH structure comprises one or two symbol locations used for transmitting RS and is one of following PUCCH structures: UURUUUURUU, URUUUURUUU, URUUUUUURU, RUUUURUUUU, UURUUURUUU, URUUURUUUU, URUUUUURUU, RUUUUUUUUR, RUUUUUURUU, RUUUUURUUU, UUUURRUUUU, RUUUUUUUUU and UUUURUUUUU; and a second PUCCH structure comprises three or four symbol locations used for transmitting RS and is one of following PUCCH structures: URURURURUU, URURUURURU, URUURRUURU, URRUUUURRU, UURRUURRUU, RUURUURUUR, RUUURRUUUR, URURURUURU, RUUURUUURU, RUUURRUUUR, URUURUURUU and URUUURUUUR;

and/or when the number A is 11, one of following schemes 22-24 is selected:

scheme 22: the PUCCH structure set comprises one PUCCH structure, and the PUCCH structure comprised in the PUCCH structure set comprises two symbol locations used for transmitting RS and is one of following PUCCH structures: UURUUUURUUU, UURUUUUURUU, URUUUUURUUU, URUUUUUUURU, RUUUURUUUUU, RUUUUURUUUU, UUURUUURUUU, URUUURUUUU, RUUUUUUUURU, URUUUUUUUUR, URUUUUURUU, UUUURRUUUUU and RUUUUUUUUUR;

scheme 23: the PUCCH structure set comprises one PUCCH structure, and the PUCCH structure comprised in the PUCCH structure set comprises three or four symbol locations used for transmitting RS and is one of following PUCCH structures: UURURURURUU, URURUURURUU, URURUURUURU, URURUUURURU, URUURURUURU, URRUUUUURRU, URRUUUURRUU, UURRUUURRUU, RUURUUURUUR, RUUURURUUUR, RUUURRUUUUR, RUUUURRUUUR, URUUURUUURU, RUUUURUUUUR, UURUURUURUU and URUUURUUURU; and scheme 24: the PUCCH structure set comprises two PUCCH structures, wherein a first PUCCH structure comprises one or two symbol locations used for transmitting RS and is one of following PUCCH structures: UURUUUURUUU, UURUUUUURUU, URUUUUURUUU, URUUUUUUURU, RUUUURUUUUU, RUUUUURUUUU, UUURUUURUUU, URUUURUUUU, RUUUUUUUURU, URUUUUUUUUR, URUUUUURUU, UUUURRUUUUU, RUUUUUUUUUR, RUUUUUUUUUU and UUUUURUUUUU; and a second PUCCH structure comprises three or four symbol locations used for transmitting RS and is one of following PUCCH structures: UURURURURUU, URURUURURUU, URURUURUURU, URURUUURURU, URUURURUURU, URRUUUUURRU, URRUUUURRUU, UURRUUURRUU, RUURUUURUUR, RUUURURUUUR, RUUURRUUUUR, RUUUURRUUUR, URUUURUUURU, RUUUURUUUUR, UURUURUURUU and URUUURUUURU;

and/or when the number A is 12, one of following schemes 25-27 is selected:

scheme 25: the PUCCH structure set comprises one PUCCH structure, and the PUCCH structure comprised in the PUCCH structure set comprises two symbol locations used for transmitting RS and is one of following PUCCH structures: UUURUUUURUUU, UURUUUUUURUU, UURUUUUURUUU, URUUUUUUUURU, RUUUUURUUUUU, UURUUURUUUU, UUUUURRUUUUU and RUUUUUUUUUUR;

scheme 26: the PUCCH structure set comprises one PUCCH structure, and the PUCCH structure comprised in the PUCCH structure set comprises three or four symbol locations used for transmitting RS and is one of following PUCCH structures: UURURUURURUU, URUURUURUURU, URURUUURURUU, URURUUURURU, UURRUUUURRUU, UURRUUURRUUU, RUURUUUURUUR, RUUURUURUUUR, RUUUURRUUUUR, RUUURURUUURU, URUUURUURUU, URUUURUUUURU, URUUUURUUURU, RUUUURUUUURU, RUUUUURUUUUR, RUUUURUUUUUR, UURUURUUURUU, UURUUURUURUU and UURUURUURUUU; and scheme 27: the PUCCH structure set comprises two PUCCH structures, wherein a first PUCCH structure comprises one or two symbol locations used for transmitting RS and is one of following PUCCH structures: UUURUUUURUUU, UURUUUUUURUU, UURUUUUURUUU, URUUUUUUUURU, RUUUUURUUUUU, UURUUURUUUU, UUUUURRUUUUU, RUUUUUUUUUUR, RUUUUUUUUUUU and UUUUURUUUUUU; and a second PUCCH structure comprises three or four symbol locations used for transmitting RS and is one of following PUCCH structures: UURURUURURUU, URUURUURUURU, URURUUURURUU, URURUUUURURU, UURRUUUURRUU, UURRUUURRUUU, RUURUUUURUUR, RUUURUURUUUR, RUUUURRUUUUR, RUUURURUUURU, URUUURUUURUU, URUUURUUUURU, URUUUURUUURU, RUUUURUUUURU, RUUUUURUUUUR, RUUUURUUUUUR, UURUURUUURUU, UURUUURUURUU and UURUURUURUUU;

and/or when the number A is 13, one of following schemes 28-30 is selected:

scheme 28: the PUCCH structure set comprises one PUCCH structure, and the PUCCH structure comprised in the PUCCH structure set comprises two symbol locations used for transmitting RS and is one of following PUCCH structures: UURUUUUUURUU, UUURUUUURUUU, URUUUUUUUUURU, RUUUUURUUUUU, RUUUUUURUUUU, UURUUUUURUUU, UUUUURRUUUUU and RUUUUUUUUUUUR;

scheme 29: the PUCCH structure set comprises one PUCCH structure, and the PUCCH structure comprised in the PUCCH structure set comprises three or four symbol locations used for transmitting RS and is one of following PUCCH structures: UURURUUURURUU, URUURUUURUURU, URURUUUUURURU, URUURUURUURUU, URUURUURUUURU, UURRUUUUURRUU, UUURRUUURRUUU, RUURUURUURUUU, RUURUUUUURUUR, RUUURUUURUUUR, RUUUURRUUUUUR, URUUURURUUURU, RUUURUURUUURU, UURUUURUUURUU, URUUUURUUUURU, RUUUUURUUUUUR, UUURUURUURUUU and UURUUUURUURUU; and scheme 30: the PUCCH structure set comprises two PUCCH structures, wherein a first PUCCH structure comprises one or two symbol locations used for transmitting RS and is one of following PUCCH structures: UURUUUUUUURUU, UUURUUUUURUUU, URUUUUUUUUURU, RUUUUURUUUUUU, RUUUUUURUUUUU, UURUUUUUURUUU, UUUUURRUUUUUU, RUUUUUUUUUUUR, RUUUUUUUUUUUU and UUUUUURUUUUUU; and a second PUCCH structure comprises three or four symbol locations used for transmitting RS and is one of following PUCCH structures: UURURUUURURUU, URUURUUURUURU, URURUUUUURURU, URUURUURUURUU, URUURUURUUURU, UURRUUUUURRUU, UUURRUUURRUUU, RUURUURUURUUU, RUURUUUUURUUR, RUUURUUURUUUR, RUUUURRUUUUUR, URUUURURUUURU, RUUURUURUUURU, UURUUURUUURUU, URUUUURUUUURU, RUUUUURUUUUUR, UUURUURUURUUU and UURUUUURUURUU;

and/or when the number A is 14, one of following schemes 31-33 is selected:

scheme 31: the PUCCH structure set comprises one PUCCH structure, and the PUCCH structure comprised in the PUCCH structure set comprises two symbol locations used for transmitting RS and is one of following PUCCH structures: UURUUUUUUUURUU, UUUURUUUURUUUU, UUUUUURRUUUUUU and RUUUUUUUUUUUUR;

scheme 32: the PUCCH structure set comprises one PUCCH structure, and the PUCCH structure comprised in the PUCCH structure set comprises three or four symbol locations used for transmitting RS and is one of following PUCCH structures: URUUURUURUUURU, UURURUUUURURUU, URUURUUUURUURU, URUURUUURUURUU, URURUUUUUURURU, UURUURUURUURUU, UURRUUUUUURRUU, UUURRUUUURRUUU, RUURUUURUURUUU, RUURUUUUUURUUR, RUUURUUUURUUUR, RUUUUURRUUUUUR, UURUURUUURUURU, URUUUURUUUURUU, URUUUURUUUUURU, URUUUUURUUUURU, RUUUUURUUUUUUR, RUUUUUURUUUUUR, RUUUUURUUUUURU, URUUUUURUUUUUR, UUURUUURUURUUU, UUURUURUUURUUU, UURUUURUUURUUU and UURUUUURUUURUU; and scheme 33: the PUCCH structure set comprises two PUCCH structures, wherein a first PUCCH structure comprises one or two symbol locations used for transmitting RS and is one of following PUCCH structures: UURUUUUUUUURUU, UUUURUUUURUUUU, URUUUUUUUUUURU, RUUUUUURUUUUUU, UUURUUUUUURUUU, UUUUUURRUUUUUU, RUUUUUUUUUUUUR, RUUUUUUUUUUUUU and UUUUUUURUUUUUU; and a second PUCCH structure comprises three or four symbol locations used for transmitting RS and is one of following PUCCH structures: URUUURUURUUURU, UURURUUUURURUU, URUURUUUURUURU, URUURUUURUURUU, URURUUUUUURURU, UURUURUURUURUU, UURRUUUUUURRUU, UUURRUUUURRUUU, RUURUUURUURUUU, RUURUUUUUURUUR, RUUURUUUURUUUR, RUUUUURRUUUUUR, UURUURUUURUURU, URUUUURUUUURUU, URUUUURUUUUURU, URUUUUURUUUURU, RUUUUURUUUUUUR, RUUUUUURUUUUUR, RUUUUURUUUUURU, URUUUUURUUUUUR, UUURUUURUURUUU, UUURUURUUURUUU, UURUUURUUURUUU and UURUUUURUUURUU;

and wherein in a PUCCH structure, U represents a symbol location used for transmitting UCI, and R represents a symbol location used for transmitting RS.

6. A PUCCH transmission method, comprising:

determining the number A of symbols occupied by a Physical Uplink Control Channel, PUCCH, the number A being a positive integer;

determining a PUCCH structure set that is defined in correspondence to the number A of the symbols, a PUCCH structure comprised in the PUCCH structure set comprising the number A of symbol locations, the PUCCH structure set comprising one or multiple PUCCH structures, and when the PUCCH structure set comprises multiple PUCCH structures, the number of symbol locations used for transmitting Reference Signals, RS, in different PUCCH structures being different, wherein a PUCCH structure is a distribution rule for symbol locations used for transmitting Uplink Control Information, UCI, and symbol locations used for transmitting RS; and determining a PUCCH structure corresponding to the PUCCH from the PUCCH structure set, and performing PUCCH reception on the basis of the corresponding PUCCH structure.

7. The method according to claim 6, wherein when the PUCCH structure set comprises one PUCCH structure, the determining a PUCCH structure corresponding to the PUCCH from the PUCCH structure set comprises: taking the one PUCCH structure comprised in the PUCCH structure set as the corresponding PUCCH structure; or when the PUCCH structure set comprises multiple PUCCH structures, the determining a PUCCH structure corresponding to the PUCCH from the PUCCH structure set comprises:

selecting a PUCCH structure as the corresponding PUCCH structure from the PUCCH structure set, and informing a selection result to a terminal through a configuration instruction; and/or selecting a PUCCH structure with most symbol locations used for transmitting RS as the corresponding PUCCH structure from the PUCCH structure set upon determining that frequency hopping is performed during PUCCH transmission, and informing the terminal of a demand for frequency hopping through a configuration instruction.

8. The method according to claim 6, wherein:

when the value of the number A of the symbols is X1 to X2, for each number A of the symbols within X1 to X2, at least two PUCCH structures are defined in the PUCCH structure set; when the value of the number A of the symbols is (X2+1) to X4, for each number A of the symbols within (X2+1) to X4, one PUCCH structure is defined in the PUCCH structure set; or when the value of the number A of the symbols is X1 to X2 and X3 to X4, for each number A of the symbols within X1 to X2 and X3 to X4, at least two PUCCH structures are defined in the PUCCH structure set; when the value of the number A of the symbols is (X2+1) to (X3−1), for each number A of the symbols within (X2+1) to (X3−1), one PUCCH structure is defined in the PUCCH structure set; or with regard to the value of each number A of the symbols supported by the PUCCH, one or at least two PUCCH structures are defined in the PUCCH structure set;

wherein X1, X2, X3 and X4 are positive integers, and X1≤X2≤X3<X4.

9. The method according to claim 6, wherein when it is determined that frequency hopping is performed during PUCCH transmission, the determining a PUCCH structure corresponding to the PUCCH from the PUCCH structure set, and performing PUCCH reception on the basis of the corresponding PUCCH structure, comprise:

respectively receiving information carried in a first symbol group and information carried in a second symbol group at different frequency domain positions by taking first $$\left\lfloor \frac{A}{2} \right\rfloor$$

symbols comprised by the PUCCH as the first symbol group and last $$\left(A-\left\lfloor \frac{A}{2} \right\rfloor\right)$$

symbols comprised by the PUCCH as the second symbol group; or respectively receiving information carried in a first symbol group and information carried in a second symbol group at different frequency domain positions by taking first $$\left\lceil \frac{A}{2} \right\rceil$$

symbols comprised by the PUCCH as the first symbol group and last $$\left(A-\left\lceil \frac{A}{2} \right\rceil\right)$$

symbols comprised by the PUCCH as the second symbol group.

10. The method according to claim 6, wherein:

when the number A is 4, one of following schemes 1-3 is selected:

scheme 1: the PUCCH structure set comprises one PUCCH structure, and the PUCCH structure comprised in the PUCCH structure set comprises one symbol location used for transmitting RS and is one of following PUCCH structures: URUU, UURU and RUUU;

scheme 2: the PUCCH structure set comprises one PUCCH structure, and the PUCCH structure comprised in the PUCCH structure set comprises two symbol locations used for transmitting RS and is one of following PUCCH structures: URRU, RURU, RUUR and URUR; and scheme 3: the PUCCH structure set comprises two PUCCH structures, wherein a first PUCCH structure comprises one symbol location used for transmitting RS and is one of following PUCCH structures: URUU, UURU and RUUU; and a second PUCCH structure comprises two symbol locations used for transmitting RS and is one of following PUCCH structures: URRU, RURU, RUUR and URUR;

and/or when the number A is 5, one of following schemes 4-6 is selected:

scheme 4: the PUCCH structure set comprises one PUCCH structure, and the PUCCH structure comprised in the PUCCH structure set comprises one symbol location used for transmitting RS and is one of following PUCCH structures: UURUU, URUUU and RUUUU;

scheme 5: the PUCCH structure set comprises one PUCCH structure, and the PUCCH structure comprised in the PUCCH structure set comprises two symbol locations used for transmitting RS and is one of following PUCCH structures: URRUU, UURRU, RUURU, RURUU and URURU; and scheme 6: the PUCCH structure set comprises two PUCCH structures, wherein a first PUCCH structure comprises one symbol location used for transmitting RS and is one of following PUCCH structures: UURUU, URUUU and RUUUU; and a second PUCCH structure comprises two symbol locations used for transmitting RS and is one of following PUCCH structures: URRUU, UURRU, RUURU, RURUU and URURU;

and/or when the number A is 6, one of following schemes 7-9 is selected:

scheme 7: the PUCCH structure set comprises one PUCCH structure, and the PUCCH structure comprised in the PUCCH structure set comprises one symbol location used for transmitting RS and is one of following PUCCH structures: URUUUU, UURUUU, UUURUU and RUUUUU;

scheme 8: the PUCCH structure set comprises one PUCCH structure, and the PUCCH structure comprised in the PUCCH structure set comprises two symbol locations used for transmitting RS and is one of following PUCCH structures: URURUU, URUURU, RUUUUR, URUUUR, RUUURU and UURRUU; and scheme 9: the PUCCH structure set comprises two PUCCH structures, wherein a first PUCCH structure comprises one symbol location used for transmitting RS and is one of following PUCCH structures: URUUUU, UURUUU, UUURUU and RUUUUU; and a second PUCCH structure comprises two symbol locations used for transmitting RS and is one of following PUCCH structures: URURUU, URUURU, RUUUUR, URUUUR, RUUURU and UURRUU;

and/or when the number A is 7, one of following schemes 10-12 is selected:

scheme 10: the PUCCH structure set comprises one PUCCH structure, and the PUCCH structure comprised in the PUCCH structure set comprises one symbol location used for transmitting RS and is one of following PUCCH structures: URUUUUU, UURUUUU, UUURUUU and RUUUUUU;

scheme 11: the PUCCH structure set comprises one PUCCH structure, and the PUCCH structure comprised in the PUCCH structure set comprises two symbol locations used for transmitting RS and is one of following PUCCH structures: RUUUUUR, URUUUUR, RUUUURU, URUUURU, URUURUU, UURURUU, UURRUUU and UUURRUU; and scheme 12: the PUCCH structure set comprises two PUCCH structures, wherein a first PUCCH structure comprises one symbol location used for transmitting RS and is one of following PUCCH structures: URUUUU, UURUUUU, UUURUUU and RUUUUUU; and a second PUCCH structure comprises two symbol locations used for transmitting RS and is one of following PUCCH structures: RUUUUUR, URUUUUR, RUUUURU, URUUURU, URUURUU, UURURUU, UURRUUU and UUURRUU;

and/or when the number A is 8, one of following schemes 13-15 is selected:

scheme 13: the PUCCH structure set comprises one PUCCH structure, and the PUCCH structure comprised in the PUCCH structure set comprises two symbol locations used for transmitting RS and is one of following PUCCH structures: URUUUURU, URUUURUU, RUUUUUUR, RUUUUURU, RUUUURUU, RUUURUUU, UUURRUUU and UURUURUU;

scheme 14: the PUCCH structure set comprises one PUCCH structure, and the PUCCH structure comprised in the PUCCH structure set comprises three or four symbol locations used for transmitting RS and is one of following PUCCH structures: URRUURRU, URURURUR, RURURURU, RUURRUUR, RURUURUR, RUURUURU, RUURUUUR, RUUURUUR, URURUURU and URURURUU; and scheme 15: the PUCCH structure set comprises two PUCCH structures, wherein a first PUCCH structure comprises one or two symbol locations used for transmitting RS and is one of following PUCCH structures: URUUUURU, URUUURUU, RUUUUUUR, RUUUUURU, RUUUURUU, RUUURUUU, UUURRUUU, UURUURUU, UUURUUUU and RUUUUUUU; and a second PUCCH structure comprises three or four symbol locations used for transmitting RS and is one of following PUCCH structures: URRUURRU, URURURUR, RURURURU, RURUURUR, RUURRUUR, RUURUURU, RUURUUUR, RUUURUUR, URURUURU and URURURUU;

and/or when the number A is 9, one of following schemes 16-18 is selected:

scheme 16: the PUCCH structure set comprises one PUCCH structure, and the PUCCH structure comprised in the PUCCH structure set comprises two symbol locations used for transmitting RS and is one of following PUCCH structures: UURUUURUU, URUUUURUU, URUUUUURU, URUUURUUU, RUUURUUUU, RUUUUUUUR, RUUUUURUU, RUUUUUURU, RUUUURUUU, UURUUUURU, UUUURRUUU and UUURRUUUU;

scheme 17: the PUCCH structure set comprises one PUCCH structure, and the PUCCH structure comprised in the PUCCH structure set comprises three or four symbol locations used for transmitting RS and is one of following PUCCH structures: URURURURU, URRUURRUU, URRUUURRU, RUURRUURU, RUURRUUUR, RUUURRUUR, RUURURUUR, RURUURUUR, URURURUUR, RUUURUUUR, URUURUURU and URURURURU; and scheme 18: the PUCCH structure set comprises two PUCCH structures, wherein a first PUCCH structure comprises one or two symbol locations used for transmitting RS and is one of following PUCCH structures: UURUUURUU, URUUUURUU, URURURURU, URUUURUUU, RUUURUUUU, RUUUUUUUR, RUUUUURUU, RUUUUUURU, RUUUURUUU, UURUUUURU, UUUURRUUU, UUURRUUUU, RUUUUUUUU and UUUURUUUU; and a second PUCCH structure comprises three or four symbol locations used for transmitting RS and is one of following PUCCH structures: URURURURU, URRUURRUU, URRUUURRU, RUURRUURU, RUURRUUUR, RUUURRUUR, RUURURUUR, RURUURUUR, URURURUUR, RUUURUUUR, URUURUURU and URURURURU;

and/or when the number A is 10, one of following schemes 19-21 is selected:

scheme 19: the PUCCH structure set comprises one PUCCH structure, and the PUCCH structure comprised in the PUCCH structure set comprises two symbol locations used for transmitting RS and is one of following PUCCH structures: UURUUUURUU, URUUUURUUU, URUUUUUURU, RUUUURUUUU, UURUUURUUU, URUUURUUUU, URUUUUURUU, RUUUUUUUUR, RUUUUUURUU, RUUUUURUUU and UUUURRUUUU;

scheme 20: the PUCCH structure set comprises one PUCCH structure, and the PUCCH structure comprised in the PUCCH structure set comprises three or four symbol locations used for transmitting RS and is one of following PUCCH structures: URURURURUU, URURUURURU, URUURRUURU, URRUUUURRU, UURRUURRUU, RUURUURUUR, RUUURRUUUR, URURURUURU, RUUURUUURU, RUUURRUUUR, URUURUURUU and URUUURUUUR; and scheme 21: the PUCCH structure set comprises two PUCCH structures, wherein a first PUCCH structure comprises one or two symbol locations used for transmitting RS and is one of following PUCCH structures: UURUUUURUU, URUUUURUUU, URUUUUUURU, RUUUURUUUU, UURUUURUUU, URUUURUUUU, URUUUUURUU, RUUUUUUUUR, RUUUUUURUU, RUUUUURUUU, UUUURRUUUU, RUUUUUUUUU and UUUURUUUUU; and a second PUCCH structure comprises three or four symbol locations used for transmitting RS and is one of following PUCCH structures: URURURURUU, URURUURURU, URUURRUURU, URRUUUURRU, UURRUURRUU, RUURUURUUR, RUUURRUUUR, URURURUURU, RUUURUUURU, RUUURRUUUR, URUURUURUU and URUUURUUUR;

and/or when the number A is 11, one of following schemes 22-24 is selected:

scheme 22: the PUCCH structure set comprises one PUCCH structure, and the PUCCH structure comprised in the PUCCH structure set comprises two symbol locations used for transmitting RS and is one of following PUCCH structures: UURUUUURUUU, UURUUUUURUU, URUUUUURUUU, URUUUUUURU, RUUUURUUUUU, RUUUUURUUUU, UUURUUURUUU, URUUURUUUU, RUUUUUUUURU, URUUUUUUUUR, URUUUUURUU, UUUURRUUUUU and RUUUUUUUUUR;

scheme 23: the PUCCH structure set comprises one PUCCH structure, and the PUCCH structure comprised in the PUCCH structure set comprises three or four symbol locations used for transmitting RS and is one of following PUCCH structures: UURURURURUU, URURUURURUU, URURUURUURU, URURUUURURU, URUURURUURU, URRUUUUURRU, URRUUUURRUU, UURRUUURRUU, RUURUUURUUR, RUUURURUUUR, RUUURRUUUUR, RUUUURRUUUR, URUUURUUURU, RUUUURUUUUR, UURUURUURUU and URUUURUUURU; and scheme 24: the PUCCH structure set comprises two PUCCH structures, wherein a first PUCCH structure comprises one or two symbol locations used for transmitting RS and is one of following PUCCH structures: UURUUUURUUU, UURUUUUURUU, URUUUUURUUU, URUUUUUUURU, RUUUURUUUUU, RUUUUURUUUU, UUURUUURUUU, URUUURUUUU, RUUUUUUUURU, URUUUUUUUUR, URUUUUUURUU, UUUURRUUUUU, RUUUUUUUUUR, RUUUUUUUUUU and UUUUURUUUUU; and a second PUCCH structure comprises three or four symbol locations used for transmitting RS and is one of following PUCCH structures: UURURURURUU, URURUURURUU, URURUURUURU, URURUUURURU, URUURURUURU, URRUUUUURRU, URRUUUURRUU, UURRUUURRUU, RUURUUURUUR, RUUURURUUUR, RUUURRUUUUR, RUUUURRUUUR, URUUURUUURU, RUUUURUUUUR, UURUURUURUU and URUUURUUURU;

and/or when the number A is 12, one of following schemes 25-27 is selected:

scheme 25: the PUCCH structure set comprises one PUCCH structure, and the PUCCH structure comprised in the PUCCH structure set comprises two symbol locations used for transmitting RS and is one of following PUCCH structures: UUURUUUURUUU, UURUUUUUURUU, UURUUUUURUUU, URUUUUUUUURU, RUUUUURUUUUU, UURUUUURUUU, UUUUURRUUUUU and RUUUUUUUUUUR;

scheme 26: the PUCCH structure set comprises one PUCCH structure, and the PUCCH structure comprised in the PUCCH structure set comprises three or four symbol locations used for transmitting RS and is one of following PUCCH structures: UURURUURURUU, URUURUURUURU, URURUUURURUU, URURUUUURURU, UURRUUUURRUU, UURRUUURRUUU, RUURUUUURUUR, RUUURUURUUUR, RUUUURRUUUUR, RUURURUUUURU, URUUURUUURUU, URUUUURUUURU, URUUUURUURU, RUUUURUUUURU, RUUUURUUUUR, RUUUURUUUUUR, UURUURUUURUU, UURUUURUURUU and UURUURUURUUU; and scheme 27: the PUCCH structure set comprises two PUCCH structures, wherein a first PUCCH structure comprises one or two symbol locations used for transmitting RS and is one of following PUCCH structures: UUURUUUURUUU, UURUUUUUURUU, UURUUUUURUUU, URUUUUUUUURU, RUUUUURUUUUU, UURUUURUUUU, UUUUURRUUUUU, RUUUUUUUUUUR, RUUUUUUUUUUU and UUUUURUUUUUU; and a second PUCCH structure comprises three or four symbol locations used for transmitting RS and is one of following PUCCH structures: UURURUURURUU, URUURUURUURU, URURUUURURUU, URURUUUURURU, UURRUUUURRUU, UURRUUURRUUU, RUURUUUURUUR, RUUURUURUUUR, RUUUURRUUUUR, RUUURURUUURU, URUUURUUURUU, URUUURUUURU, URUUUURUUURU, RUUUURUUURU, RUUUUURUUUUR, RUUUURUUUUUR, UURUURUUURUU, UURUUURUURUU and UURUURUURUUU;

and/or when the number A is 13, one of following schemes 28-30 is selected:

scheme 28: the PUCCH structure set comprises one PUCCH structure, and the PUCCH structure comprised in the PUCCH structure set comprises two symbol locations used for transmitting RS and is one of following PUCCH structures: UURUUUUUUURUU, UUURUUUUURUUU, URUUUUUUUUURU, RUUUUURUUUUUU, RUUUUUURUUUUU, UURUUUUUURUUU, UUUUURRUUUUUU and RUUUUUUUUUUUR;

scheme 29: the PUCCH structure set comprises one PUCCH structure, and the PUCCH structure comprised in the PUCCH structure set comprises three or four symbol locations used for transmitting RS and is one of following PUCCH structures: UURURUUURURUU, URUURUUURUURU, URURUUUUURURU, URUURUURUURUU, URUURUURUUURU, UURRUUUUURRUU, UUURRUUURRUUU, RUURUURUURUUU, RUURUUUUURUUR, RUUURUUURUUUR, RUUUURRUUUUUR, URUUURURUUURU, RUUURUURUUURU, UURUUURUUURUU, URUUUURUUUURU, RUUUUURUUUUUR, UUURUURUURUUU and UURUUUURUURUU; and scheme 30: the PUCCH structure set comprises two PUCCH structures, wherein a first PUCCH structure comprises one or two symbol locations used for transmitting RS and is one of following PUCCH structures: UURUUUUUUURUU, UUURUUUUURUUU, URUUUUUUUUURU, RUUUUURUUUUUU, RUUUUUURUUUUU, UURUUUUUURUUU, UUUUURRUUUUUU, RUUUUUUUUUUUR, RUUUUUUUUUUUU and UUUUUURUUUUUU; and a second PUCCH structure comprises three or four symbol locations used for transmitting RS and is one of following PUCCH structures: UURURUUURURUU, URUURUUURUURU, URURUUUUURURU, URUURUURUURUU, URUURUURUUURU, UURRUUUUURRUU, UUURRUUURRUUU, RUURUURUURUUU, RUURUUUUURUUR, RUUURUUURUUUR, RUUUURRUUUUUR, URUUURURUUURU, RUUURUURUUURU, UURUUURUUURUU, URUUUURUUUURU, RUUUUURUUUUUR, UUURUURUURUUU and UURUUUURUURUU;

and/or when the number A is 14, one of following schemes 31-33 is selected:

scheme 31: the PUCCH structure set comprises one PUCCH structure, and the PUCCH structure comprised in the PUCCH structure set comprises two symbol locations used for transmitting RS and is one of following PUCCH structures: UURUUUUUUUURUU, UUUURUUUURUUUU, URUUUUUUUUUURU, RUUUUUURUUUUUU, UUURUUUUUURUUU, UUUUUURRUUUUUU and RUUUUUUUUUUUUR;

scheme 32: the PUCCH structure set comprises one PUCCH structure, and the PUCCH structure comprised in the PUCCH structure set comprises three or four symbol locations used for transmitting RS and is one of following PUCCH structures: URUUURUURUUURU, UURURUUUURURUU, URUURUUUURUURU, URUURUUURUURUU, URURUUUUUURURU, UURUURUURUURUU, UURRUUUUUURRUU, UUURRUUUURRUUU, RUURUUURUURUUU, RUURUUUUUURUUR, RUUURUUUURUUUR, RUUUUURRUUUUUR, UURUURUUURUURU, URUUUURUUUURUU, URUUUURUUUUURU, URUUUUURUUUURU, RUUUUURUUUUUUR, RUUUUUURUUUUUR, RUUUUURUUUUURU, URUUUUURUUUUUR, UUURUUURUURUUU, UUURUURUUURUUU, UURUUURUUURUUU and UURUUUURUUURUU; and scheme 33: the PUCCH structure set comprises two PUCCH structures, wherein a first PUCCH structure comprises one or two symbol locations used for transmitting RS and is one of following PUCCH structures: UURUUUUUUUURUU, UUUURUUUURUUUU, URUUUUUUUUUURU, RUUUUUURUUUUUU, UUURUUUUUURUUU, UUUUUURRUUUUUU, RUUUUUUUUUUUUR, RUUUUUUUUUUUUU and UUUUUURUUUUUUU; and a second PUCCH structure comprises three or four symbol locations used for transmitting RS and is one of following PUCCH structures: R, URUUURUURUUURU, UURURUUUURURUU, URUURUUUURUURU, URUURUUURUURUU, URURUUUUUURURU, UURUURUURUURUU, UURRUUUUUURRUU, UUURRUUUURRUUU, RUURUUURUURUUU, RUURUUUUUURUUR, RUUURUUUURUUUR, RUUUUURRUUUUUR, UURUURUUURUURU, URUUUURUUUURUU, URUUUURUUUUURU, URUUUUURUUUURU, RUUUUURUUUUUUR, RUUUUUURUUUUUR, RUUUUURUUUUURU, URUUUUURUUUUUR, UUURUUURUURUUU, UUURUURUUURUUU, UURUUURUUURUUU and UURUUUURUUURUU;

and wherein in a PUCCH structure, U represents a symbol location used for transmitting UCI, and R represents a symbol location used for transmitting RS.

11. A user equipment, comprising a processor, and a memory and a transceiver connected with the processor; and the processor being configured for reading a program in the memory to execute the following process:

determining the number A of symbols occupied by a Physical Uplink Control Channel, PUCCH, the number A being a positive integer; determining a PUCCH structure set that is defined in correspondence to the number A of the symbols, a PUCCH structure comprised in the PUCCH structure set comprising the number A of symbol locations, the PUCCH structure set comprising one or multiple PUCCH structures, and when the PUCCH structure set comprises multiple PUCCH, the number of symbol locations used for transmitting Reference Signals, RS, in different PUCCH structures being different, wherein a PUCCH structure is a distribution rule for symbol locations used for transmitting Uplink Control Information, UCI and symbol locations used for transmitting RS; determining a PUCCH structure corresponding to the PUCCH from the PUCCH structure set; and performing PUCCH transmission on the basis of the corresponding PUCCH structure.

12. The user equipment according to claim 11, wherein the processor is configured for:

when the PUCCH structure set comprises one PUCCH structure, taking the one PUCCH structure comprised in the PUCCH structure set as the corresponding PUCCH structure; or when the PUCCH structure set comprises multiple PUCCH structures, selecting a PUCCH structure as the corresponding PUCCH structure from the PUCCH structure set according to an acquired configuration instruction, and/or selecting a PUCCH structure with most symbol locations used for transmitting RS as the corresponding PUCCH structure from the PUCCH structure set upon determining that frequency hopping is performed during PUCCH transmission.

13. The user equipment according to claim 11, wherein:

when the value of the number A of the symbols is X1 to X2, for each number A of the symbols within X1 to X2, at least two PUCCH structures are defined in the PUCCH structure set; when the value of the number A of the symbols is (X2+1) to X4, for each number A of the symbols within (X2+1) to X4, one PUCCH structure is defined in the PUCCH structure set; or when the value of the number A of the symbols is X1 to X2 and X3 to X4, for each number A of the symbols within X1 to X2 and X3 to X4, at least two PUCCH structures are defined in the PUCCH structure set; when the value of the number A of the symbols is (X2+1) to (X3−1), for each number A of the symbols within (X2+1) to (X3−1), one PUCCH structure is defined in the PUCCH structure set; or with regard to the value of each number A of the symbols supported by the PUCCH, one or at least two PUCCH structures are defined in the PUCCH structure set;

wherein X1, X2, X3 and X4 are positive integers, and $X1 \leq X2 \leq X3 < X4$.

14. The user equipment according to claim 11, wherein the processor is configured for:

when it is determined that frequency hopping is performed during PUCCH transmission, respectively transmitting information carried in a first symbol group and information carried in a second symbol group at different frequency domain positions by taking first $$\left\lfloor \frac{A}{2} \right\rfloor$$

symbols comprised by the PUCCH as the first symbol group and last $\left(A-\left\lfloor \frac{A}{2} \right\rfloor\right)$ symbols comprised by the PUCCH as the second symbol group; or respectively transmitting information carried in a first symbol group and information carried in a second symbol group at different frequency domain positions by taking first $\left\lceil \frac{A}{2} \right\rceil$ symbols comprised by the PUCCH as the first symbol group and last $\left(A-\left\lceil \frac{A}{2} \right\rceil\right)$ symbols comprised by the PUCCH as the second symbol group.

15. The user equipment according to claim 11, wherein:

when the number A is 4, one of following schemes 1-3 is selected:

scheme 1: the PUCCH structure set comprises one PUCCH structure, and the PUCCH structure comprised in the PUCCH structure set comprises one symbol location used for transmitting RS and is one of following PUCCH structures: URUU, UURU and RUUU;

scheme 2: the PUCCH structure set comprises one PUCCH structure, and the PUCCH structure comprised in the PUCCH structure set comprises two symbol locations used for transmitting RS and is one of following PUCCH structures: URRU, RURU, RUUR and URUR; and scheme 3: the PUCCH structure set comprises two PUCCH structures, wherein a first PUCCH structure comprises one symbol location used for transmitting RS and is one of following PUCCH structures: URUU, UURU and RUUU; and a second PUCCH structure comprises two symbol locations used for transmitting RS and is one of following PUCCH structures: URRU, RURU, RUUR and URUR;

and/or when the number A is 5, one of following schemes 4-6 is selected:

scheme 4: the PUCCH structure set comprises one PUCCH structure, and the PUCCH structure comprised in the PUCCH structure set comprises one symbol location used for transmitting RS and is one of following PUCCH structures: UURUU, URUUU and RUUUU;

scheme 5: the PUCCH structure set comprises one PUCCH structure, and the PUCCH structure comprised in the PUCCH structure set comprises two symbol locations used for transmitting RS and is one of following PUCCH structures: URRUU, UURRU, RUURU, RURUU and URURU; and scheme 6: the PUCCH structure set comprises two PUCCH structures, wherein a first PUCCH structure comprises one symbol location used for transmitting RS and is one of following PUCCH structures: UURUU, URUUU and RUUUU; and a second PUCCH structure comprises two symbol locations used for transmitting RS and is one of following PUCCH structures: URRUU, UURRU, RUURU, RURUU and URURU;

and/or when the number A is 6, one of following schemes 7-9 is selected:

scheme 7: the PUCCH structure set comprises one PUCCH structure, and the PUCCH structure comprised in the PUCCH structure set comprises one symbol location used for transmitting RS and is one of following PUCCH structures: URUUUU, UURUUU, UUURUU and RUUUUU;

scheme 8: the PUCCH structure set comprises one PUCCH structure, and the PUCCH structure comprised in the PUCCH structure set comprises two symbol locations used for transmitting RS and is one of following PUCCH structures: URURUU, URUURU, RUUUUR, URUUUR, RUUURU and UURRUU; and scheme 9: the PUCCH structure set comprises two PUCCH structures, wherein a first PUCCH structure comprises one symbol location used for transmitting RS and is one of following PUCCH structures: URUUUU, UURUUU, UUURUU and RUUUUU; and a second PUCCH structure comprises two symbol locations used for transmitting RS and is one of following PUCCH structures: URURUU, URUURU, RUUUUR, URUUUR, RUUURU and UURRUU;

and/or when the number A is 7, one of following schemes 10-12 is selected:

scheme 10: the PUCCH structure set comprises one PUCCH structure, and the PUCCH structure comprised in the PUCCH structure set comprises one symbol location used for transmitting RS and is one of following PUCCH structures: URUUUUU, UURUUUU, UUURUUU and RUUUUUU;

scheme 11: the PUCCH structure set comprises one PUCCH structure, and the PUCCH structure comprised in the PUCCH structure set comprises two symbol locations used for transmitting RS and is one of following PUCCH structures: RUUUUUR, URUUUUR, RUUUURU, URUUURU, URUURUU, UURURUU, UURRUUU and UUURRUU; and scheme 12: the PUCCH structure set comprises two PUCCH structures, wherein a first PUCCH structure comprises one symbol location used for transmitting RS and is one of following PUCCH structures: URUUUUU, UURUUUU, UUURUUU and RUUUUUU; and a second PUCCH structure comprises two symbol locations used for transmitting RS and is one of following PUCCH structures: RUUUUUR, URUUUUR, RUUUURU, URUUURU, URUURUU, UURURUU, UURRUUU and UUURRUU;

and/or when the number A is 8, one of following schemes 13-15 is selected:

scheme 13: the PUCCH structure set comprises one PUCCH structure, and the PUCCH structure comprised in the PUCCH structure set comprises two symbol locations used for transmitting RS and is one of following PUCCH structures: URUUUURU, URUUURUU, RUUUUUUR, RUUUUURU, RUUUURUU, RUUURUUU, UUURRUUU and UURUURUU;

scheme 14: the PUCCH structure set comprises one PUCCH structure, and the PUCCH structure comprised in the PUCCH structure set comprises three or four symbol locations used for transmitting RS and is one of following PUCCH structures: URRUURRU, URURURUR, RURURURU, RUURRUUR, RURUURUR, RUURUURU, RUURUUUR, RUUURUUR, URURUURU and URURURUU; and scheme 15: the PUCCH structure set comprises two PUCCH structures, wherein a first PUCCH structure comprises one or two symbol locations used for transmitting RS and is one of following PUCCH structures: URUUUURU, URUUURUU, RUUUUUUR, RUUUUURU, RUUUURUU, RUUURUUU, UUURRUUU, UURUURUU, UUURUUUU and RUUUUUUU; and a second PUCCH structure comprises three or four symbol locations used for transmitting RS and is one of following PUCCH structures: URRUURRU, URURURUR, RURURURU, RURUURUR, RUURRUUR, RUURUURU, RUURUUUR, RUUURUUR, URURUURU and URURURUU;

and/or when the number A is 9, one of following schemes 16-18 is selected:

scheme 16: the PUCCH structure set comprises one PUCCH structure, and the PUCCH structure comprised in the PUCCH structure set comprises two symbol locations used for transmitting RS and is one of following PUCCH structures: UURUUURUU, URUUUURUU, URUUUUURU, URUUURUUU, RUUURUUUU, RUUUUUUUR, RUUUUURUU, RUUUUUURU, RUUUURUUU, UURUUUURU, UUUURRUUU and UUURRUUUU;

scheme 17: the PUCCH structure set comprises one PUCCH structure, and the PUCCH structure comprised in the PUCCH structure set comprises three or four symbol locations used for transmitting RS and is one of following PUCCH structures: URURURURU, URRUURRUU, URRUUURRU, RUURRUURU, RUURRUUUR, RUUURRUUR, RUURURUUR, RURUURUUR, URURURUUR, RUUURUUUR, URUURUURU and URURURURU; and scheme 18: the PUCCH structure set comprises two PUCCH structures, wherein a first PUCCH structure comprises one or two symbol locations used for transmitting RS and is one of following PUCCH structures: UURUUURUU, URUUUURUU, URURURURU, URUUURUUU, RUUURUUUU, RUUUUUUUR, RUUUUURUU, RUUUUUURU, RUUUURUUU, UURUUUURU, UUUURRUUU, UUURRUUUU, RUUUUUUUU and UUUURUUUU; and a second PUCCH structure comprises three or four symbol locations used for transmitting RS and is one of following PUCCH structures: URURURURU, URRUURRUU, URRUUURRU, RUURRUURU, RUURRUUUR, RUUURRUUR, RUURURUUR, RURUURUUR, URURURUUR, RUUURUUUR, URUURUURU and URURURURU;

and/or when the number A is 10, one of following schemes 19-21 is selected:

scheme 19: the PUCCH structure set comprises one PUCCH structure, and the PUCCH structure comprised in the PUCCH structure set comprises two symbol locations used for transmitting RS and is one of following PUCCH structures: UURUUUURUU, URUUUURUUU, URUUUUUURU, RUUUURUUUU, UURUUURUUU, URUUURUUUU, URUUUUURUU, RUUUUUUUUR, RUUUUUURUU, RUUUURUUU and UUUURRUUUU;

scheme 20: the PUCCH structure set comprises one PUCCH structure, and the PUCCH structure comprised in the PUCCH structure set comprises three or four symbol locations used for transmitting RS and is one of following PUCCH structures: URURURURUU, URURUURURU, URUURRUURU, URRUUUURRU, UURRUURRUU, RUURUURUUR, RUUURRUUUR, URURURUURU, RUUURUUURU, RUUURRUUUR, URUURUURUU and URUUURUUUR; and scheme 21: the PUCCH structure set comprises two PUCCH structures, wherein a first PUCCH structure comprises one or two symbol locations used for transmitting RS and is one of following PUCCH structures: UURUUUURUU, URUUUURUUU, URUUUUUURU, RUUUURUUUU, UURUUURUUU, URUUURUUUU, URUUUUURUU, RUUUUUUUUR, RUUUUUURUU, RUUUUURUUU, UUUURRUUUU, RUUUUUUUUU and UUUURUUUUU; and a second PUCCH structure comprises three or four symbol locations used for transmitting RS and is one of following PUCCH structures: URURURURUU, URURUURURU, URUURRUURU, URRUUUURRU, UURRUURRUU, RUURUURUUR, RUUURRUUUR, URURURUURU, RUUURUUURU, RUUURRUUUR, URUURUURUU and URUUURUUUR;

and/or when the number A is 11, one of following schemes 22-24 is selected:

scheme 22: the PUCCH structure set comprises one PUCCH structure, and the PUCCH structure comprised in the PUCCH structure set comprises two symbol locations used for transmitting RS and is one of following PUCCH structures: UURUUUURUUU, UURUUUUURUU, URUUUUURUUU, URUUUUUURU, RUUUURUUUUU, RUUUUURUUUU, UUURUUURUUU, URUUURUUUU, RUUUUUUUURU, URUUUUUUUUR, URUUUUUURUU, UUUURRUUUUU and RUUUUUUUUUR;

scheme 23: the PUCCH structure set comprises one PUCCH structure, and the PUCCH structure comprised in the PUCCH structure set comprises three or four symbol locations used for transmitting RS and is one of following PUCCH structures: UURURURURUU, URURUURURUU, URURUURUURU, URURUUURURU, URUURURUURU, URRUUUUURRU, URRUUUURRUU, UURRUUURRUU, RUURUUURUUR, RUUURURUUUR, RUUURRUUUUR, RUUUURRUUUR, URUUURUUURU, RUUUURUUUUR, UURUURUURUU and URUUURUUURU; and scheme 24: the PUCCH structure set comprises two PUCCH structures, wherein a first PUCCH structure comprises one or two symbol locations used for transmitting RS and is one of following PUCCH structures: UURUUUURUUU, UURUUUUURUU, URUUUUURUUU, URUUUUUUURU, RUUUURUUUUU, RUUUUURUUUU, UUURUUURUUU, URUUURUUUU, RUUUUUUUURU, URUUUUUUUUR, URUUUUUURUU, UUUURRUUUUU, RUUUUUUUUUR, RUUUUUUUUUU and UUUUURUUUUU; and a second PUCCH structure comprises three or four symbol locations used for transmitting RS and is one of following PUCCH structures: UURURURURUU, URURUURURUU, URURUURUURU, URURUUURURU, URUURURUURU, URRU- UUUURRU, URRUUUURRUU, UURRUUURRUU, RUURUUURUUR, RUUURURUUUR, RUUURRUUUUR, RUUUURRUUUR, URUUURUUURU, RUUUURUUUUR, UURUURUURUU and URUUURUUURU;

and/or when the number A is 12, one of following schemes 25-27 is selected:

scheme 25: the PUCCH structure set comprises one PUCCH structure, and the PUCCH structure comprised in the PUCCH structure set comprises two symbol locations used for transmitting RS and is one of following PUCCH structures: UUURUUUURUUU, UURUUUUUURUU, UURUUUUURUUU, URUUUUUUURU, RUUUUURUUUUU, UURUUURUUUU, UUUUURRUUUUU and RUUUUUUUUUUR;

scheme 26: the PUCCH structure set comprises one PUCCH structure, and the PUCCH structure comprised in the PUCCH structure set comprises three or four symbol locations used for transmitting RS and is one of following PUCCH structures: UURURUURURUU, URUURUURUURU, URURUUURURUU, URURUUURURU, UURRUUURRUU, UURRUUURRUUU, RUURUUUURUUR, RUUURUURUUUR, RUUUURRUUUUR, RUUURURUUURU, URUUURUUURUU, URUUURUUURU, URUUUURUUURU, RUUUURUUUURU, RUUUUURUUUUR, RUUUURUUUUUR, UURUURUUURUU, UURUUURUURUU and UURUURUURUUU; and scheme 27: the PUCCH structure set comprises two PUCCH structures, wherein a first PUCCH structure comprises one or two symbol locations used for transmitting RS and is one of following PUCCH structures: UUURUUUURUUU, UURUUUUUURUU, UURUUUUURUUU, UR UURU, RUUUUURUUUUU, UURUUURUUUU, UUUUURRUUUUU, RUUUUUUUUUUR, RUUUUUUUUUUU and UUUUURUUUUUU; and a second PUCCH structure comprises three or four symbol locations used for transmitting RS and is one of following PUCCH structures: UURURUURURUU, URUURUURUURU, URURUUURURUU, URURUUURURU, UURRUUURRUU, UURRUUURRUUU, RUURUUUURUUR, RUUURUURUUUR, RUUUURRUUUUR, RUUURURUUURU, URUUURUUURU, URUUURUUURU, URUUUURUUURU, RUUUURUUUURU, RUUUUURUUUUR, RUUUURUUUUUR, UURUURUUURUU, UURUUURUURUU and UURUURUURUUU;

and/or when the number A is 13, one of following schemes 28-30 is selected:

scheme 28: the PUCCH structure set comprises one PUCCH structure, and the PUCCH structure comprised in the PUCCH structure set comprises two symbol locations used for transmitting RS and is one of following PUCCH structures: UURUUUUUUURUU, UUURUUUURUUU, URUUUUUUUUURU, RUUUUURUUUUUU, RUUUUUURUUUUU, UURUUUUUURUUU, UUUUURRUUUUUU and RUUUUUUUUUUUR;

scheme 29: the PUCCH structure set comprises one PUCCH structure, and the PUCCH structure comprised in the PUCCH structure set comprises three or four symbol locations used for transmitting RS and is one of following PUCCH structures: UURURUUURURUU, URUURUUURUURU, URURUUUUURURU, URUURUURUURUU, URUURUURUUURU, UURRUUUURRUU, UUURRUUURRUUU, RUURUURUURUUU, RUURUUUUURUUR, RUUURUUURUUUR, RUUUURRUUUUUR, URUUURURUUURU, RUUURUURUUURU, UURUUURUUURUU, URUUUURUUUURU, RUUUUURUUUUUR, UUURUURUURUUU and UURUUUURUURUU; and scheme 30: the PUCCH structure set comprises two PUCCH structures, wherein a first PUCCH structure comprises one or two symbol locations used for transmitting RS and is one of following PUCCH structures: UURUUUUUUURUU, UUURUUUUURUUU, URUUUUUUUURU, RUUUUURUUUUUU, RUUUUUURUUUUU, UURUUUUUURUUU, UUUUURRUUUUUU, RUUUUUUUUUUUR, RUUUUUUUUUUUU and UUUUUURUUUUUU; and a second PUCCH structure comprises three or four symbol locations used for transmitting RS and is one of following PUCCH structures: UURURUUURURUU, URUURUUURUURU, URURUUUUURURU, URUURUURUURUU, URUURUURUUURU, UURRUUUURRUU, UUURRUUURRUUU, RUURUURUURUUU, RUURUUUUURUUR, RUUURUUURUUUR, RUUUURRUUUUUR, URUUURURUUURU, RUUURUURUUURU, UURUUURUUURUU, URUUUURUUUURU, RUUUUURUUUUUR, UUURUURUURUUU and UURUUUURUURUU;

and/or when the number A is 14, one of following schemes 31-33 is selected:

scheme 31: the PUCCH structure set comprises one PUCCH structure, and the PUCCH structure comprised in the PUCCH structure set comprises two symbol locations used for transmitting RS and is one of following PUCCH structures: UURUUUUUUUURUU, UUURUUUURUUUU, URUUUUUUUUUURU, RUUUUUURUUUUUU, UUURUUUUUURUUU, UUUUUURRUUUUUU and RUUUUUUUUUUUUR;

scheme 32: the PUCCH structure set comprises one PUCCH structure, and the PUCCH structure comprised in the PUCCH structure set comprises three or four symbol locations used for transmitting RS and is one of following PUCCH structures: URUUURUURUUURU, UURURUUUURURUU, URUURUUUURUURU, URUURUUURUURUU, URURUUUUUURURU, UURUURUURUURUU, UURRUUUUUURRUU, UUURRUUUURRUUU, RUURUUURUURUUU, RUURUUUUUURUUR, RUUURUUUURUUUR, RUUUUURRUUUUUR, UURUURUUURUURU, URUUUURUUUURUU, URUUUURUUUUURU, URUUUUURUUUURU, RUUUUURUUUUUUR, RUUUUUURUUUUUR, RUUUUURUUUUURU, URUUUUURUUUUUR, UUURUURUURUUU, UUURUURUUURUUU, UURUUURUURUUU and UURUUUURUUURUU; and scheme 33: the PUCCH structure set comprises two PUCCH structures, wherein a first PUCCH structure comprises one or two symbol locations used for transmitting RS and is one of following PUCCH structures: UURUUUUUUUURUU, UUURUUUURUUUU, URUUUUUUUUUURU, RUUUUUURUUUUUU, UUURUUUUUURUUU, UUUUUURRUUUUUU, RUUUUUUUUUUUUR, RUUUUUUUUUUUUU and UUUUUURUUUUUUU; and a second PUCCH structure comprises three or four symbol locations used for transmitting RS and is one of following PUCCH structures: URUUURUURUUURU, UURURUUUURURUU, URUURUUUURUURU, URUURUUURUURUU, URURUUUUUURURU, UURUURUURUURUU, UURRUUUUUURRUU, UUURRUUUURRUUU, RUURUUURUURUUU, RUURUUUUUURUUR, RUUURUUUURUUUR, RUUUUURRUUUUUR, UURUURUUURUURU, URUUUURUUUURUU, URUUUURUUUUURU, URUUUUURUUUURU, RUUUUURUUUUUUR, RUUUUUURUUUUUR, RUUUUURUUUUURU, URUUUUURUUUUUR, UUURUUURUURUUU, UUURUURUUURUUU, UURUUURUUURUUU and UURUUUURUUURUU;

and wherein in a PUCCH structure, U represents a symbol location used for transmitting UCI, and R represents a symbol location used for transmitting RS.

16. A device, comprising a processor, and a memory and a transceiver connected with the processor, the processor being configured for reading a program in the memory to execute the PUCCH transmission method according to claim 6.

17. The device according to claim 16, wherein when the PUCCH structure set comprises one PUCCH structure, the determining a PUCCH structure corresponding to the PUCCH from the PUCCH structure set comprises: taking the one PUCCH structure comprised in the PUCCH structure set as the corresponding PUCCH structure; or when the PUCCH structure set comprises multiple PUCCH structures, the determining a PUCCH structure corresponding to the PUCCH from the PUCCH structure set comprises:

selecting a PUCCH structure as the corresponding PUCCH structure from the PUCCH structure set, and controlling the transceiver to inform a selection result to a terminal through a configuration instruction; and/or selecting a PUCCH structure with most symbol locations used for transmitting RS as the corresponding PUCCH structure from the PUCCH structure set upon determining that frequency hopping is performed during PUCCH transmission, and controlling the transceiver to inform the terminal of a demand for frequency hopping through a configuration instruction.

18. The device according to claim 16, wherein:

when the value of the number A of the symbols is X1 to X2, for each number A of the symbols within X1 to X2, at least two PUCCH structures are defined in the PUCCH structure set; when the value of the number A of the symbols is (X2+1) to X4, for each number A of the symbols within (X2+1) to X4, one PUCCH structure is defined in the PUCCH structure set; or when the value of the number A of the symbols is X1 to X2 and X3 to X4, for each number A of the symbols within X1 to X2 and X3 to X4, at least two PUCCH structures are defined in the PUCCH structure set; when the value of the number A of the symbols is (X2+1) to (X3−1), for each number A of the symbols within (X2+1) to (X3−1), one PUCCH structure is defined in the PUCCH structure set; or with regard to the value of each number A of the symbols supported by the PUCCH, one or at least two PUCCH structures are defined in the PUCCH structure set;

wherein X1, X2, X3 and X4 are positive integers, and $X1 \le X2 \le X3 < X4$.

19. The device according to claim 16, wherein when it is determined that frequency hopping is performed during PUCCH transmission, the processor is configured for:

respectively receiving information carried in a first symbol group and information carried in a second symbol group at different frequency domain positions by taking first $$\left\lfloor \frac{A}{2} \right\rfloor$$

symbols comprised by the PUCCH as the first symbol group and last $$\left(A - \left\lfloor \frac{A}{2} \right\rfloor\right)$$

symbols comprised by the PUCCH as the second symbol group; or respectively receiving information carried in a first symbol group and information carried in a second symbol group at different frequency domain positions by taking first $$\left\lceil \frac{A}{2} \right\rceil$$

symbols comprised by the PUCCH as the first symbol group and last $$\left(A - \left\lceil \frac{A}{2} \right\rceil\right)$$

symbols comprised by the PUCCH as the second symbol group.

20. The device according to claim 16, wherein:

when the number A is 4, one of following schemes 1-3 is selected:

scheme 1: the PUCCH structure set comprises one PUCCH structure, and the PUCCH structure comprised in the PUCCH structure set comprises one symbol location used for transmitting RS and is one of following PUCCH structures: URUU, UURU and RUUU;

scheme 2: the PUCCH structure set comprises one PUCCH structure, and the PUCCH structure comprised in the PUCCH structure set comprises two symbol locations used for transmitting RS and is one of following PUCCH structures: URRU, RURU, RUUR and URUR; and scheme 3: the PUCCH structure set comprises two PUCCH structures, wherein a first PUCCH structure comprises one symbol location used for transmitting RS and is one of following PUCCH structures: URUU, UURU and RUUU; and a second PUCCH structure comprises two symbol locations used for transmitting RS and is one of following PUCCH structures: URRU, RURU, RUUR and URUR;

and/or wherein when the number A is 5, one of following schemes 4-6 is selected:

scheme 4: the PUCCH structure set comprises one PUCCH structure, and the PUCCH structure comprised in the PUCCH structure set comprises one symbol location used for transmitting RS and is one of following PUCCH structures: UURUU, URUUU and RUUUU;

scheme 5: the PUCCH structure set comprises one PUCCH structure, and the PUCCH structure comprised in the PUCCH structure set comprises two symbol locations used for transmitting RS and is one of following PUCCH structures: URRUU, UURRU, RUURU, RURUU and URURU; and scheme 6: the PUCCH structure set comprises two PUCCH structures, wherein a first PUCCH structure comprises one symbol location used for transmitting RS and is one of following PUCCH structures: UURUU, URUUU and RUUUU; and a second PUCCH structure comprises two symbol locations used for transmitting RS and is one of following PUCCH structures: URRUU, UURRU, RUURU, RURUU and URURU;

and/or when the number A is 6, one of following schemes 7-9 is selected:

scheme 7: the PUCCH structure set comprises one PUCCH structure, and the PUCCH structure comprised in the PUCCH structure set comprises one symbol location used for transmitting RS and is one of following PUCCH structures: URUUUU, UURUUU, UUURUU and RUUUUU;

scheme 8: the PUCCH structure set comprises one PUCCH structure, and the PUCCH structure comprised in the PUCCH structure set comprises two symbol locations used for transmitting RS and is one of following PUCCH structures: URURUU, URUURU, RUUUUR, URUUUR, RUUURU and UURRUU; and scheme 9: the PUCCH structure set comprises two PUCCH structures, wherein a first PUCCH structure comprises one symbol location used for transmitting RS and is one of following PUCCH structures: URUUUU, UURUUU, URURUU and RUUUUU; and a second PUCCH structure comprises two symbol locations used for transmitting RS and is one of following PUCCH structures: URURUU, URUURU, RUUUUR, URUUUR, RUUURU and UURRUU;

and/or when the number A is 7, one of following schemes 10-12 is selected:

scheme 10: the PUCCH structure set comprises one PUCCH structure, and the PUCCH structure comprised in the PUCCH structure set comprises one symbol location used for transmitting RS and is one of following PUCCH structures: URUUUUU, UURUUUU, UUURRUU and RUUUUUU;

scheme 11: the PUCCH structure set comprises one PUCCH structure, and the PUCCH structure comprised in the PUCCH structure set comprises two symbol locations used for transmitting RS and is one of following PUCCH structures: RUUUUUR, URUUUUR, RUUUURU, URUUURU, URUURUU, UURURUU, UURRUUU and UUURRUU; and scheme 12: the PUCCH structure set comprises two PUCCH structures, wherein a first PUCCH structure comprises one symbol location used for transmitting RS and is one of following PUCCH structures: URUUUUU, UURUUUU, UUURUUU and RUUUUUU; and a second PUCCH structure comprises two symbol locations used for transmitting RS and is one of following PUCCH structures: RUUUUUR, URUUUUR, RUUUURU, URUUURU, URUURUU, UURURUU, UURRUUU and UUURRUU;

and/or when the number A is 8, one of following schemes 13-15 is selected:

scheme 13: the PUCCH structure set comprises one PUCCH structure, and the PUCCH structure comprised in the PUCCH structure set comprises two symbol locations used for transmitting RS and is one of following PUCCH structures: URUUUURU, URUUURUU, RUUUUUUR, RUUUUURU, RUUUURUU, RUUURUUU, UUURRUUU and UURUURUU;

scheme 14: the PUCCH structure set comprises one PUCCH structure, and the PUCCH structure comprised in the PUCCH structure set comprises three or four symbol locations used for transmitting RS and is one of following PUCCH structures: URRUURRU, URURURUR, RURURURU, RUURRUUR, RURUURUR, RUURUURU, RUURUUUR, RUUURUUR, URURUURU and URURURUU; and scheme 15: the PUCCH structure set comprises two PUCCH structures, wherein a first PUCCH structure comprises one or two symbol locations used for transmitting RS and is one of following PUCCH structures: URUUUURU, URUUURUU, RUUUUUUR, RUUUUURU, RUUUURUU, RUUURUUU, UUURRUUU, UURUURUU, UUURUUUU and RUUUUUUU; and a second PUCCH structure comprises three or four symbol locations used for transmitting RS and is one of following PUCCH structures: URRUURRU, URURURUR, RURURURU, RURUURUR, RUURRUUR, RUURUURU, RUURUUUR, RUUURUUR, URURUURU and URURURUU;

and/or when the number A is 9, one of following schemes 16-18 is selected:

scheme 16: the PUCCH structure set comprises one PUCCH structure, and the PUCCH structure comprised in the PUCCH structure set comprises two symbol locations used for transmitting RS and is one of following PUCCH structures: UURUUURUU, URUUURUU, URUUUUURU, URUUURURU, RUUURUUUU, RUUUUUUUR, RUUUUURUU, RUUUUUURU, RUUUURUUU, UURUUUURU, UUUURRUUU and UUURRUUUU;

scheme 17: the PUCCH structure set comprises one PUCCH structure, and the PUCCH structure comprised in the PUCCH structure set comprises three or four symbol locations used for transmitting RS and is one of following PUCCH structures: URURURURU, URRUURRUU, URRUUURRU, RUURRUURU, RUURRUUUR, RUUURRUUR, RUURURUUR, RURUURUUR, URURURUUR, RUUURUUUR, URUURUURU and URUUURURU; and scheme 18: the PUCCH structure set comprises two PUCCH structures, wherein a first PUCCH structure comprises one or two symbol locations used for transmitting RS and is one of following PUCCH structures: UURUUURUU, URUUUURUU, URUUUUURU, URUUURUUU, RUUURUUUU, RUUUUUUUR, RUUUUURUU, RUUUUUURU, RUUUURUUU, UURUUUURU, UUUURRUUU, UUURRUUUU, RUUUUUUUU and UUUURUUUU; and a second PUCCH structure comprises three or four symbol locations used for transmitting RS and is one of following PUCCH structures: URURURURU, URRUURRUU, URRUUURRU, RUURRUURU, RUURRUUUR, RUUURRUUR, RUURURUUR, RURUURUUR, URURURUUR, RUUURUUUR, URUURUURU and URUUURURU;

and/or when the number A is 10, one of following schemes 19-21 is selected:

scheme 19: the PUCCH structure set comprises one PUCCH structure, and the PUCCH structure comprised in the PUCCH structure set comprises two symbol locations used for transmitting RS and is one of following PUCCH structures: UURUUUURUU, URUUUURUUU, URUUUUUURU, RUUUURUUUU, UURUUURUUU, URUUURUUUU, URUUUUURUU, RUUUUUUUUR, RUUUUUURUU, RUUUUURUUU and UUUURRUUUU;

scheme 20: the PUCCH structure set comprises one PUCCH structure, and the PUCCH structure comprised in the PUCCH structure set comprises three or four symbol locations used for transmitting RS and is one of following PUCCH structures: URURURURUU, URURUURURU, URUURRUURU, URRUUUURRU, UURRUURRUU, RUURUURUUR, RUUURRUUUR, URURURUURU, RUUURUUURU, RUUURUUUUR, URUURUURUU and URUUURUUUR; and scheme 21: the PUCCH structure set comprises two PUCCH structures, wherein a first PUCCH structure comprises one or two symbol locations used for transmitting RS and is one of following PUCCH structures: UURUUUURUU, URUUUURUUU, URUUUUUURU, RUUUURUUUU, UURUUURUUU, URUUURUUUU, URUUUUURUU, RUUUUUUUUR, RUUUUUURUU, RUUUUURUUU, UUUURRUUUU, RUUUUUUUUU and UUUURUUUUU; and a second PUCCH structure comprises three or four symbol locations used for transmitting RS and is one of following PUCCH structures: URURURURUU, URURUURURU, URUURRUURU, URRUUUURRU, UURRUURRUU, RUURUURUUR, RUUURRUUUR, URURURUURU, RUUURUUURU, RUUURUUUUR, URUURUURUU and URUUURUUUR;

and/or when the number A is 11, one of following schemes 22-24 is selected:

scheme 22: the PUCCH structure set comprises one PUCCH structure, and the PUCCH structure comprised in the PUCCH structure set comprises two symbol locations used for transmitting RS and is one of following PUCCH structures: UURUUUURUUU, UURUUUUURUU, URUUUUURUUU, URUUUUUUURU, RUUUURUUUUU, RUUUUURUUUU, UUURUUURUUU, URUUURUUUU, RUUUUUUUURU, URUUUUUUUUR, URUUUUUURUU, UUUURRUUUUU and RUUUUUUUUUR;

scheme 23: the PUCCH structure set comprises one PUCCH structure, and the PUCCH structure comprised in the PUCCH structure set comprises three or four symbol locations used for transmitting RS and is one of following PUCCH structures: UURURURURUU, URURUURURUU, URURUURUURU, URURUUURURU, URUURURUURU, URRUUUUURRU, URRUUUURRUU, UURRUUURRUU, RUURUUURUUR, RUUURURUUUR, RUUURRUUUUR, RUUUURRUUUR, URUUURUUURU, RUUUURUUUUR, UURUURUURUU and URUUURUUURU; and scheme 24: the PUCCH structure set comprises two PUCCH structures, wherein a first PUCCH structure comprises one or two symbol locations used for transmitting RS and is one of following PUCCH structures: UURUUUURUUU, UURUUUUURUU, URUUUUURUUU, URUUUUUUURU, RUUUURUUUUU, RUUUUURUUUU, UURUUURUUU, URUUURUUU, RUUUUUUUURU, URUUUUUUUUR, URUUUUUURUU, UUUURRUUUUU, RUUUUUUUUUR, RUUUUUUUUUU and UUUUURUUUUU; and a second PUCCH structure comprises three or four symbol locations used for transmitting RS and is one of following PUCCH structures: UURURURURUU, URURUURURUU, URURUURUURU, URURUUURURU, URUURURUURU, URRUUUUURRU, URRUUUURRUU, UURRUUURRUU, RUURUUURUUR, RUUURURUUUR, RUUURRUUUUR, RUUUURRUUUR, URUUURUUURU, RUUUURUUUUR, UURUURUURUU and URUUURUUURU;

and/or when the number A is 12, one of following schemes 25-27 is selected:

scheme 25: the PUCCH structure set comprises one PUCCH structure, and the PUCCH structure comprised in the PUCCH structure set comprises two symbol locations used for transmitting RS and is one of following PUCCH structures: UUURUUUURUUU, UURUUUUUURUU, UURUUUUURUUU, URURUUUURURU, RUUUUURUUUUU, UURUUURUUUU, UUUUURRUUUUU and RUUUUUUUUUUR;

scheme 26: the PUCCH structure set comprises one PUCCH structure, and the PUCCH structure comprised in the PUCCH structure set comprises three or four symbol locations used for transmitting RS and is one of following PUCCH structures: UURURUURURUU, URUURUURUURU, URURUUURURUU, URURUUUURURU, UURRUUUURRUU, UURRUUURRUUU, RUURUUUURUUR, RUUURUURUUUR, RUUUURRUUUUR, RUUURURUUURU, URUUURUURUU, URUUUURUUUURU, URUUUURUUURU, RUUUURUUUURU, RUUUURUUUUUR, RUUUURUUUUUR, UURUURUUURUU, UURUUURUURUU and UURUURUURUUU; and scheme 27: the PUCCH structure set comprises two PUCCH structures, wherein a first PUCCH structure comprises one or two symbol locations used for transmitting RS and is one of following PUCCH structures: UUURUUUURUUU, UURUUUUUURUU, UURUUUUURUUU, URUUUUUUUURU, RUUUUURUUUUU, UURUUURUUUU, UUUURRUUUUU, RUUUUUUUUUUR, RUUUUUUUUUUU and UUUUURUUUUUU; and a second PUCCH structure comprises three or four symbol locations used for transmitting RS and is one of following PUCCH structures: UURURUURURUU, URUURUURUURU, URURUUURURUU, URURUUUURURU, UURRUUUURRUU, UURRUUURRUUU, RUURUUUURUUR, RUUURUURUUUR, RUUUURRUUUUR, RUUURURUUURU, URUUURUUUURU, URUUURUUUURU, RUUUURUUURU, RUUUUURUUUUR, RUUUURUUUUUR, UURUURUUURUU, UURUUURUURUU and UURUURUURUUU;

and/or when the number A is 13, one of following schemes 28-30 is selected:

scheme 28: the PUCCH structure set comprises one PUCCH structure, and the PUCCH structure comprised in the PUCCH structure set comprises two symbol locations used for transmitting RS and is one of following PUCCH structures: UURUUUUUURUU, UUURUUUURUUU, URUUUUUUUURU, RUUUURUUUUUU, RUUUUURUUUUU, UURUUUUURUUU, UUUURRUUUUUU and RUUUUUUUUUUR;

scheme 29: the PUCCH structure set comprises one PUCCH structure, and the PUCCH structure comprised in the PUCCH structure set comprises three or four symbol locations used for transmitting RS and is one of following PUCCH structures: UURURUUURURUU, URUURUUURUURU, URURUUUUURURU, URUURUURUURUU, URUURUURUUURU, UURRUUUUURRUU, UUURRUUURRUUU, RUURUURUURUUU, RUURUUUUURUUR, RUUURUUURUUUR, RUUUURRUUUUUR, URUUURURUUURU, RUUURUURUUURU, UURUUURUUURUU, URUUUURUUUURU, RUUUUURUUUUUR, UUURUURUURUUU and UURUUUURUURUU; and scheme 30: the PUCCH structure set comprises two PUCCH structures, wherein a first PUCCH structure comprises one or two symbol locations used for transmitting RS and is one of following PUCCH structures: UURUUUUUUURUU, UUURUUUUURUUU, URUUUUUUUUURU, RUUUUURUUUUUU, RUUUUUURUUUUU, UURUUUUUURUUU, UUUUURRUUUUUU, RUUUUUUUUUUUR, RUUUUUUUUUUUU and UUUUUURUUUUUU; and a second PUCCH structure comprises three or four symbol locations used for transmitting RS and is one of following PUCCH structures: UURURUUURURUU, URUURUUURUURU, URURUUUUURURU, URUURUURUURUU, URUURUURUUURU, UURRUUUUURRUU, UUURRUUURRUUU, RUURUURUURUUU, RUURUUUUURUUR, RUUURUUURUUUR, RUUUURRUUUUUR, URUUURURUUURU, RUUURUURUUURU, UURUUURUUURUU, URUUUURUUUURU, RUUUUURUUUUUR, UUURUURUURUUU and UURUUUURUURUU;

and/or when the number A is 14, one of following schemes 31-33 is selected:

scheme 31: the PUCCH structure set comprises one PUCCH structure, and the PUCCH structure comprised in the PUCCH structure set comprises two symbol locations used for transmitting RS and is one of following PUCCH structures: UURUUUUUUUURUU, UUUURUUUURUUUU, URUUUUUUUUUURU, RUUUUUURUUUUUU, UUURUUUUUURUUU, UUUUUURRUUUUUU and RUUUUUUUUUUUUR;

scheme 32: the PUCCH structure set comprises one PUCCH structure, and the PUCCH structure comprised in the PUCCH structure set comprises three or four symbol locations used for transmitting RS and is one of following PUCCH structures: URUUURUURUUURU, UURURUUUURURUU, URUURUUURUURU, URUURUUURUURUU, URURUUUUUURURU, UURUURUURUURUU, UURRUUUUUURRUU, UUURRUUUURRUUU, RUURUUURUURUUU, RUURUUUUUURUUR, RUUURUUUURUUUR, RUUUUURRUUUUUR, UURUURUUURUURU, URUUUURUUUURUU, URUUUURUUUUURU, URUUUUURUUUURU, RUUUUURUUUUUUR, RUUUUUURUUUUUR, RUUUUURUUUUURU, URUUUUURUUUUUR, UUURUUURUURUUU, UUURUURUUURUUU, UURUUURUUURUUU and UURUUUURUUURUU; and scheme 33: the PUCCH structure set comprises two PUCCH structures, wherein a first PUCCH structure comprises one or two symbol locations used for transmitting RS and is one of following PUCCH structures: UURUUUUUUUURUU, UUUURUUUURUUUU, URUUUUUUUUUURU, RUUUUUURUUUUUU, UUURUUUUUURUUU, UUUUUURRUUUUUU, RUUUUUUUUUUUUR, RUUUUUUUUUUUUU and UUUUUUURUUUUUU; and a second PUCCH structure comprises three or four symbol locations used for transmitting RS and is one of following PUCCH structures: URUUURUURUUURU, UURURUUUURURUU, URUURUUUURUURU, URUURUUURUURUU, URURUUUUUURURU, UURUURUURUURUU, UURRUUUUUURRUU, UUURRUUUURRUUU, RUURUUURUURUUU, RUURUUUUUURUUR, RUUURUUUURUUUR, RUUUUURRUUUUUR, UURUURUUURUURU, URUUUURUUUURUU, URUUUURUUUUURU, URUUUUURUUUURU, RUUUUURUUUUUUR, RUUUUUURUUUUUR, RUUUUURUUUUURU, URUUUUURUUUUUR, UUURUUURUURUUU, UUURUURUUURUUU, UURUUURUUURUUU and UURUUUURUUURUU;

and wherein in a PUCCH structure, U represents a symbol location used for transmitting UCI, and R represents a symbol location used for transmitting RS.

* * * * *